US012715135B2

(12) United States Patent
Hu et al.

(10) Patent No.: US 12,715,135 B2
(45) Date of Patent: Aug. 25, 2026

(54) METHOD AND SYSTEM FOR CONTROLLING A ROBOT MANIPULATOR FOR OPERATING IN A SHARED WORKSPACE WITH HUMAN(S)

(71) Applicant: Nanyang Technological University, Singapore (SG)

(72) Inventors: Guoqiang Hu, Singapore (SG); Kaige Shi, Singapore (SG)

(73) Assignee: Nanyang Technological University, Singapore (SG)

( * ) Notice: Subject to any disclaimer, the term of this patent is extended or adjusted under 35 U.S.C. 154(b) by 62 days.

(21) Appl. No.: 18/844,417

(22) PCT Filed: Apr. 20, 2023

(86) PCT No.: PCT/SG2023/050265

§ 371 (c)(1),
(2) Date: Sep. 6, 2024

(87) PCT Pub. No.: WO2023/211371

PCT Pub. Date: Nov. 2, 2023

(65) Prior Publication Data

US 2025/0236018 A1 Jul. 24, 2025

(30) Foreign Application Priority Data

Apr. 25, 2022 (SG) ........................... 10202204344Y

(51) Int. Cl.
*B25J 9/00* (2006.01)
*B25J 9/16* (2006.01)

(52) U.S. Cl.
CPC ........... *B25J 9/1676* (2013.01); *B25J 9/1653* (2013.01); *B25J 9/1666* (2013.01)

(58) Field of Classification Search
CPC ....... B25J 9/1676; B25J 9/1653; B25J 9/1666
See application file for complete search history.

(56) References Cited

U.S. PATENT DOCUMENTS

2014/0067121 A1* 3/2014 Brooks .................. B25J 9/1676 700/255
2020/0189101 A1 6/2020 Terada
2022/0105634 A1* 4/2022 Oboril ...................... B25J 9/163

FOREIGN PATENT DOCUMENTS

CN 112305916 A 2/2021
CN 113370210 A 9/2021
WO 2019235995 A1 12/2019

OTHER PUBLICATIONS

International Search Report and Written Opinion dated Oct. 20, 2023 for Application No. PCT/SG2023/050265.

(Continued)

*Primary Examiner* — Aaron G Cain
(74) *Attorney, Agent, or Firm* — Patterson + Sheridan, LLP

(57) ABSTRACT

A method of controlling a robot manipulator for operating in a shared workspace with human(s) is provided. The method includes: determining a safety control set with respect to a safety condition between selected part(s) of the robot manipulator and selected part(s) of the human(s) using a safety control function; determining a hard constraint control set with respect to hard constraint(s) in trajectory tracking in DOF(s) of a component of the robot manipulator for a task using a hard constraint function; determining a soft constraint control set with respect to soft constraint(s) in trajectory tracking in DOF(s) of the component for the task using a soft constraint function; and performing control input optimization based on the safety control set, the hard constraint control set and the soft constraint control set to determine a control input for controlling the robot manipulator. In particular, the safety control function is configured to determine the safety control set: based on a control model for the robot manipulator that is configured in a control affine form based on a control mode of the robot manipu- (Continued)

lator, and for each part pair of part pair(s) of a selected part of the selected part(s) of the robot manipulator and a selected part of the selected part(s) of the human(s): based on a safety distance function associated with the part pair which corresponds to a control barrier function, and based on a sliding manifold associated with the part pair configured based on the safety distance function and a relative degree of the safety distance function with respect to the control input to the robot manipulator.

23 Claims, 21 Drawing Sheets

(56) References Cited

OTHER PUBLICATIONS

J. F. Chen and W. J. Kim, "A Human-Following Mobile Robot Providing Natural and Universal Interfaces for Control With Wireless Electronic Devices," IEEE-ASME Transactions on Mechatronics, vol. 24, No. 5, pp. 2377-2385, Oct. 2019, DOI: 10.1109/tmech.2019.2936395.
Q. Y. Yan, J. Huang, Z. H. Yang, Y. Hasegawa, and T. Fukuda, "Human-Following Control of Cane-Type Walking-Aid Robot Within Fixed Relative Posture," IEEE-ASME Transactions on Mechatronics, vol. 27, No. 1, pp. 537-548, Feb. 2022, DOI: 10.1109/tmech.2021.3068138.
M. J. Kim et al., "A Passivity-Based Nonlinear Admittance Control With Application to Powered Upper-Limb Control Under Unknown Environmental Interactions," IEEE-ASME Transactions on Mechatronics, vol. 24, No. 4, pp. 1473-1484, Aug. 2019, DOI: 10.1109/tmech.2019.2912488.
M. Najafi, C. Rossa, K. Adams, and M. Tavakoli, "Using Potential Field Function With a Velocity Field Controller to Learn and Reproduce the Therapist's Assistance in Robot-Assisted Rehabilitation," IEEE-ASME Transactions on Mechatronics, vol. 25, No. 3, pp. 1622-1633, Jun. 2020, DOI: 10.1109/tmech.2020.2981625.
M. Muddassir, D. G. Dominguez, L. Y. Hu, S. J. Chen, and D. Navarro-Alarcon, "Robotics Meets Cosmetic Dermatology: Development of a Novel Vision-Guided System for Skin Photo-Rejuvenation," IEEE-ASME Transactions on Mechatronics, vol. 27, No. 2, pp. 666-677, Apr. 2022, DOI: 10.1109/tmech.2021.3075207.
Y. P. Cai, P. F. Choi, C. W. V. Hui, R. H. Taylor, and K. W. S. Au, "A Task Space Virtual Fixture Architecture for Teleoperated Surgical System With Slave Joint Limit Constraints," IEEE-ASME Transactions on Mechatronics, vol. 27, No. 1, pp. 69-80, Feb. 2022, DOI: 10.1109/tmech.2021.3058174.
L. Gualtieri, E. Rauch, and R. Vidoni, "Emerging research fields in safety and ergonomics in industrial collaborative robotics: A systematic literature review," Robotics and Computer-Integrated Manufacturing, vol. 67, Feb. 2021, Art No. 101998, DOI: 10.1016/j.rcim.2020.101998.
O. Khatib, "Real-time obstacle avoidance for manipulators and mobile robots," Proceedings. 1985 IEEE International Conference on Robotics and Automation, St. Louis, MO, USA, 1985, pp. 500-505, doi: 10.1109/ROBOT.1985.1087247.
B. Lacevic, P. Rocco, and A. M. Zanchettin, "Safety Assessment and Control of Robotic Manipulators Using Danger Field," IEEE Transactions on Robotics, vol. 29, No. 5, pp. 1257-1270, Oct. 2013, DOI: 10.1109/tro.2013.2271097.
S. Lyu and C. C. Cheah, "Human-Robot Interaction Control Based on a General Energy Shaping Method," IEEE Transactions on Control Systems Technology, vol. 28, No. 6, pp. 2445-2460, Nov. 2020, DOI: 10.1109/tcst.2019.2949525.
M. Khatib, K. Al Khudir, and A. De Luca, "Human-robot contactless collaboration with mixed reality interface," Robotics and Computer-Integrated Manufacturing, vol. 67, Feb. 2021, Art No. 102030, DOI: 10.1016/j.rcim.2020.102030.
J. Kim, W. Jie, H. H. Kim, and M. C. Lee, "Modified Configuration Control With Potential Field for Inverse Kinematic Solution of Redundant Manipulator," IEEE-ASME Transactions on Mechatronics, vol. 26, No. 4, pp. 1782-1790, Aug. 2021, DOI: 10.1109/tmech.2021.3077914.
A. Kanazawa, J. Kinugawa, and K. Kosuge, "Adaptive Motion Planning for a Collaborative Robot Based on Prediction Uncertainty to Enhance Human Safety and Work Efficiency," IEEE Transactions on Robotics, vol. 35, No. 4, pp. 817-832, Aug. 2019, DOI: 10.1109/tro.2019.2911800.
M. Krämer, C. Rösmann, F. Hoffmann, and T. Bertram, "Model predictive control of a collaborative manipulator considering dynamic obstacles," Optimal Control Applications & Methods, vol. 41, No. 4, pp. 1211-1232, Jul. 2020, DOI: 10.1002/oca.2599.
M. Ragaglia, A. M. Zanchettin, and P. Rocco, "Trajectory generation algorithm for safe human-robot collaboration based on multiple depth sensor measurements," Mechatronics, vol. 55, pp. 267-281, Nov. 2018, DOI: 10.1016/j.mechatronics.2017.12.009.
M. Kimmel and S. Hirche, "Invariance Control for Safe Human-Robot Interaction in Dynamic Environments," IEEE Transactions on Robotics, vol. 33, No. 6, pp. 1327-1342, Dec. 2017, DOI: 10.1109/tro.2017.2750697.
M. Rauscher, M. Kimmel, and S. Hirche, "Constrained Robot Control Using Control Barrier Functions," IEEE/RSJ International Conference on Intelligent Robots and Systems (IROS) 2016, pp. 279-285, 2016.
F. Ferraguti et al., "Safety barrier functions and multi-camera tracking for human-robot shared environment," Robotics and Autonomous Systems, vol. 124, Feb. 2020, Art No. 103388, DOI: 10.1016/j.robot.2019.103388.
10. F. Ferraguti, M. Bertuletti, C. T. Landi, M. Bonfe, C. Fantuzzi, and C. Secchi, "A Control Barrier Function Approach for Maximizing Performance While Fulfilling to ISO/TS 15066 Regulations," IEEE Robotics and Automation Letters, vol. 5, No. 4, pp. 5921-5928, Oct. 2020, DOI: 10.1109/lra.2020.3010494.
A. P. Dani, I. Salehi, G. Rotithor, D. Trombetta, and H. Ravichandar, "Human-in-the-Loop Robot Control for Human-Robot Collaboration: Human Intention Estimation and Safe Trajectory Tracking Control for Collaborative Tasks," IEEE Control Systems Magazine, vol. 40, No. 6, pp. 29-56, Dec. 2020, DOI: 10.1109/mcs.2020.3019725.
O. Brock and O. Khatib, "Elastic strips: A framework for motion generation in human environments," International Journal of Robotics Research, vol. 21, No. 12, pp. 1031-1052, Dec. 2002, DOI: 10.1177/0278364902021012002.
A. Pupa, M. Arrfou, G. Andreoni, and C. Secchi, "A Safety-Aware Kinodynamic Architecture for Human-Robot Collaboration," IEEE Robotics and Automation Letters, vol. 6, No. 3, pp. 4465-4471, Jul. 2021, DOI: 10.1109/lra.2021.3068634.
E. Kim, Y. Yamada, S. Okamoto, M. Sennin, and H. Kito, "Considerations of potential runaway motion and physical interaction for speed and separation monitoring," Robotics and Computer-Integrated Manufacturing, vol. 67, Feb. 2021, Art No. 102034, DOI: 10.1016/j.rcim.2020.102034.
S. J. Moon, J. Kim, H. Yim, Y. Kim, and H. R. Choi, "Real-Time Obstacle Avoidance Using Dual-Type Proximity Sensor for Safe Human-Robot Interaction," IEEE Robotics and Automation Letters, vol. 6, No. 4, pp. 8021-8028, Oct. 2021, DOI: 10.1109/lra.2021.3102318.
M. Lippi and A. Marino, "Human Multi-Robot Safe Interaction: A Trajectory Scaling Approach Based on Safety Assessment," IEEE Transactions on Control Systems Technology, vol. 29, No. 4, pp. 1565-1580, Jul. 2021, DOI: 10.1109/tcst.2020.3009031.
A. D. Ames, X. R. Xu, J. W. Grizzle, and P. Tabuada, "Control Barrier Function Based Quadratic Programs for Safety Critical Systems," IEEE Transactions on Automatic Control, vol. 62, No. 8, pp. 3861-3876, Aug. 2017, DOI: 10.1109/tac.2016.2638961.
Q. Nguyen, and K. Sreenath, "Exponential Control Barrier Functions for Enforcing High Relative-Degree Safety-Critical Constraints," in American Control Conference (ACC), Boston, MA, Jul. 6-8, 2016.

(56) References Cited

OTHER PUBLICATIONS

W. Xiao, and C. Belta, "Control Barrier Functions for Systems with High Relative Degree," in 58th IEEE Conference on Decision and Control (CDC), Nice, France, Dec. 11-13, 2019.
X. Xu , P. Tabuada, J. W. Grizzle, and A. D. Ames, "Robustness of Control Barrier Functions for Safety Critical Control," IFAC-PapersOnLine, vol. 48, No. 27, pp. 54-61, 2015.
M. Jankovic, "Robust control barrier functions for constrained stabilization of nonlinear systems," Automatica, vol. 96, pp. 359-367, Oct. 2018, DOI: 10.1016/j.automatica.2018.07.004.
C. I. G. Chinelato, and B. A. Angelico, "Robust Exponential Control Barrier Functions for Safety-Critical Control," in American Control Conference (ACC), Electr Network, May 25-28, 2021.
K. Garg, and D. Panagou, "Robust Control Barrier and Control Lyapunov Functions with Fixed-Time Convergence Guarantees," in American Control Conference (ACC), Electr Network, May 25-28, 2021.
J. Buch, S. C. Liao, and P. Seiler, "Robust Control Barrier Functions With Sector-Bounded Uncertainties," IEEE Control Systems Letters, vol. 6, pp. 1994-1999, 2022, DOI: 10.1109/lcsys.2021.3136653.
M. T. Mason, "Compliance and Force Control for Computer-Controlled Manipulators," IEEE Transactions on Systems Man and Cybernetics, vol. 11, No. 6, pp. 418-432, 1981, DOI: 10.1109/tsmc.1981.4308708.
M. Stilman, "Global Manipulation Planning in Robot Joint Space With Task Constraints," IEEE Transactions on Robotics, vol. 26, No. 3, pp. 576-584, Jun. 2010, DOI: 10.1109/tro.2010.2044949.
N. M. Ceriani, A. M. Zanchettin, P. Rocco, A. Stolt, and A. Robertsson, "Reactive Task Adaptation Based on Hierarchical Constraints Classification for Safe Industrial Robots," IEEE-ASME Transactions on Mechatronics, vol. 20, No. 6, pp. 2935-2949, Dec. 2015, DOI: 10.1109/tmech.2015.2415462.
T. Flash and N. Hogan, "The Coordination of Arm Movements: An Experimentally Confirmed Mathematical Model," Journal of Neuroscience, vol. 5, No. 7, pp. 1688-1703, 1985, DOI: 10.1523/jneurosci.05-07-01688.1985.
F. Caccavale, C. Natale, B. Siciliano, and L. Villani, "Resolved-acceleration control of robot manipulators: A critical review with experiments," Robotica, vol. 16, pp. 565-573, Sep.-Oct. 1998, DOI: 10.1017/s0263574798000290.
L. Xiao and Y. N. Zhang, "Acceleration-Level Repetitive Motion Planning and Its Experimental Verification on a Six-Link Planar Robot Manipulator," IEEE Transactions on Control Systems Technology, vol. 21, No. 3, pp. 906-914, May 2013, DOI: 10.1109/tcst.2012.2190142.
L. Jin, Z. T. Xie, M. Liu, K. Chen, C. X. Li, and C. G. Yang, "Novel Joint-Drift-Free Scheme at Acceleration Level for Robotic Redundancy Resolution With Tracking Error Theoretically Eliminated," IEEE-ASME Transactions on Mechatronics, vol. 26, No. 1, pp. 90-101, Feb. 2021, DOI: 10.1109/tmech.2020.3001624.
D. S. Guo and Y. N. Zhang, "Acceleration-Level Inequality-Based Man Scheme for Obstacle Avoidance of Redundant Robot Manipulators," IEEE Transactions on Industrial Electronics, vol. 61, No. 12, pp. 6903-6914, Dec. 2014, DOI: 10.1109/tie.2014.2331036.
S. Garrido-Jurado, R. Munoz-Salinas, F. J. Madrid-Cuevas, and M. J. Marin-Jimenez, "Automatic generation and detection of highly reliable fiducial markers under occlusion," Pattern Recognition, vol. 47, No. 6, pp. 2280-2292, Jun. 2014, DOI: 10.1016/j.patcog.2014.01.005.

* cited by examiner

METHOD AND SYSTEM FOR CONTROLLING A ROBOT MANIPULATOR FOR OPERATING IN A SHARED WORKSPACE WITH HUMAN(S)

CROSS-REFERENCE TO RELATED APPLICATION

This application claims the benefit of priority of Singapore patent application Ser. No. 10202204344Y, filed on 25 Apr. 2022, the content of which being hereby incorporated by reference in its entirety for all purposes.

TECHNICAL FIELD

The present invention generally relates to a method of controlling a robot manipulator for operating in a shared workspace with one or more humans, and a controller system thereof, and more particularly, for human-robot interaction (HRI).

BACKGROUND

Recent developments in robot technology enable humans and robots to work side by side in a shared workspace. In manufacturing scenarios, human-robot interaction (HRI) makes it possible to combine complementary abilities of humans and robots, such as the innate flexibility and cognitive skills of the humans with the distinguishing accuracy, speed, and repeatability of the robots, thereby improving the overall efficiency. However, HRI exposes humans to the danger of being hurt by robots, making human safety one of the most important aspects of HRI. To achieve safe HRI, various conventional robot control methods have been developed. Generally, they generate an evasive motion for the robot to avoid collision with a human. The artificial potential field (APF) is a popular conventional method for collision avoidance, and it has inspired many works for safe HRI, such as danger field, general potential energy function, and other variant APFs. In conventional APF-inspired methods, the evasive motion depends on the parameters of the APFs that are set empirically (i.e., the effort for collision avoidance depends on certain empirically selected parameters), so human safety is not always guaranteed. Optimization is another tool to solve the collision avoidance problem. In various conventional optimization-based methods, collision avoidance is achieved by either penalizing small human-robot distance in the cost function or enforcing an inequality constraint. Control barrier functions (CBFs) have been applied to construct the inequality constraint. The CBFs render a safe set forward invariant, thereby can guarantee human safety. However, conventional CBFs formed may only be applied to a specific type of control mode (e.g., joint-velocity control mode) of the robot and cannot be adaptively applied to other types of control modes (e.g., joint acceleration control mode or joint-torque control mode).

Another important aspect of HRI is the task consistency that arises when the robot is executing an evasive motion for collision avoidance with the human. For example, task consistency may require that the execution of a task does not unresumably fail (i.e., the task does not fail in an unresumable manner, that is, the completion of the task can no longer be achieved) due to the evasive motion. In most existing methods for HRI, task consistency is either satisfied or unsatisfied, that is, there is no guarantee that the task consistency is always satisfied. By way of an illustrative example only and without limitation, consider an example task of a robot (or more specifically, a robot manipulator) holding a cup with water at a desired pose (i.e., position and orientation) as shown in FIG. 1A. For this example task, task consistency is satisfied when the human is sufficiently far or away from the robot as shown in FIG. 1A. However, when the human's hand approaches the end effector (EE) of the robot, the end effector deviates from its desired pose or trajectory to avoid the collision with the human in a manner which causes the water to spill from the cup as shown in FIG. 1B. As a result, the task consistency is unsatisfied, whereby the robot's evasive motion has caused the task to fail in an unresumable manner (water already spilled from the cup), that is, unresumable task failure.

Furthermore, commercial robots (or more specifically, robot manipulators) in the current market have different types of control modes. Most robots may be configured to receive a joint-position command (i.e., has a joint-position control mode), while various robots may be configured to receive a joint-velocity command (i.e., has a joint-velocity control mode), a joint-acceleration command (i.e., has a joint-acceleration control mode) and/or a joint-torque command (i.e., has a joint-torque control mode). However, the majority of existing control methods for HRI is configured for a specific type of control mode and cannot adapt to other types of control modes, such as being configured only for joint-velocity control mode, being configured only for joint-acceleration control mode or being configured only for joint-torque control mode. Although certain existing control methods for HRI may be specifically configured for both joint-velocity control mode and joint-torque control mode, the forms of the control law in such existing control methods for such different types of control modes are not uniform and thus the performance may be not consistent.

Accordingly, conventional control methods for robot manipulators for HRI suffer from one or more of the problems discussed above, namely, human safety problem, task consistency problem and different control modes compatibility problem.

A need therefore exists to provide a method of controlling a robot manipulator for operating in a shared workspace with one or more humans and a controller system thereof, that seek to overcome, or at least ameliorate, one or more deficiencies in conventional methods and systems for controlling a robot manipulator, and more particularly, providing an improved method and system for controlling a robot manipulator that seek to simultaneously address or achieve human safety, task consistency and different control modes compatibility. It is against this background that the present invention has been developed.

SUMMARY

According to a first aspect of the present invention, there is provided a method of controlling a robot manipulator for operating in a shared workspace with one or more humans using at least one processor, the method comprising:

obtaining robot state information indicating a current state of the robot manipulator, human state information indicating a current state of the one or more humans, desired trajectory information for a task indicating a current desired trajectory of a component of the robot manipulator to perform the task and degree of freedom classification information for the task indicating a constraint type in trajectory tracking for each of a plurality of degrees of freedom of the component for the task;

determining a safety control set comprising a set of candidate control inputs with respect to a safety condition between one or more selected parts of the robot manipulator and one or more selected parts of the one or more humans using a safety control function based on the robot state information and the human state information;

determining a hard constraint control set comprising a set of candidate control inputs with respect to one or more hard constraints in trajectory tracking respectively in one or more degrees of freedom of the plurality of degrees of freedom of the component for the task using a hard constraint function based on the robot state information, the desired trajectory information of the component for the task and the degree of freedom classification information for the task;

determining a soft constraint control set comprising a set of candidate control inputs with respect to one or more soft constraints in trajectory tracking respectively in one or more degrees of freedom of the plurality of degrees of freedom of the component for the task using a soft constraint function based on the robot state information, the desired trajectory information of the component for the task and the degree of freedom classification information for the task; and performing control input optimization based on the safety control set, the hard constraint control set and the soft constraint control set to determine a control input for controlling the robot manipulator, wherein the safety control function is dependent on the current state of the robot manipulator and the current state of the one or more humans and is configured to determine the safety control set:

based on a control model for the robot manipulator that is dependent on the current state of the robot manipulator, the control input to the robot manipulator and a disturbance input to the robot manipulator, and is configured in a control affine form based on a control mode of the robot manipulator, and for each part pair of one or more part pairs of a selected part of the one or more selected parts of the robot manipulator and a selected part of the one or more selected parts of the one or more humans:

based on a safety distance function associated with the part pair that is dependent on the current state of the robot manipulator and the current state of the one or more humans and corresponds to a control barrier function, and based on a sliding manifold associated with the part pair configured based on the safety distance function associated with the part pair and a relative degree of the safety distance function with respect to the control input to the robot manipulator.

According to a second aspect of the present invention, there is provided a controller system for controlling a robot manipulator for operating in a shared workspace with one or more humans, the controller system comprising:

at least one memory; and at least one processor communicatively coupled to the at least one memory and configured to perform the method of controlling a robot manipulator according to the above-mentioned first aspect of the present invention.

According to a third aspect of the present invention, there is provided a computer program product, embodied in one or more non-transitory computer-readable storage mediums, comprising instructions executable by at least one processor to perform the method of controlling a robot manipulator for operating in a shared workspace with one or more humans according to the above-mentioned first aspect of the present invention.

According to a fourth aspect of the present invention, there is a robot manipulator system comprising:

a robot manipulator configured to operate in a shared workspace with one or more humans; and the controller system according to the above-mentioned second aspect of the present invention communicatively coupled or couplable to the robot manipulator and configured to control the robot manipulator to operate in the shared workspace.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a method of controlling a robot manipulator for operating in a shared workspace with one or more humans, and a controller system thereof.

As discussed in the background, conventional control methods for robot manipulators for human-robot interaction (HRI) suffer from one or more problems, namely, human safety problem, task consistency problem and different control modes compatibility problem. Accordingly, various embodiments of the present invention provide a method of controlling a robot manipulator for operating in a shared workspace with one or more humans and a controller system thereof, that seek to overcome, or at least ameliorate, one or more deficiencies in conventional methods and systems for controlling a robot manipulator, and more particularly, providing an improved method and system for controlling a robot manipulator that seek to simultaneously address or achieve human safety, task consistency and different control modes compatibility.

Figure 2:
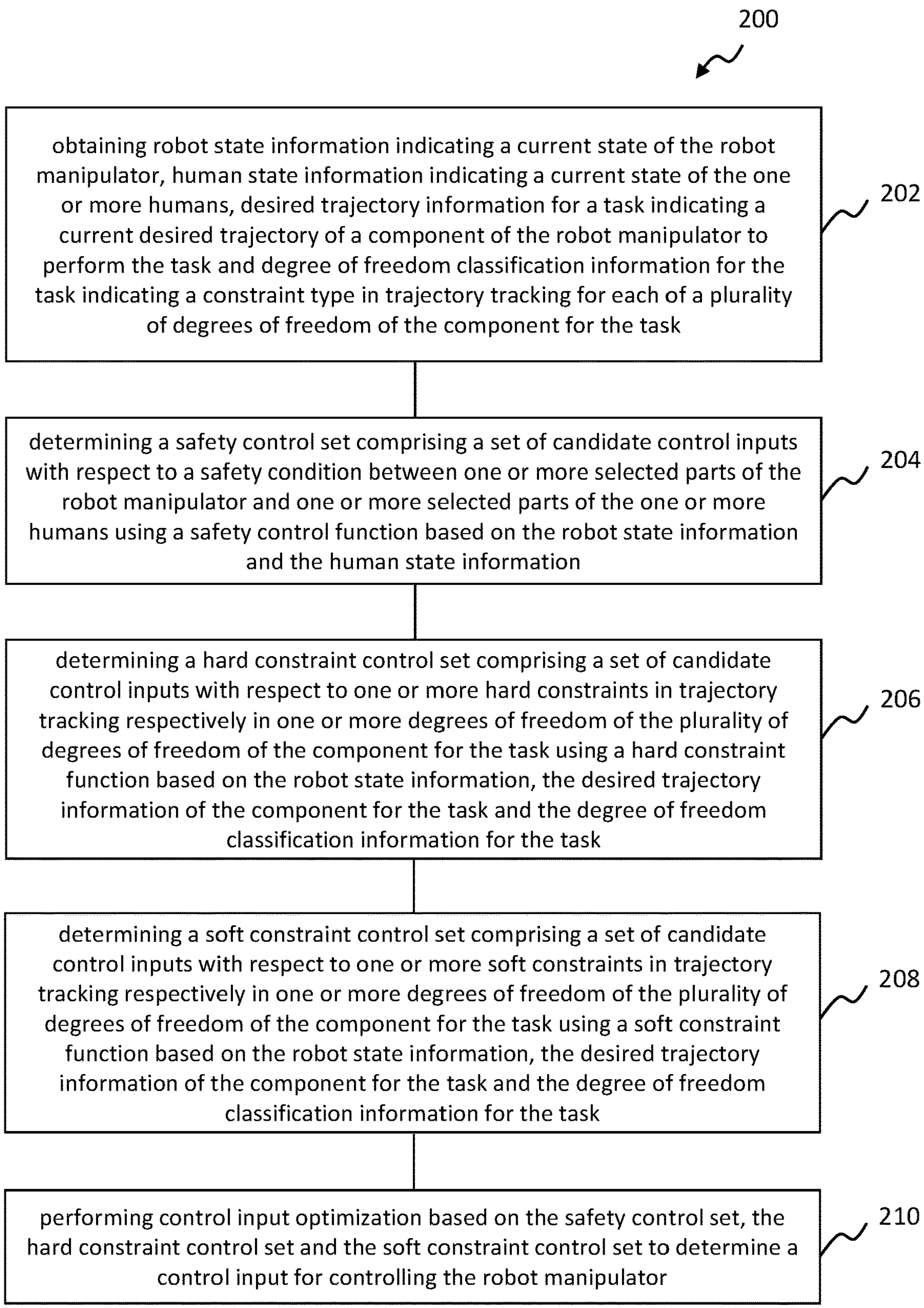
FIG. 2 depicts a schematic flow diagram of a method of controlling a robot manipulator for operating in a shared workspace with one or more humans, according to various embodiments of the present invention.

FIG. 2 depicts a schematic flow diagram of a method 200 of controlling a robot manipulator for operating in a shared workspace with one or more humans, according to various embodiments of the present invention. The method 200 comprises: obtaining (at 202) robot state information indicating a current state of the robot manipulator, human state information indicating a current state of the one or more humans, desired trajectory information for a task indicating a current desired trajectory of a component (e.g., end effector) of the robot manipulator to perform the task and degree of freedom classification information for the task indicating a constraint type in trajectory tracking for each of a plurality of degrees of freedom of the component for the task; determining (at 204) a safety control set comprising a set of candidate control inputs with respect to a safety condition (e.g., for avoiding contact or collision) between one or more selected parts of the robot manipulator and one or more selected parts of the one or more humans using a safety control function based on the robot state information and the human state information; determining (at 206) a hard constraint control set comprising a set of candidate control inputs with respect to one or more hard constraints in trajectory tracking respectively in one or more degrees of freedom of the plurality of degrees of freedom of the component for the task using a hard constraint function based on the robot state information, the desired trajectory information of the component for the task and the degree of freedom classification information for the task; determining (at 208) a soft constraint control set comprising a set of candidate control inputs with respect to one or more soft constraints in trajectory tracking respectively in one or more degrees of freedom of the plurality of degrees of freedom of the component for the task using a soft constraint function based on the robot state information, the desired trajectory information of the component for the task and the degree of freedom classification information for the task; and performing (at 210) control input optimization based on the safety control set, the hard constraint control set and the soft constraint control set to determine a control input for controlling the robot manipulator.

In particular, the safety control function is dependent on the current state of the robot manipulator and the current state of the one or more humans and is configured to determine the safety control set: based on a control model for the robot manipulator that is dependent on the current state of the robot manipulator, the control input to the robot manipulator and a disturbance input to the robot manipulator, and is configured in a control affine form based on a control mode of the robot manipulator, and for each part pair of one or more part pairs of a selected part of the one or more selected parts of the robot manipulator and a selected part of the one or more selected parts of the one or more humans: based on a safety distance function associated with the part pair that is dependent on the current state of the robot manipulator and the current state of the one or more humans and corresponds to a control barrier function, and based on a sliding manifold associated with the part pair configured based on the safety distance function associated with the part pair and a relative degree of the safety distance function with respect to the control input to the robot manipulator. Therefore, according to various embodiments, the safety control function is configured to determine the safety control set based on the control model for the robot manipulator and for the above-mentioned each part pair, based on the safety distance function and the sliding manifold associated with the part pair.

It will be appreciated by a person skilled in the art that the above-mentioned one or more selected parts of the one or more humans may be represented by corresponding one or more markers (e.g., tags) attached or affixed to the one or more selected parts of the one or more humans, depending on the type of human motion detection technology employed for tracking the motion of the one or more selected parts of the one or more humans. On the other hand, the one or more markers may not be necessary if they are not required by the type of human motion detection technology employed for tracking the motion of the one or more selected parts of the one or more humans.

It will also be appreciated by a person skilled in the art that the above-mentioned task performed may be a sub-task of a task. Therefore, for example, the method 200 of controlling the robot manipulator may be performed with respect to each of one or more sub-tasks of a task, as desired or as appropriate, according to various embodiments of the present invention.

Accordingly, the method 200 of controlling a robot manipulator according to various embodiments of the present invention advantageously simultaneously addresses or achieves human safety, task consistency and different control modes compatibility. For example, the safety control function is configured to determine the safety control set based on a control model for the robot manipulator that is configured in a control affine form based on the control mode of the robot manipulator (i.e., the control mode in which the robot manipulator is configured to operate). Therefore, different control models for different types of control modes (e.g., joint-velocity control mode, joint-acceleration control mode and joint-torque control mode) are advantageously unified to the control affine form according to various embodiments of the present invention, thereby facilitating or enabling the method 200 in addressing the human safety problem regardless of which one of the different types of control modes the robot manipulator is configured to operate in, thereby also addressing the different control modes compatibility problem.

In addition, for the above-mentioned each part pair of a selected part of the robot manipulator and a selected part of one or more humans, the safety control function is configured to determine the safety control set further based the above-mentioned sliding manifold associated with the part pair configured based on the above-mentioned safety distance function (configured as a control barrier function) associated with the part pair and a relative degree of the safety distance function with respect to the control input to the robot manipulator. Therefore, human safety can be directly tracked or monitored using the safety distance function defined as a control barrier function to directly track or monitor a distance between the part pair regardless of the relative degree of the safety distance function with respect to the control input to the robot manipulator since the sliding manifold is advantageously configured to adapt the safety distance function according to the relative degree of the safety distance function with respect to the control input to the robot manipulator. As a result, the sliding manifold can be directly controlled for human safety.

Furthermore, hard constraint control set with respect to hard constraint(s) in trajectory tracking in degree(s) of freedom of the component (e.g., end effector) for the task and soft constraint control set with respect to soft constraint(s) in trajectory tracking in degree(s) of freedom of the component are determined for facilitating or enabling hierarchical task consistency. In particular, by performing control input optimization on the safety control set, the hard constraint control set and the soft constraint control set to determine the control input for controlling the robot manipulator, full task consistency is ensured as long as it is achievable, while guaranteeing human safety and primary task consistency.

Therefore, the method 200 of controlling a robot manipulator according to various embodiments of the present invention advantageously simultaneously addresses or achieves human safety, task consistency and different control modes compatibility. These advantages or technical effects, and/or other advantages or technical effects, will become more apparent to a person skilled in the art as the method 200 of controlling a robot manipulator, as well as the corresponding controller system for controlling a robot manipulator, is described in more detail according to various embodiments and example embodiments of the present invention.

In various embodiments, the control model for the robot manipulator is configured in the control affine form according to the control mode of the robot manipulator. In various embodiments, the control mode of the robot manipulator is any one of a joint-position control mode, a joint-velocity control mode, a joint-acceleration control mode and a joint-torque control mode. That is, the robot manipulator may be configured to operate in any one of the different types of control modes, and the control model for the robot manipulator is configured in the control affine form according to the control mode which the robot manipulator is operating in.

In various embodiments, the safety distance function associated with the part pair is configured based on a distance function configured to represent a distance between the selected part of the robot manipulator and the selected part of the one or more humans of the part pair and a predefined minimum safety distance relating to the safety condition between the selected part of the robot manipulator and the selected part of the one or more humans of the part pair.

In various embodiments, the sliding manifold associated with the part pair is configured based on the relative degree of the safety distance function associated with the part pair with respect to the control input to the robot manipulator such that the sliding manifold has a relative degree of one with respect to the control input. Therefore, the sliding manifold is advantageously configured to adapt the safety distance function according to the relative degree of the safety distance function with respect to the control input to the robot manipulator. Because of this adaptability, the sliding manifold can be directly controlled for human safety regardless of the relative degree of the safety distance function with respect to the control input to the robot manipulator.

In various embodiments, the safety control function is configured to determine the safety control set such that for the above-mentioned each part pair, the safety distance function associated with the part pair produces a value of greater than or equal to zero for all candidate control inputs in the safety control set regardless of the disturbance input in the control model. In this regard, it will be appreciated by a person skilled in the art that the safety distance function may be subjected to an error bias, such as caused by the input disturbance and the initial value of the safety distance function.

In various embodiments, the safety control function comprises a first parameter, a second parameter and a third parameter. In this regard, the first and second parameters are each configured based on the control model for the robot manipulator, the safety distance function associated with the above-mentioned each part pair and the control mode of the robot manipulator. Furthermore, the third parameter is configured based on the sliding manifold associated with the above-mentioned each part pair.

In various embodiments, the safety control function is configured to determine the safety control set such that for each candidate control input in the safety control set, the first parameter multiplied by the candidate control input plus the second parameter and the third parameter is greater than or equal to zero.

In various embodiments, the hard constraint function is dependent on the current state of the robot manipulator and is configured to determine the hard constraint control set: based on the control model for the robot manipulator, and for each of the one or more degrees of freedom of the component classified as a hard constraint degree of freedom for the task based on the degree of freedom classification information for the task: based on a hard trajectory tracking error function associated with the hard constraint degree of freedom that is dependent on the current state of the robot manipulator, and based on a sliding manifold associated with the hard constraint degree of freedom configured based on the hard trajectory tracking error function associated with the hard constraint degree of freedom and a relative degree of the hard trajectory tracking error function with respect to the control input to the robot manipulator. Therefore, according to various embodiments, the hard constraint function is configured to determine the hard constraint control set based on the control model for the robot manipulator and for each of the one or more degrees of freedom of the component classified as a hard constraint degree of freedom for the task, based on the hard trajectory tracking error function and the sliding manifold associated with the hard constraint degree of freedom.

Accordingly, for each of the one or more degrees of freedom of the component classified as a hard constraint degree of freedom for the task, the hard constraint function is configured to determine the hard constraint control set based on the above-mentioned sliding manifold associated with the hard constraint degree of freedom configured based on the hard trajectory tracking error function associated with the hard constraint degree of freedom and the relative degree of the hard trajectory tracking error function with respect to the control input to the robot manipulator. Therefore, trajectory tracking error in the hard constraint degree of freedom is advantageously directly tracked or monitored using the hard trajectory tracking error function for controlling the robot manipulator with respect to the hard constraint degree of freedom regardless of the relative degree of the hard trajectory tracking error function with respect to the control input to the robot manipulator since the sliding manifold is advantageously configured to adapt the hard trajectory tracking error function according to the relative degree of the hard trajectory tracking error function with respect to the control input to the robot manipulator.

In various embodiments, similarly, the soft constraint function is dependent on the current state of the robot manipulator and is configured to determine the soft constraint control set: based on the control model for the robot manipulator, and for each of the one or more degrees of freedom of the component classified as a soft constraint degree of freedom for the task based on the degree of freedom classification information for the task: based on a soft trajectory tracking error function associated with the soft constraint degree of freedom that is dependent on the current state of the robot manipulator, and based on a sliding manifold associated with the soft constraint degree of freedom configured based on the soft trajectory tracking error function associated with the soft constraint degree of freedom and a relative degree of the soft trajectory tracking error function with respect to the control input to the robot manipulator. Therefore, according to various embodiments, the soft constraint function is configured to determine the soft constraint control set based on the control model for the robot manipulator and for each of the one or more degrees of freedom of the component classified as a soft constraint degree of freedom for the task, based on the soft trajectory tracking error function and the sliding manifold associated with the soft constraint degree of freedom.

Accordingly, for each of the one or more degrees of freedom of the component classified as a soft constraint degree of freedom for the task, the soft constraint function is configured to determine the soft constraint control set based on the above-mentioned sliding manifold associated with the soft constraint degree of freedom configured based on the soft trajectory tracking error function associated with the soft constraint degree of freedom and the relative degree of the soft trajectory tracking error function with respect to the control input to the robot manipulator. Therefore, trajectory tracking error in the soft constraint degree of freedom is advantageously directly tracked or monitored using the soft trajectory tracking error function for controlling the robot manipulator with respect to the soft constraint degree of freedom regardless of the relative degree of the soft trajectory tracking error function with respect to the control input to the robot manipulator since the sliding manifold is advantageously configured to adapt the soft trajectory tracking error function according to the relative degree of the soft trajectory tracking error function with respect to the control input to the robot manipulator.

In various embodiments, the hard trajectory tracking error function associated with the hard constraint degree of freedom is configured to represent a trajectory tracking error of the component in the hard constraint degree of freedom based on the current state of the robot manipulator and the current desired trajectory of the component of the robot manipulator. In various embodiments, similarly, the soft trajectory tracking error function associated with the soft constraint degree of freedom is configured to represent a trajectory tracking error of the component in the soft constraint degree of freedom based on the current state of the robot manipulator and the current desired trajectory of the component of the robot manipulator.

In various embodiments, the sliding manifold associated with the hard constraint degree of freedom is configured based on the relative degree of the hard trajectory tracking error function with respect to the control input to the robot manipulator such that the sliding manifold has a relative degree of one with respect to the control input. In various embodiments, similarly, the sliding manifold associated with the soft constraint degree of freedom is configured based on the relative degree of the soft trajectory tracking error function with respect to the control input to the robot manipulator such that the sliding manifold has a relative degree of one with respect to the control input. Therefore, the sliding manifold is advantageously configured to adapt the hard/soft trajectory tracking error function according to the relative degree of the hard/soft trajectory tracking error function with respect to the control input to the robot manipulator. Because of this adaptability, the sliding manifold can be directly controlled for trajectory tracking in hard/soft degrees of freedom of the component for the task regardless of the relative degree of the hard/soft trajectory tracking error function with respect to the control input to the robot manipulator.

In various embodiments, the hard constraint function is configured to determine the hard constraint control set such that for the above-mentioned each hard constraint degree of freedom for the task, the hard trajectory tracking error function associated with the hard constraint degree of freedom produces a value of zero for all candidate control inputs in the hard constraint control set. In various embodiments, similarly, the soft constraint function is configured to determine the soft constraint control set such that for the above-mentioned each soft constraint degree of freedom for the task, the soft trajectory tracking error function associated with the soft constraint degree of freedom produces a value of zero for all candidate control inputs in the soft constraint control set. In this regard, it will be appreciated by a person skilled in the art that the hard/soft trajectory tracking error function may be subjected to an error bias, such as caused by the input disturbance and the initial value of the hard/soft trajectory tracking error function.

In various embodiments, the hard constraint function comprises a first parameter, a second parameter and a third parameter. In this regard, the first and second parameters are each configured based on the control model for the robot manipulator, the hard trajectory tracking error function associated with the above-mentioned each hard constraint degree of freedom for the task and the control mode of the robot manipulator and the third parameter is configured based on the sliding manifold associated with the above-mentioned each hard constraint degree of freedom for the task.

In various embodiments, the soft constraint function comprises a first parameter, a second parameter and a third parameter. In this regard, the first and second parameters are each configured based on the control model for the robot manipulator, the soft trajectory tracking error function associated with the above-mentioned each soft constraint degree of freedom for the task and the control mode of the robot manipulator and the third parameter is configured based on the sliding manifold associated with the above-mentioned each soft constraint degree of freedom for the task.

In various embodiments, the hard constraint function is configured to determine the hard constraint control set such that for each candidate control input in the hard constraint control set, the first parameter multiplied by the candidate control input plus the second parameter and the third parameter equals to zero. In various embodiments, similarly, the soft constraint function is configured to determine the soft constraint control set such that for each candidate control input in the soft constraint control set, the first parameter multiplied by the candidate control input plus the second parameter and the third parameter equals to zero.

In various embodiments, the degree of freedom classification information for the task indicating the constraint type in trajectory tracking for each of the plurality of degrees of freedom of the component for the task is with respect to a plurality of degrees of freedom of a task frame defined for the task.

In various embodiments, the plurality of degrees of freedom of the component comprises six degrees of freedom.

In various embodiments, the above-mentioned performing control input optimization comprises selecting a first candidate control input from an intersection of the safety control set and the hard constraint control set that has a minimum distance to the soft constraint control set. As a result, trajectory tracking in the soft degree(s) of freedom of the component for the task is ensured as long as it is achievable, thus achieving full task consistency. Otherwise, the trajectory tracking error in the soft degree(s) of freedom is minimized. Therefore, full task consistency is ensured as long as it is achievable, while guaranteeing human safety and primary task consistency.

In various embodiments, the above-mentioned performing control input optimization further comprises selecting a second candidate control input from an intersection of the safety control set and the hard constraint control set such that the second candidate control input has a same distance to the soft constraint control set as the first candidate control input and minimizes joint position deviation of the robot manipulator from an initial joint position thereof. Accordingly, in the case there is at least one redundant (e.g., free) degree of freedom of the component for the task, the motion of the robot manipulator is advantageously stabilized to avoid undesirable or unexpected behavior.

In various embodiments, the control input for controlling the robot manipulator is set as the first candidate control input based on determining that the component has no redundant (e.g., free) degree of freedom. In various embodiments, the control input for controlling the robot manipulator is set as the second candidate control input based on determining that the component has at least one redundant (e.g., free) degree of freedom.

In various embodiments, the method 200 further comprises converting the control input for controlling the robot manipulator to a joint-position control input based on determining that the robot manipulator has a joint-position control mode (i.e., operates in a joint-position control mode). For example, the control input may have been a joint-velocity control input, a joint-acceleration control input or a joint-torque control input.

In various embodiments, the above-mentioned component of robot manipulator is an end effector.

Figure 3:
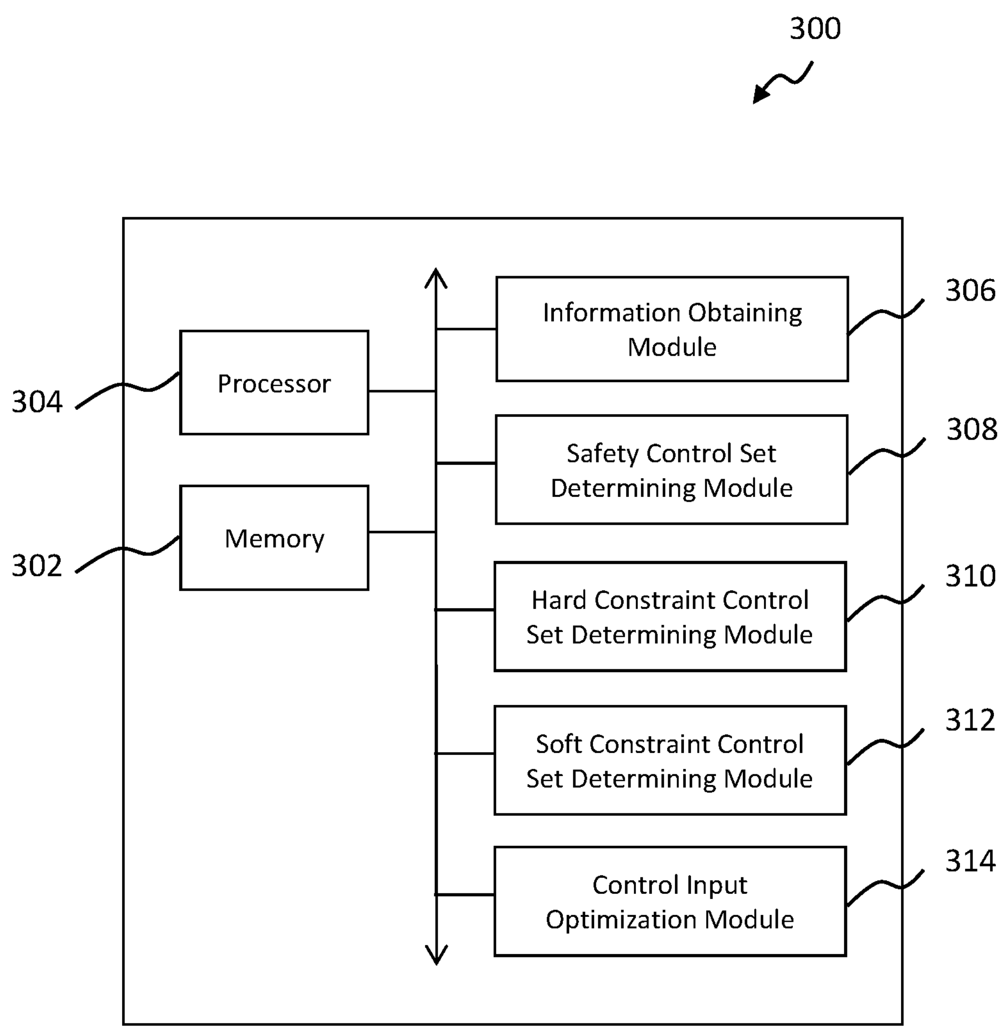
FIG. 3 depicts a schematic block diagram of a controller system for controlling a robot manipulator for operating in a shared workspace with one or more humans, according to various embodiments of the present invention.

FIG. 3 depicts a schematic block diagram of a controller system 300 for controlling a robot manipulator for operating in a shared workspace with one or more humans according to various embodiments of the present invention, corresponding to the above-mentioned method 200 of controlling a robot manipulator as described hereinbefore according with reference to FIG. 2 according to various embodiments of the present invention. The controller system 300 comprises: at least one memory 302; and at least one processor 304 communicatively coupled to the at least one memory 302 and configured to perform the above-mentioned method 200 of controlling a robot manipulator as described hereinbefore according with reference to FIG. 2 according to various embodiments of the present invention. Accordingly, the at least one processor 304 is configured to: obtain robot state information indicating a current state of the robot manipulator, human state information indicating a current state of the one or more humans, desired trajectory information for a task indicating a current desired trajectory of a component of the robot manipulator to perform the task and degree of freedom classification information for the task indicating a constraint type in trajectory tracking for each of a plurality of degrees of freedom of the component for the task; determine a safety control set comprising a set of candidate control inputs with respect to a safety condition between one or more selected parts of the robot manipulator and one or more selected parts of the one or more humans using a safety control function based on the robot state information and the human state information; determine a hard constraint control set comprising a set of candidate control inputs with respect to one or more hard constraints in trajectory tracking respectively in one or more degrees of freedom of the plurality of degrees of freedom of the component for the task using a hard constraint function based on the robot state information, the desired trajectory information of the component for the task and the degree of freedom classification information for the task; determine a soft constraint control set comprising a set of candidate control inputs with respect to one or more soft constraints in trajectory tracking respectively in one or more degrees of freedom of the plurality of degrees of freedom of the component for the task using a soft constraint function based on the robot state information, the desired trajectory information of the component for the task and the degree of freedom classification information for the task; and perform control input optimization based on the safety control set, the hard constraint control set and the soft constraint control set to determine a control input for controlling the robot manipulator.

As described hereinbefore, the safety control function is dependent on the current state of the robot manipulator and the current state of the one or more humans and is configured to determine the safety control set: based on a control model for the robot manipulator that is dependent on the current state of the robot manipulator, the control input to the robot manipulator and a disturbance input to the robot manipulator (e.g., caused by the one or more selected parts of the one or more humans), and is configured in a control affine form based on a control mode of the robot manipulator, and for each part pair of one or more part pairs of a selected part of the one or more selected parts of the robot manipulator and a selected part of the one or more selected parts of the one or more humans: based on a safety distance function associated with the part pair that is dependent on the current state of the robot manipulator and the current state of the one or more humans and corresponds to a control barrier function, and based on a sliding manifold associated with the part pair configured based on the safety distance function associated with the part pair and a relative degree of the safety distance function with respect to the control input to the robot manipulator.

It will be appreciated by a person skilled in the art that the at least one processor 304 may be configured to perform various functions or operations through set(s) of instructions (e.g., software modules) executable by the at least one processor 304 to perform various functions or operations. Accordingly, as shown in FIG. 3, the controller system 300 may comprise: an information obtaining module (or an information obtaining circuit) 306 configured to perform the above-mentioned obtaining (at 202) robot state information indicating a current state of the robot manipulator, human state information indicating a current state of the one or more humans, desired trajectory information for a task indicating a current desired trajectory of a component of the robot manipulator to perform the task and degree of freedom classification information for the task indicating a constraint type in trajectory tracking for each of a plurality of degrees of freedom of the component for the task; a safety control set determining module (or a safety control set determining circuit) 308 configured to perform the above-mentioned determining (at 204) a safety control set comprising a set of candidate control inputs with respect to a safety condition between one or more selected parts of the robot manipulator and one or more selected parts of the one or more humans using a safety control function based on the robot state information and the human state information; a hard constraint control set determining module (or a hard constraint control set determining circuit) 310 configured to perform the above-mentioned determining (at 206) a hard constraint control set comprising a set of candidate control inputs with respect to one or more hard constraints in trajectory tracking respectively in one or more degrees of freedom of the plurality of degrees of freedom of the component for the task using a hard constraint function based on the robot state information, the desired trajectory information of the component for the task and the degree of freedom classification information for the task; a soft constraint control set determining module (or a soft constraint control set determining circuit) 312 configured to perform the above-mentioned determining (at 208) a soft constraint control set comprising a set of candidate control inputs with respect to one or more soft constraints in trajectory tracking respectively in one or more degrees of freedom of the plurality of degrees of freedom of the component for the task using a soft constraint function based on the robot state information, the desired trajectory information of the component for the task and the degree of freedom classification information for the task; and a control input optimization module (or a control input optimization circuit) 314 configured to perform the above-mentioned control input optimization (at 210) based on the safety control set, the hard constraint control set and the soft constraint control set to determine a control input for controlling the robot manipulator.

It will be appreciated by a person skilled in the art that the above-mentioned modules are not necessarily separate modules, and two or more modules may be realized by or implemented as one functional module (e.g., a circuit or a software program) as desired or as appropriate without deviating from the scope of the present invention. For example, two or more modules, such as the information obtaining module 306, the safety control set determining module 308, the hard constraint control set determining module 310, the soft constraint control set determining module 312 and the control input optimization module 314, may be realized (e.g., compiled together) as one executable software program (e.g., software application or simply referred to as an "app"), which for example may be stored in the at least one memory 302 and executable by the at least one processor 304 to perform various functions/operations as described herein according to various embodiments of the present invention.

In various embodiments, the controller system 300 for controlling a robot manipulator corresponds to the method 200 of controlling a robot manipulator as described hereinbefore with reference to FIG. 2 according to various embodiments, therefore, various functions or operations configured to be performed by the least one processor 304 may correspond to various steps or operations of the method 200 of controlling a robot manipulator as described hereinbefore according to various embodiments, and thus need not be repeated with respect to the controller system 300 for controlling a robot manipulator for clarity and conciseness. In other words, various embodiments described herein in context of the methods are analogously valid for the corresponding systems, and vice versa.

For example, in various embodiments, the at least one memory 302 may have stored therein the information obtaining module 306, the safety control set determining module 308, the hard constraint control set determining module 310, the soft constraint control set determining module 312 and/or the control input optimization module 314, which respectively correspond to various steps (or operations or functions) of the method 200 of controlling a robot manipulator as described herein according to various embodiments, which are executable by the at least one processor 304 to perform the corresponding functions or operations as described herein.

A computing system, a controller, a microcontroller or any other system providing a processing capability may be provided according to various embodiments in the present disclosure. Such a system may be taken to include one or more processors and one or more computer-readable storage mediums. For example, the controller system 300 for controlling a robot manipulator described hereinbefore may include at least one processor (or controller) 304 and at least one computer-readable storage medium (or memory) 302 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions may also be understood as a "circuit" in accordance with various embodiments. Similarly, a "module" may be a portion of a system according to various embodiments and may encompass a "circuit" as described above, or may be understood to be any kind of a logic-implementing entity.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, description or discussions utilizing terms such as "controlling", "obtaining", "determining", "performing", "optimizing", "selecting", "converting" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system (e.g., which may also be embodied as a device or an apparatus), such as the controller system 300 for controlling a robot manipulator, for performing various operations/functions of various methods described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform various method steps may be appropriate.

In addition, the present specification also at least implicitly discloses a computer program or software/functional module, in that it would be apparent to the person skilled in the art that individual steps of various methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention. It will be appreciated by a person skilled in the art that various modules described herein (e.g., the information obtaining module 306, the safety control set determining module 308, the hard constraint control set determining module 310, the soft constraint control set determining module 312 and/or the control input optimization module 314) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a computer. The computer program when loaded and executed on such the computer effectively results in a system or an apparatus that implements various steps of methods described herein.

In various embodiments, there is provided a computer program product, embodied in one or more computer-readable storage mediums (non-transitory computer-readable storage medium(s)), comprising instructions (e.g., the information obtaining module 306, the safety control set determining module 308, the hard constraint control set determining module 310, the soft constraint control set determining module 312 and/or the control input optimization module 314) executable by one or more computer processors to perform the method 200 of controlling a robot manipulator, as described herein with reference to FIG. 2 according to various embodiments. Accordingly, various computer programs or modules described herein may be stored in a computer program product receivable by a system therein, such as the controller system 300 for controlling a robot manipulator as shown in FIG. 3, for execution by at least one processor 304 of the controller system 300 to perform various functions or operations.

Software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 4:
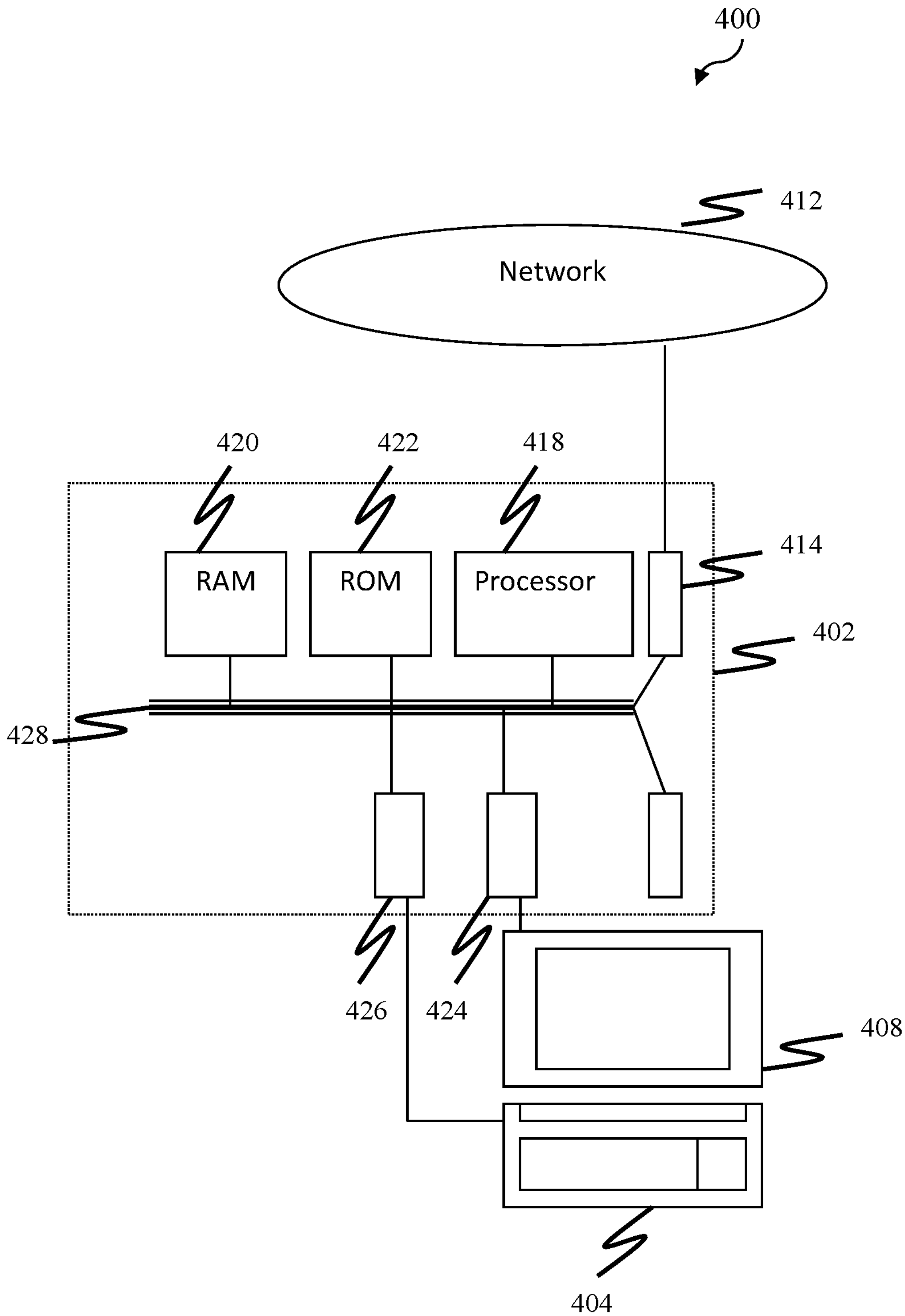
FIG. 4 depicts a schematic block diagram of an exemplary computer system which may be used to realize or implement the controller system for controlling a robot manipulator for operating in a shared workspace with one or more humans, according to various embodiments of the present invention.

In various embodiments, the controller system 300 for controlling a robot manipulator may be realized by any computer system (e.g., desktop or portable computer system) including at least one processor and at least one memory, such as an example computer system 400 as schematically shown in FIG. 4 as an example only and without limitation. Various methods/steps or functional modules may be implemented as software, such as a computer program being executed within the computer system 400, and instructing the computer system 400 (in particular, one or more processors therein) to conduct various functions or operations as described herein according to various embodiments. The computer system 400 may comprise a system unit 402, one or more input devices 404 such as a keyboard, a touchscreen and/or a mouse, and a plurality of output devices such as a display 408. The system unit 402 may be connected to a computer network 412 via a suitable transceiver device 414, to enable access to e.g., the Internet or other network systems such as Local Area Network (LAN) or Wide Area Network (WAN). The system unit 402 may include a processor 418 for executing various instructions, a Random Access Memory (RAM) 420 and a Read Only Memory (ROM) 422. The system unit 402 may further include a number of Input/Output (I/O) interfaces, for example I/O interface 424 to the display device 408 and I/O interface 426 to the one or more input devices 404. The components of the system unit 302 typically communicate via an interconnected bus 428 and in a manner known to a person skilled in the art.

Figure 5:
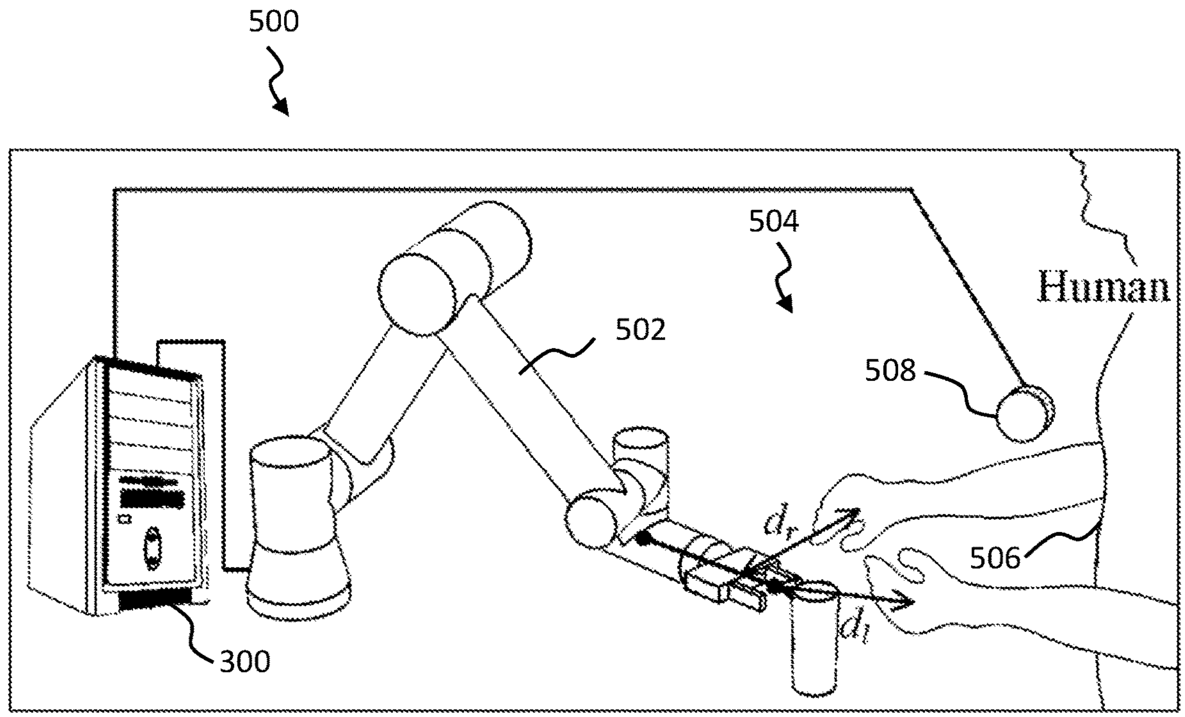
FIG. 5 depicts a schematic drawing of a robot manipulator system, according to various embodiments of the present invention.

FIG. 5 depicts a schematic drawing of a robot manipulator system 500 according to various embodiments of the present invention. The robot manipulator system 500 comprises: a robot manipulator 502 configured to operate in a shared workspace 504 with one or more humans 506; and the controller system 300 as described hereinbefore with reference to FIG. 3 according to various embodiments communicatively coupled or couplable to the robot manipulator 502 and configured to control the robot manipulator 502 to operate in the shared workspace 504. In various embodiments, the robot manipulator system 500 may further comprise a sensor system 508 configured to generate one or more types of sensor data. For example, the sensor system 508 may comprise one or more types of sensors for sensing a surrounding environment for generating one or more types of sensor data, respectively. For example and without limitation, the sensor system 508 may include one or more distance sensors (e.g., LiDAR sensor(s)) configured to generate sensor data relating to the current state of the one or more humans 506 and based on which the human state information may be obtained.

It will be appreciated by a person skilled in the art that the present invention is not limited to any particular type of robot manipulator 502 as long as the robot manipulator 502 can be controlled by the controller system 300 to operate in the shared workspace 504 with one or more humans 506 according to various embodiments of the present invention. Similarly, it will be appreciated by a person skilled in the art that the present invention is not limited to any particular type of sensor system 508 as long as the human state information indicating the current state of the one or more humans 506 as described according to various embodiments of the present invention can be obtained based on the sensor data generated. Furthermore, it will be appreciated by a person skilled in the art that the controller system 300 may be communicatively coupled or couplable to the robot manipulator 502 and/or the sensor system 508 based on communication protocols or technologies known in the art, including wired and/or wireless communication networks, such as but not limited to, Ethernet, cellular or mobile communication network (e.g., 3G, 4G, 5G or higher generation mobile communication network), Wi-Fi, Bluetooth, wired or wireless sensor network, wired or wireless personal or local area network and so on. Still further, in various embodiments, the controller system 300 may be integrated in the robot manipulator 502 (e.g., instead of being separate as shown in FIG. 5).

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not limit the quantity or order of such elements or features, unless stated or the context requires otherwise. For example, such designations may be used herein as a convenient way of distinguishing between two or more elements or instances of an element. Thus, a reference to first and second elements does not necessarily mean that only two elements can be employed, or that the first element must precede the second element. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to a method of controlling a robot manipulator for operating in a shared workspace with one human for clarity and conciseness. It will be understood by a person skilled in the art that the robot manipulator is not limited to operating in the shared workspace with one human and may interact with multiple humans in the shared workspace as desired or as appropriate without going beyond the scope of the present invention.

Human-robot interaction (HRI) enables the combination of complementary abilities of humans and robots, thereby promoting efficient manufacturing. However, as discussed in the background, conventional control methods for robot manipulators for HRI suffer from one or more problems, namely, human safety problem, task consistency problem and different control modes compatibility problem, which hinder the practical application of HRI in manufacturing scenarios. In particular, various conventional control methods for HRI still suffer from problems including:

1) Compatibility problem: for example, the conventional control method may generate a control input for each joint that is either position, velocity, acceleration or torque, but the robot manipulator may require a different control input;
2) Safety-Guarantee problem: for example, various example embodiments found that in various conventional control methods, the human-robot distance is not directly controlled and the human safety is thus not guaranteed. For example, in artificial potential field (APF)-based methods, the effort for collision avoidance depends on some empirically selected parameters, and the human-robot distance is not directly controlled, so human safety is not guaranteed; and
3) Task-Consistency problem: for example, the robot manipulator may abandon its task in an unresumable manner in order to avoid collision with human, leading to failure of the task. For example, the robot manipulator may execute an evasive motion for collision avoidance when the human approaches. However, the evasive motion may be inconsistent with the robot manipulator's task resulting in unresumable task failure.

Accordingly, various example embodiments of the present invention provide a method of controlling a robot manipulator for operating in a shared workspace with a human and a controller system thereof, that seek to overcome, or at least ameliorate, one or more deficiencies in conventional methods and systems for controlling a robot manipulator, and more particularly, providing an improved method and system for controlling a robot manipulator that seek to simultaneously address or achieve human safety, task consistency and different control modes compatibility.

In this regard, according to various example embodiments, a universal control method or framework with guaranteed human safety and hierarchical task consistency is provided. The framework is universal as it can adapt to different types of control modes of commercial robots (or more specifically, robot manipulators), for example, position-input control mode (or joint-position control mode), velocity-input control mode (or joint-velocity control mode), acceleration-input mode (or joint-acceleration control mode) and torque-input mode (or joint-torque control mode). For example, as discussed in the background, commercial robot manipulators in the current market have different types of control modes. However, the majority of existing control methods for HRI is configured for a specific type of control mode and cannot adapt to other types of control modes, such as being configured only for joint-velocity control mode, being configured only for joint-acceleration control mode or being configured only for joint-torque control mode. In contrast, various example embodiments of the present invention advantageously provide a universal control method or framework for controlling robot manipulators that is adaptive to, or compatible with, different types of control modes.

Various example embodiments further introduce a sliding mode control barrier function (SMCBF) that uses a sliding mode to advantageously deal with different types of control modes and reject input disturbance, so that human safety can be guaranteed by keeping a set of control barrier functions positive. In this regard, in various example embodiments, the human-robot distance is explicitly formulated (e.g., corresponding to the safety distance function as described hereinbefore according to various embodiments) and a sliding manifold is defined to keep the distance above a safe value regardless of different control modes in the presence of input disturbance (e.g., caused by the human operating in the shared workspace).

In addition, various example embodiments provide hierarchical task consistency based on defining hard constraint (s) and soft constraint(s) in trajectory tracking systematically. In particular, the hard constraint(s) are provided to ensure primary task consistency that keeps the task resumable, while the soft constraint(s) together with the hard constraint(s) are provided to ensure full task consistency as long as it is achievable. Control input optimizations are then employed to ensure full task consistency whenever possible while guaranteeing human safety and primary task consistency. Accordingly, task consistency is satisfied hierarchically by defining hard and soft constraints in a systematic way and using optimization techniques. As a result, when the human (e.g., hand(s) thereof) approaches the robot manipulator, the robot manipulator conducts an evasive motion while keeping the task resumable, and when the human (e.g., hand(s) thereof) retracts, the robot manipulator resumes its task automatically.

Accordingly, various example embodiments of the present invention advantageously provide a universal control method or framework for controlling robot manipulators (e.g., commercial robot manipulators) that is adaptable to, or compatible with, various different types of control modes while simultaneously addressing or solving two conflicting issues or problems of close HRI, namely, human safety and task consistency. Therefore, various example embodiments of the present invention advantageously solve a technical challenge of providing a universal control framework that ensures human safety and task consistency during HRI. For example, the control method avoids collision with human while considering constraints of the robot manipulator's task, thereby achieving safe and efficient HRI.

For better understanding, three main contributions associated with the universal control method will now be described in further details below according to various example embodiments of the present invention.

Firstly, a SMCBF is provided according to various example embodiments of the present invention to ensure human safety, which is an inequality-based control objective. Various example embodiments note that traditional sliding mode control (SMC) can deal with different relative degrees and reject disturbance but cannot deal with inequality-based objectives. Meanwhile, various example embodiments further note that traditional CBF is dedicated to inequality-based control objectives, but it is required to be of relative degree one with respect to the control input, which means that it may only apply to joint-velocity control mode and is not adaptive to other types of control modes. Exponential CBF and high order CBF are capable of different relative degrees, but they do not consider disturbance. In contrast, the SMCBF according to various example embodiments combines the advantages of SMC and CBF and addresses the above-mentioned problems, namely, human safety problem, task consistency problem and different control modes compatibility problem. In this regard, various example embodiments advantageously use a sliding manifold to formulate a robust control term that rejects disturbance while constraining the state of the robot manipulator on the safe side of a sliding surface, thereby guaranteeing inequality-based control objectives (e.g., human safety) regardless of disturbance and different relative degrees.

According to various example embodiments, in SMC, a sliding manifold is constructed according to the relative degree of the control objective, so that the control system can track the desired value regardless of its relative degree and external disturbance as long as the state is on the sliding manifold. In CBF, a barrier of the control objective is defined, and the control objective can be constrained within the barrier as long as the control input is within an admissible control set. The control system is required to be of relative degree one with respect to the control input. In this regard, various example embodiments advantageously combine and define the SMC and CBF to produce a SMCBF for ensuring human safety while being adaptable or compatible to different types of control modes. In particular, a sliding manifold is constructed to modify or convert the CBF (e.g., corresponding to the safety distance function as described hereinbefore according to various embodiments) into a SMCBF and provides a safety control set that can constrain the state of the robot manipulator on the sliding manifold in presence of input disturbance. As a result, the control system, regardless of its relative degree, is constrained within the barrier as long as the state of the robot manipulator is on the sliding manifold. Therefore, according to various example embodiments, human safety can be guaranteed by defining a set of uniform SMCBFs (e.g., one respective SMCBF for each part pair of a selected part of the robot manipulator and a selected part of the human) regardless of robot control modes (e.g., regardless of a joint-position control mode, a joint-velocity control mode, a joint-acceleration control mode or a joint-torque control mode).

Figure 1A:
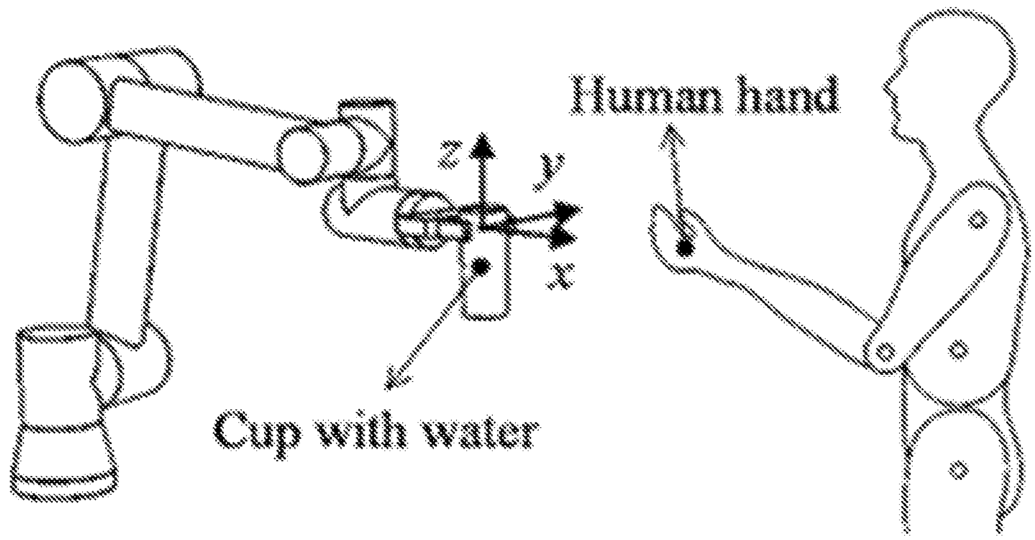
FIGS. 1A and 1B depict a schematic drawing illustrating an example task of a robot manipulator with human-robot interaction (HRI)
Figure 1B:
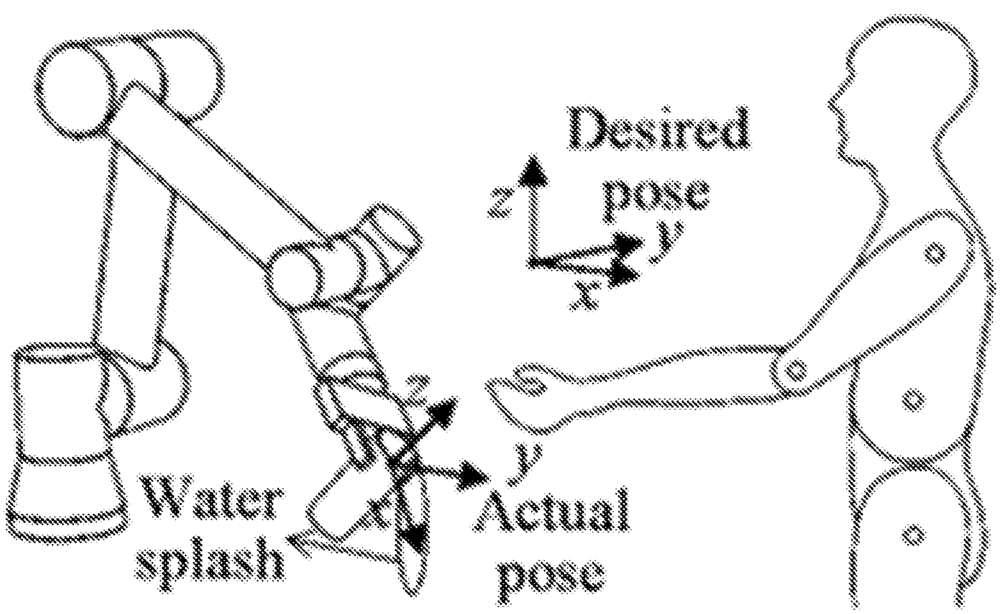
Figure 6:
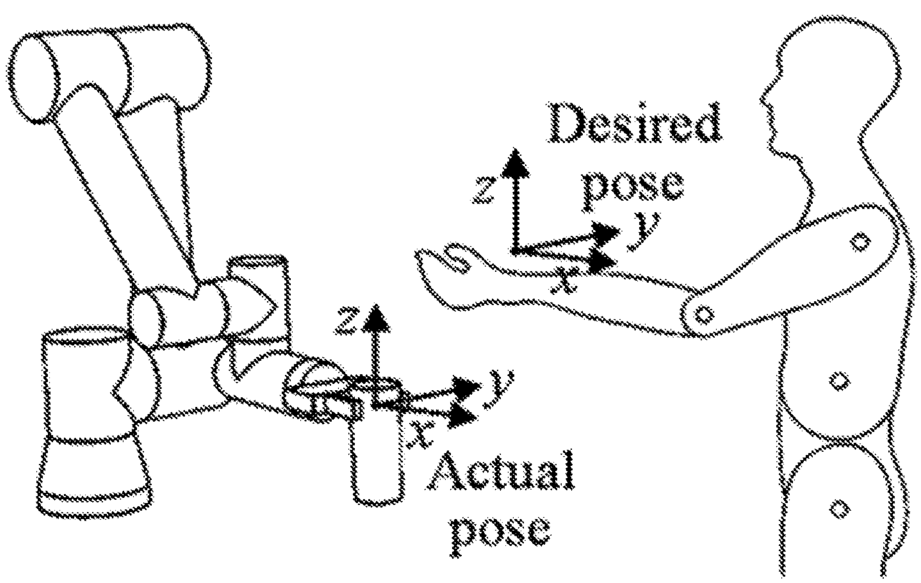
FIG. 6 depicts a schematic drawing illustrating an example task of a robot manipulator with human-robot interaction (HRI) for demonstrating hierarchical task consistency, according to various example embodiments of the present invention.

Secondly, hierarchical task consistency is introduced according to various example embodiments of the present invention to prevent task failure. In this regard, in various example embodiments, the robot manipulator's task is decomposed into a plurality of degrees of freedom (DOFs) (e.g., six DOFs) of a user-defined Cartesian task frame so that hard constraint(s) and soft constraint(s) can be extracted systematically. The hard constraint(s) ensures primary task consistency that keeps the task resumable, while the soft constraint (together with the hard constraint) ensures full task consistency. Referring back to the example task shown in FIG. 1A, according to various example embodiments, the orientation tracking may be regarded as the hard constraint while the position tracking may be regarded as the soft constraint. As a result, as shown in FIG. 6, when the human's hand approaches the end effector of the robot manipulator, the soft constraint is relaxed such that the end effector deviates from its desired position to ensure human safety while the hard constraint is retained or enforced such that the desired orientation of the end effector is maintained (to avoid water spillage), resulting in primary task consistency. In this case, the water spillage that causes unresumable task failure as shown in FIG. 1B is advantageously prevented, and the task can be resumed when the human's hand retracts, thereby ensuring full task consistency as long as it is achievable.

Accordingly, various example embodiments advantageously provide soft constraint(s) in trajectory tracking in one or more DOFs that can be relaxed for human safety. Various example embodiments further advantageously provide a task frame to facilitate the definitions of the hard and soft constraints and which may be defined or selected by a user based on the nature of the task and can be time-varying. As a result, the definitions of the hard and soft constraints can be more flexible. For example, more complicated robot tasks can be handled. By way of an example only and without limitation, for Skill II (Gripping) as discussed later below with reference to FIG. 11B, a time-varying task frame can be handled in the control method according to various example embodiments. In various example embodiments, a hard constraint control set comprising a set of candidate control inputs with respect to one or more hard constraints in trajectory tracking respectively in one or more DOFs of the robot manipulator for the task is constructed based on the SMC to satisfy the one or more hard constraints. Similarly, a soft constraint control set comprising a set of candidate control inputs with respect to one or more soft constraints in trajectory tracking respectively in one or more DOFs of the robot manipulator for the task is constructed based on the SMC to satisfy the one or more soft constraints.

Finally, control input optimizations are configured according to various example embodiments to ensure full task consistency whenever possible while guaranteeing human safety and primary task consistency. For example, in various conventional control methods, the states (i.e., enforced/relaxed) of constraints may be determined by comparing a danger criterion with empirically selected thresholds. Therefore, conventionally, full task consistency depends on the empirically selected thresholds. Furthermore, the control law switches with the states of the constraints, resulting in discontinuous control input and jerky robot motion. In contrast, in the control method according to various example embodiments, the state of the soft constraint is solved automatically in the control input optimizations, so that full task consistency can be achieved whenever possible. In various example embodiments, primary task consistency is guaranteed together with human safety and full task consistency is sought using all DOFs of the robot manipulator while guaranteeing primary task consistency and human safety. Furthermore, in various example embodiments, the control input to the robot manipulator is continuous so the robot manipulator's motion is smooth.

Accordingly, various advantages of the universal control method or framework may include:

- human safety is guaranteed by a set of uniform SMCBFs in presence of disturbance;
- hierarchical task consistency is achieved, that is, primary task consistency is always enforced, while full task consistency is ensured as long as possible; and
- compatible/adaptable to different types of robot control modes with consistent performance.

Accordingly, various example embodiments of the present invention advantageously provide a universal control method or framework that simultaneously addresses the above mentioned three problems or issues. In various example embodiments, a minimum (or shortest) human-robot distance is formulated as a function of human and robot states, and a function (i.e., a CBF, e.g., corresponding to the safety distance function as described hereinbefore according to various embodiments) is defined as a difference between the minimum distance and a predetermined safe distance. In addition, a sliding manifold for human safety is defined based on the above-mentioned function and its time derivative according to the control mode of the robot manipulator, such that the above-mentioned function is positive on the sliding manifold. Thereafter, a safety control set to achieve the sliding manifold is formulated. Therefore, according to various example embodiments, the above-mentioned function is advantageously subjected to, or modified by, the sliding manifold to introduce a sliding mode, and such the modified function may thus be referred to as a sliding mode CBF (SMCBF). Next, various example embodiments advantageously introduce hierarchical task consistency, whereby task consistency can be partially satisfied, that is, satisfied hierarchically (hard constraint(s) ensures primary task consistency while soft constraint(s) (together with hard constraint(s) ensures full task consistency as long as it is achievable). In various example embodiments, control input optimizations are utilized to ensure full task consistency whenever possible while guaranteeing human safety and primary task consistency.

To demonstrate the effectiveness of the control method or framework according to various example embodiments of the present invention, experiments and simulations were conducted to validate the control method according to various example embodiments with comparisons to conventional or existing methods, and results thereof will be discussed later below.

Models of Robot Manipulator

Robot control models corresponding to a number of example different types of robot control modes will now be described according to various example embodiments of the present invention, namely, a joint-position control mode, a joint-velocity control mode, a joint-acceleration control mode and a joint-torque control mode.

Figure 7:
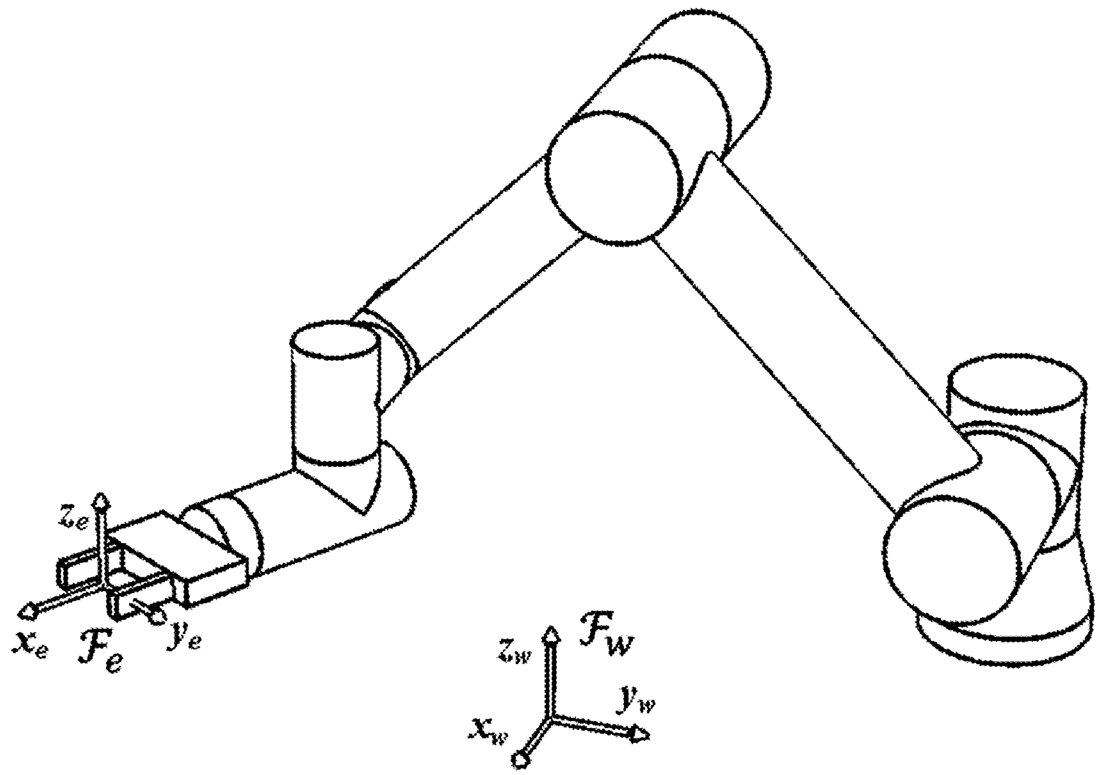
FIG. 7 depicts a schematic drawing of an example articulated robot manipulator with a plurality of DOFs (n DOFs), according to various example embodiments of the present invention.

FIG. 7 depicts a schematic drawing of an example articulated robot manipulator with a plurality of DOFs (n DOFs) according to various example embodiments of the present invention. For example, the joint positions of the robot manipulator are represented by a vector $q=[q_1, \ldots, q_n]^T$ and the end effector (EE) of the robot manipulator is represented by a Cartesian frame $\mathcal{F}_e$. The position and orientation of $\mathcal{F}_e$ are $p_e \in \mathbb{R}^3$ and $R_e=[x_e, y_e, z_e] \in SO(3)$ (3D rotation group), respectively, where $p_e$ locates at the tool center point (TCP) of the end effector, and $x_e$, $y_e$, and $z_e$ are three orthonormal bases. The following example different types of control modes of the robot manipulator are considered according to various example embodiments of the present invention.

Figure 8A:
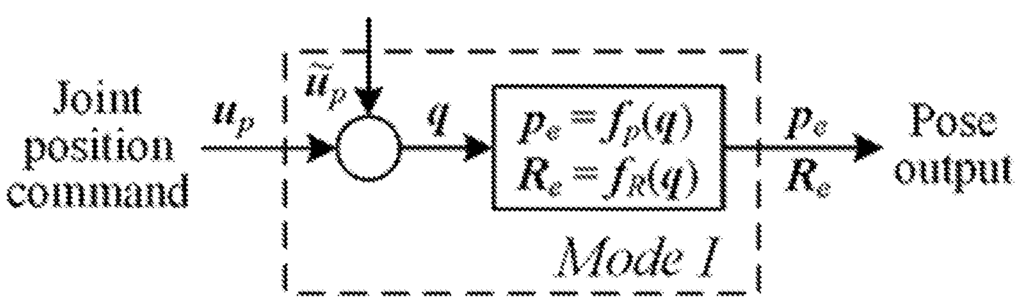
FIGS. 8A to 8D depict a schematic block diagram illustrating different types of control modes, according to various example embodiments of the present invention.

FIG. 8A depicts a schematic block diagram illustrating a first control mode (i.e., a first type of control mode) according to various example embodiments of the present invention, which is a joint-position control mode and is referred to as Mode I herein. As shown in FIG. 8A, the control model (or kinematic model) of the robot manipulator in the joint-position control mode may be represented by: $p_e=f_p(q)$, $R_e=f_R(q)$, and $q=u_p+\tilde{u}_p$, where $f_p$: $\mathbb{R}^n \to \mathbb{R}^3$ and $f_R$: $\mathbb{R}^n \to SO(3)$ are continuously differentiable forward kinematic mappings, $u_p$ is the control input of joint positions and $\tilde{u}_p$ is the input disturbance (e.g., caused by the human operating in the shared workspace).

Figure 8B:
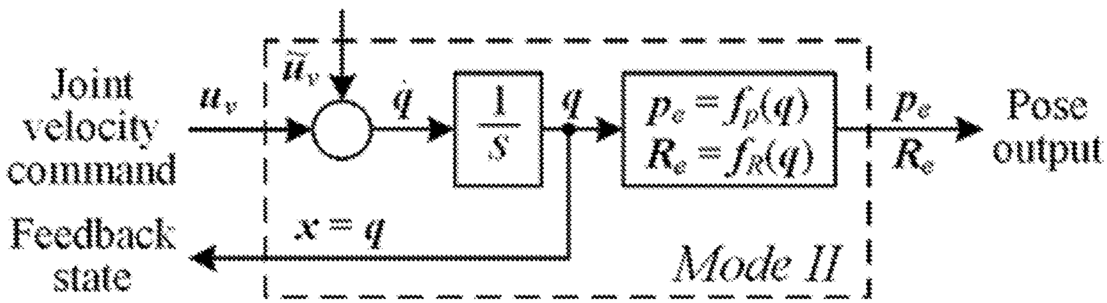

FIG. 8B depicts a schematic block diagram illustrating a second control mode (i.e., a second type of control mode) according to various example embodiments of the present invention, which is a joint-velocity control mode and is referred to as Mode II herein. As shown in FIG. 8B, the control model (or first-order kinematic model) of the robot manipulator in joint-velocity control mode may be represented by: $\dot{p}_e=J_v(q)\dot{q}$, $\omega_e=J_\omega(q)\dot{q}$, and $\dot{q}=u_v+\tilde{u}_v$, where $\omega_e \in \mathbb{R}^3$ is the angular velocity of end effector, $J_v(q)$ and $J_\omega(q)$ are linear and angular Jacobian matrices, respectively, $u_v \in \mathbb{R}^n$ is the control input of joint velocities and $\tilde{u}_v$ is the input disturbance.

Figure 8C:
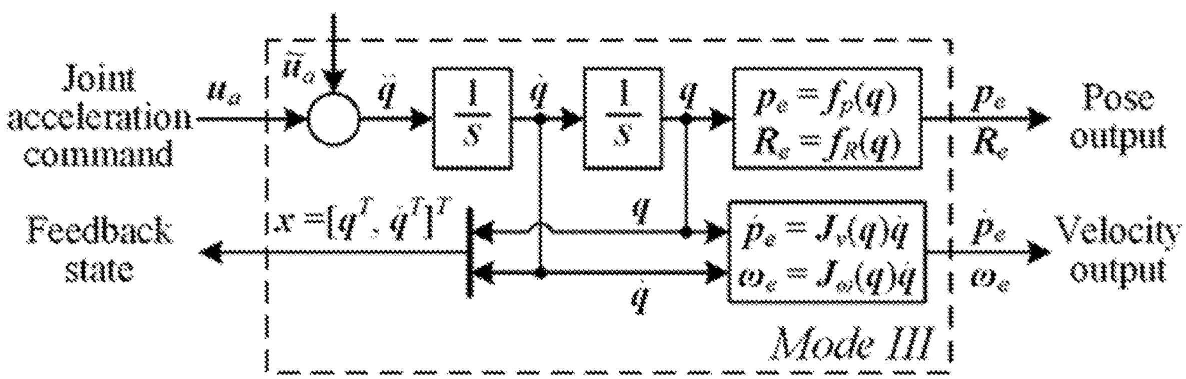

FIG. 8C depicts a schematic block diagram illustrating a third control mode (i.e., a third type of control mode) according to various example embodiments of the present invention, which is a joint-acceleration control mode and is referred to as Mode III herein. As shown in FIG. 8C, the control model (or second-order kinematic model) of a robot manipulator in joint-acceleration control mode may be represented by: $\ddot{p}_e=J_v(q)\ddot{q}+\dot{J}_v(q, \dot{q})\dot{q}$, $\dot{\omega}_e=J_{107}(q)\ddot{q}+\dot{J}_\omega(q, \dot{q})\dot{q}$, and $\ddot{q}=u_a+\tilde{u}_a$, where $u_a \in \mathbb{R}^n$ is the control input of joint accelerations and $\tilde{u}_a$ is the input disturbance.

Figure 8D:
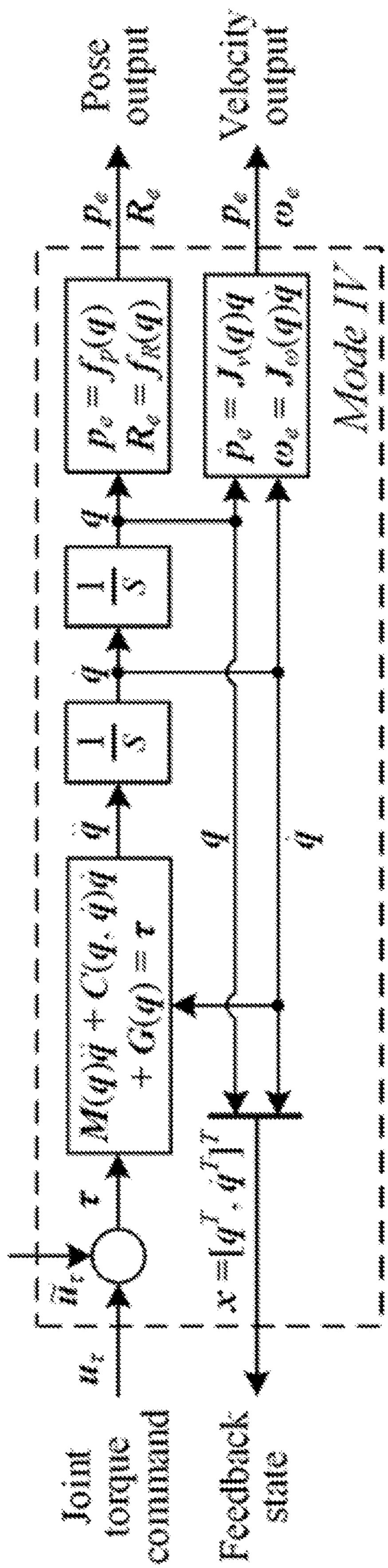

FIG. 8D depicts a schematic block diagram illustrating a fourth control mode (i.e., a fourth type of control mode) according to various example embodiments of the present invention, which is a joint-torque control mode and is referred to as Mode IV herein. The control model (or dynamic model) of the robot manipulator in a joint-torque control mode may be represented by: $M(q)\ddot{q}+C(q, \dot{q})\dot{q}+G(q)=u_\tau+\tilde{u}_\tau$, where $M \in \mathbb{R}^{n \times n}$ is the symmetric and positive definite inertia matrix, $C(q, \dot{q})\dot{q}$ is the Coriolis and centrifugal vector, $G(q)$ is the gravity vector, $u_\tau \in \mathbb{R}^n$ is the control input of joint torques and $\tilde{u}_\tau$ is the input disturbance.

For example, for a commercial robot manipulator, the control inputs are bounded, which means $u_\bullet \in \mathcal{U}_\bullet \triangleq \{u_\bullet \in \mathbb{R}^n | u_{\bullet,min} \le u_\bullet \le u_{\bullet,max}\}$ where $\bullet \in \{v, a, \tau\}$ and $u_{\bullet,min}$ and $u_{\bullet,max}$ are known constants. Furthermore, the commercial robot manipulator usually has, or it is assumed to have, an embedded controller to make the state (e.g., position, velocity, acceleration or torque) of each joint of the robot manipulator track the control input. Therefore, various example embodiments provide the following bounded-disturbance assumption: the input disturbances are bounded as: $\tilde{u}_\bullet \in \{\tilde{u}_\bullet \in \mathbb{R}^n | \|\tilde{u}_\bullet\| \le \bar{u}_\bullet\}$, where $\bullet \in \{p, v, a, \tau\}$, and $\bar{u}_\bullet$ is known constants. Furthermore, various example embodiments advantageously unify the control models in Modes II, III and IV into the control affine form $\dot{x}=f(x)+g(x)(u+\tilde{u})$, where $x \in \mathbb{R}^{n_x}$ is the robot state, $f(x) \in \mathbb{R}^{n_x}$ and $g(x) \in \mathbb{R}^{n_x \times n}$ are locally Lipschitz continuous functions, $u \in \mathcal{U}$ is the control input, and $\tilde{u} \in \mathbb{R}^n$ is the input disturbance. According to various example embodiments, for the control affine form, in Mode II, $x=q$, $f=0_{n \times 1}$, $g=I_n$, $u=u_v$, $\tilde{u}=\tilde{u}_v$, and $\mathcal{U}=\mathcal{U}_v$. In Mode III, $x=[q^T, \dot{q}^T]^T$, $f=[\dot{q}^T, 0_{n \times 1}{}^T]^T$, $g=[0_{n \times n}{}^T, I_n{}^T]^T$, $u=u_a$, $\tilde{u}=\tilde{u}_a$, and $\mathcal{U}=\mathcal{U}_a$. In Mode IV, $x=[q^T, \dot{q}^T]^T$, $f=[\dot{q}^T, (-M^{-1}(C\dot{q}+G))^T]^T$, $g=[0_{n \times n}{}^T, (M^{-1})^T]^T$, $u=u_\tau$, $\tilde{u}=\tilde{u}_\tau$, and $\mathcal{U}=\mathcal{U}_\tau$. Therefore, the universal control method or framework according to various example embodiments is advantageously developed or configured based on the above-mentioned control affine form, so that the control method can adapt to multiple control modes, such as the above-mentioned three example different types of control modes, namely, Modes II, III and IV.

Various example embodiments note that the robot manipulator in Mode I is a zero-order system and thus cannot be written in the control affine form. However, as will be described later below, the universal control method can work as a real-time motion planner to generate the joint position command $u_p$ for the robot manipulator in Mode I. Therefore, the universal control method can adapt to, or is compatible with, all of the above-mentioned four robot control modes.

Guaranteed Human Safety Based on SMCBFS

A SMCBF that uses a sliding manifold to deal with different relative degrees and reject disturbance will firstly be introduced below according to various example embodiments of the present invention. Then, a set of SMCBFs, each of which is based on the minimal distance between a selected part of the human and a selected part or link of the robot manipulator, are formulated to represent human safety (e.g., corresponding to the part pair as described hereinbefore according to various embodiments).

Preliminaries of SMCBF

For better understanding, the preliminaries of SMCBF will now be described according to various example embodiments of the present invention. According to various example embodiments, a smooth function h(x, β) dependent on the robot state x and a set of continuously differentiable parameters β(t) representing the human state are utilized to define the safety of HRI, that is, h(x, β)≥0 means that the robot state x is safe for the human, and h(x, β)<0 means that the robot state x is unsafe for the human. The human state may be represented by $$\beta(t) = \left[p_{h,1}^T, \cdots, p_{h,n_h}^T\right]^T \in \mathbb{R}^{3n_h},$$

where $p_{h,i}$ with i∈{1, . . . , $n_h$} denotes the position of a representative point of the human, and $n_h$ denotes the number of representative points. Because human motion is found to be jerk-controlled, according to various example embodiments, β(t)∈ $\mathcal{C}^3$, where $\mathcal{C}^k$ represents the set of k times continuously differentiable functions. Therefore, given the parameter β(t), the set of the safe robot states $\mathcal{X}$ can be defined as $\mathcal{X}$(t)={x∈ $\mathbb{R}^{n_x}$|h(x, β)≥0}. Accordingly, the problem becomes to find the set of u that leads the robot state x towards the safe set $\mathcal{X}$ regardless of the disturbance ũ.

Based on traditional CBF, the above-mentioned function h can be controlled to be positive when the relative degree (r) of h with respect to the control input u is r=1, i.e., $\mathcal{L}_g$h≠0. However, various example embodiments note that the function h cannot be controlled directly when r≥2. According to various example embodiments, to address this technical problem, instead of constraining h≥0 directly, the function h is subjected to, or modified by, a sliding manifold to introduce a sliding mode and such a modified function may be referred to as a SMCBF. In various example embodiments, the SMCBF enforces the sliding manifold $s_h$:

$$s_h = (d/dt + \lambda)^{r-1} h = \sum\nolimits_{k=0}^{r-1} C_k^{r-1} \lambda^{r-1-k} h^{(k)} \geq 0,$$

where r is the relative degree of $$h\big(\text{i.e., } \mathcal{L}_g \mathcal{L}_f^i h = 0$$

for ∀i∈{0, 1, . . . , r−2}, and $$\mathcal{L}_g \mathcal{L}_f^{r-1} h \neq 0\big),$$

λ is a positive constant, $$C_k^n = n!/(k!(n-k)!),$$

and $h^{(k)}$ represents k-th time derivative of h. As a result, the relative degree of $s_h$ with respect to the control input u is always one, so it can advantageously be controlled directly according to various example embodiments.

In SMC, h=0 is achieved automatically when the robot state is on the sliding manifold, i.e., $s_h$=0. Similarly, in SMCBF, h≥0 is achieved when the robot state is on the sliding manifold $s_h$≥0. According to various example embodiments, the SMCBF may be defined as follows: consider the control affine system, given the safe set $\mathcal{X}$(t) and continuous parameters β(t), a $\mathcal{C}^r$ function h: ($\mathbb{R}^{n_x}$, $\mathbb{R}^{3n_h}$)→$\mathbb{R}$ is called an SMCBF if there exist positive constants λ and $\varepsilon_h$, and $$\phi_h(t) \geq \left|\mathcal{L}_g \mathcal{L}_f^{r-1} h \tilde{u}\right| \text{ for } \forall\, t \geq 0,$$

such that, for ∀x∈ $\mathcal{X}$, $\sup_{u\in \mathcal{U}_u}$[$A_h$u+$a_h$+$\bar{a}_h$]≥0, where $$A_h = \mathcal{L}_g \mathcal{L}_f^{r-1} h,\ a_h = \overline{\mathcal{L}}_f^r h + \sum\nolimits_{k=0}^{r-1} C_k^r \lambda^{r-k} h^{(k)}$$

and $\bar{a}_h$=$\phi_h$tanh ($\phi_h s_h/\varepsilon_h$) is a robust control term. $\mathcal{L}_\bullet$h=∂h/∂x•• is Lie derivative, $$\mathcal{L}_\bullet^r h$$

is determined recursively, and $$\overline{\mathcal{L}}_f^r h = \left[\partial/\partial\beta \cdot \beta^{(1)} + \cdots + \partial\big/\partial\beta^{(r-1)} \cdot \beta^{(r)} + \mathcal{L}_f\right]^r h \cdot \phi_h(t)$$

represents the upper bound of the effect of the input disturbance ũ to the function h and is utilized to formulate $a_h$. According to various example embodiments, the robust control term $\bar{a}_h$ uses continuous function tanh(•) to ensure the smoothness of the final control law.

Accordingly, once an SMCBF is defined, the set of admissible control inputs (e.g., corresponding to the safety control set as described hereinbefore according to various embodiments) can be determined as $\mathcal{U}_h$={u∈ $\mathcal{U}_h$|$A_h$u+$a_h$+$\bar{a}_h$≥0} (e.g., corresponding to the safety control function as described hereinbefore according to various embodiments, whereby $A_h$, $a_h$ and $\bar{a}_h$ correspond to the first parameter, the second parameter and the third parameter, respectively).

In various example embodiments, if a $\mathcal{C}^r$ function h is an SMCBF, then there exists ρ(t) exponentially converging to a ball with a size proportional to $\varepsilon_h$, such that any controller u: $\mathbb{R}^{n_x}$→$\mathcal{U}_h$ keeps the robot state x within a relaxed safe set $\mathcal{X}_r$, that is, $\mathcal{X}_r$={x∈ $\mathbb{R}^{n_x}$|h(x, β)+ρ(t)≥0}.

Figure 9A:
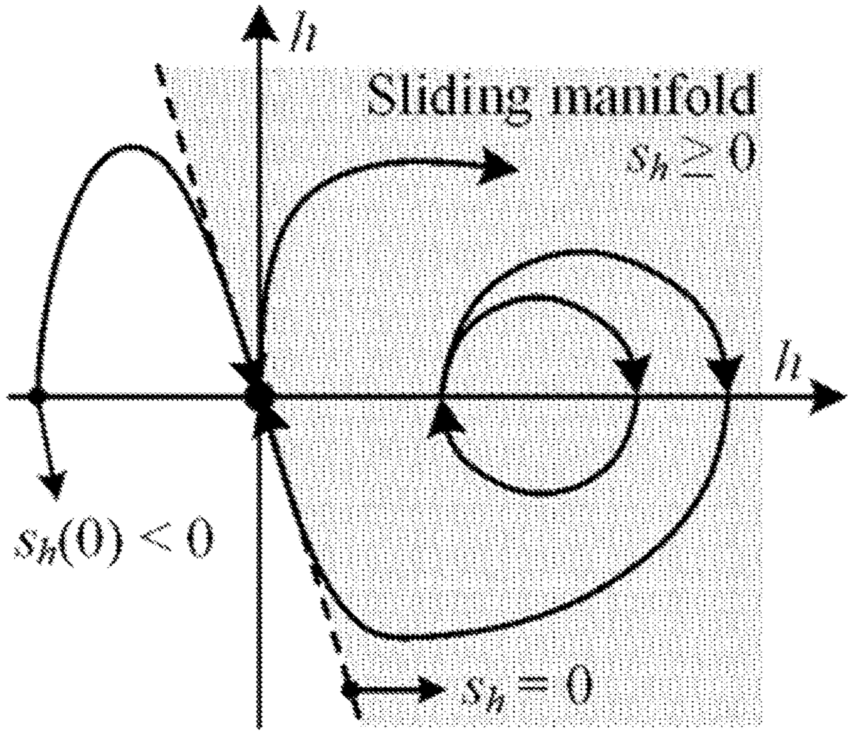
FIGS. 9A and 9B depict plots of phase portraits of the sliding mode control barrier function (SMCBF) according to various example embodiments of the present invention and the sliding mode control (SMC), respectively, for comparison.
Figure 9B:
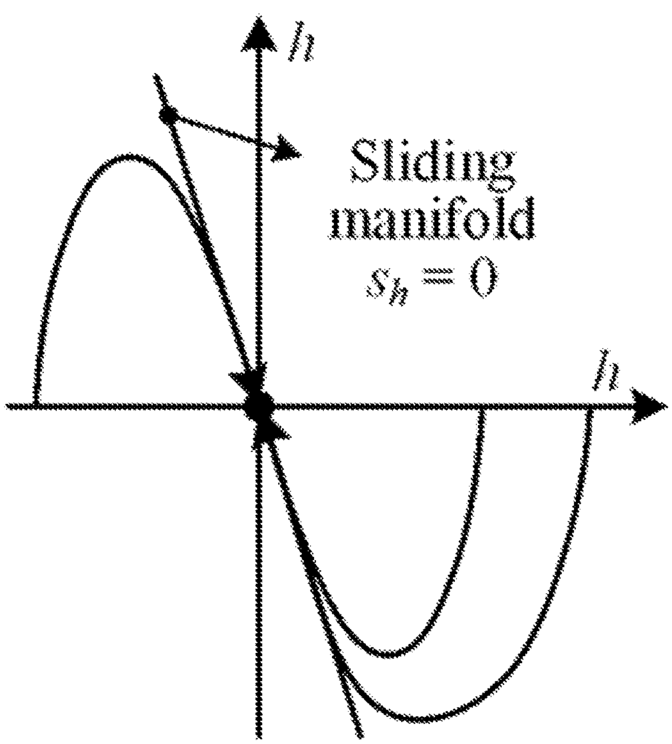

Different from SMC which is used for equality-based control objectives such as trajectory tracking, the SMCBF according to various example embodiments is designed to achieve inequality-based objectives such as human safety. For illustration purposes, FIGS. 9A and 9B depict plots of phase portraits of the SMCBF and the SMC, respectively, for comparison. In SMC, as shown in FIG. 9B, the sliding manifold is a surface $s_h$=0, so the state of h, i.e., $[h, \dot{h}]^T$ is always attracted to the sliding surface and then slides toward the equilibrium point along the surface. In contrast, as shown in FIG. 9A, the sliding manifold is an area $s_h$≥0 with the boundary being $s_h$=0. For example, in the case $s_h$>0, the state of the SMCBF can evolve freely in the inner area $s_h>0$, which means that the SMCBF does not take effect and other control objectives can be achieved. However, as the state approaches the boundary $s_h=0$, the SMCBF takes effect and prevents the state from leaving the sliding manifold. As a result, the state slides toward the equilibrium point along the boundary while other control objectives are sacrificed. In the case of $s_h(0)<0$, the state is enforced toward the boundary and then slides toward the equilibrium point. Furthermore, the state at the equilibrium point can re-enter the inner area $s_h>0$ and evolve freely therein.

Accordingly, various example embodiments advantageously combine the SMC and CBF to produce a SMCBF for ensuring human safety while being adaptable or compatible to different types of control modes. In particular, a sliding manifold is constructed to modify or convert the CBF into a SMCBF and provides a safety control set that can constrain the state of the robot manipulator on the sliding manifold in presence of input disturbance. Therefore, according to various example embodiments, a safety control set may be produced based on the SMCBF as follows: 1) formulate a function $h(x, \beta)$ (control barrier function) to represent human safety; 2) define a sliding manifold $s_h \geq 0$ based on the relative degree r of h; 3) generate an admissible control set (safety control set) that enforces the sliding manifold $s_h \geq 0$; and 4) $s_h \geq 0$ leads to $h \geq 0$, thereby guaranteeing human safety.

Definitions of SMCBF's for Human Safety

A set of SMCBFs (e.g., one respective SMCBF for each part pair of a selected part of the robot manipulator and a selected part of the human) may be formulated for ensuring human safety. Consider an example HRI scenario shown in FIG. 10. For example, the human may be represented by nn spheres $\mathcal{S}_i \subset \mathbb{R}^3$ centered at $p_{h,i}$, and the radius of $\mathcal{S}_i$ is $r_{h,i}$. The robot manipulator may be modeled by $n_r$ links $p_{r,j-1}p_{r,j}$ with $j \in \{1,2, \ldots, n_r\}$. Each link $p_{r,j-1}p_j$ may be enveloped by a capsule $\mathcal{C}_j \subset \mathbb{R}^3$ with radius $r_{r,j}$. By way of an illustrative example only and without limitation, $n_h=10$ and $n_r=7$ for the example shown in FIG. 10. In the example HRI scenario, human safety may be equivalent to $\mathcal{S}_i \cap \mathcal{C}_j = \emptyset$ for $\forall i \in \{1, 2, \ldots, n_h\}$ and $\forall j \in \{1, 2, \ldots, n_r\}$.

Considering a combination of i and j (i.e., a part pair of a selected part (i) of the robot manipulator and a selected part (j) of the human), the minimum (or shortest) distance between the point $p_{h,i}$ and the line-segment $p_{r,j-1}p_{r,j}$ is $d_{i,j}(x, \beta)=f_d(p_{h,i}(\beta), P_{r,j-1}(x), p_{r,j-1}(x))$, where $f_d: (\mathbb{R}^3, \mathbb{R}^3, \mathbb{R}^3) \rightarrow \mathbb{R}$ is a function that gives the minimum distance between a point and a line-segment. Thus, according to various example embodiments, the following function is an SMCBF: $h_{i,j}(x, \beta)=d_{i,j}(x, \beta)-d_s$, where $d_s=r_{h,i}+r_{r,j}$ is a constant safe distance. The corresponding safety control set for $h_{i,j}$ is $\mathcal{U}_{i,j}=\{u \in \mathcal{U} \mid A_{i,j}u+a_{i,j}+\bar{a}_{i,j} \geq 0\}$, where $\bar{a}_{i,j}=\phi_{i,j}\tanh(\phi_{i,j}s_{i,j}/\varepsilon_{i,j})$ with $\varepsilon_{i,j}$ being a constant, $\phi_{i,j}=\|A_{i,j}\|\bar{u}_\bullet$ with $\bullet$=v, a, and $\tau$ in Modes II, III, and IV, respectively, and $A_{i,j}$, $a_{i,j}$, and sliding manifold $s_{i,j}$ depend on the relative degree $r_{i,j}$. In Mode II, $r_{i,j}=1$, so $A_{i,j}=\mathcal{L}_g h_{i,j}$, $a_{i,j}=\mathcal{L}_f h_{i,j}+\lambda h_{i,j}$, and $s_{i,j}=h_{i,j}$. In Modes III and IV, $r_{i,j}=2$, so $$A_{i,j} = \mathcal{L}_g\mathcal{L}_f h_{i,j},\ a_{i,j} = \overline{\mathcal{L}}_f^2 h_{i,j} + 2\lambda\dot{h}_{i,j} + \lambda^2 h_{i,j},$$

and $s_{i,j}=\dot{h}_{i,j}+\lambda h_{i,j}$. The final safety control set for all combinations of i and j is $\mathcal{U}_s=\{u \in \mathcal{U} \mid Au+a \geq 0\}$ where $$A = \left[A_{1,1}^T, \cdots, A_{n_h,n_r}^T\right]^T \in \mathbb{R}^{n_h n_r \times n},$$

and $a=[a_{1,1}+\bar{a}_{1,1}, \ldots, a_{n_h,n_r}+\bar{a}_{n_h,n_r}]^T \in \mathbb{R}^{n_h n_r}$. The robot state x stays within the following relaxed safe set when $u \in \mathcal{U}_s$ holds for $\forall t \geq 0$: $\mathcal{X}_s=\{x \in \mathbb{R}^{n_x} \mid h(x, \beta)+\rho(t) \geq 0\}$ where $h=[h_{1,1}, \ldots, h_{n_h,n_r}]^T \in \mathbb{R}^{n_h n_r}$, and $\rho=[\rho_{1,1}, \ldots, \rho_{n_h,b_r}]^T \in \mathbb{R}^{n_h n_r}$ with $\rho_{i,j}(t)$ exponentially converging to a ball with a size proportional to $\varepsilon_h$. $\rho_{i,j}(t)$ represents an auxiliary function that models the error bias caused by input disturbance and initial values, that is, the error of $h(x, \beta)$ with respect to zero. In this regard, it is ideal that $h(x, \beta) \geq 0$. However, it may not be feasible due to the input disturbance and the initial value of h. Therefore, according to various example embodiments, the result is relaxed to $h(x, \beta)+\rho(t) \geq 0$, where $\rho(t)$ approaches zero as time/increases.

In various example embodiments, for example, the above $\rho_{i,j}(t)$ may be determined as follows: $\rho_{i,j}(t)=-S(h_{i,j}(0))e^{-\lambda_{i,j}t}+\sqrt{\kappa\varepsilon_{i,j}/\lambda_{i,j}}$ for Mode II and $\rho_{i,j}(t)=-[S(h_{i,j}(0)+\lambda_{i,j}\dot{h}_{i,j}(0))t+h_{i,j}(0)+\sqrt{\kappa\varepsilon_{i,j}/\lambda_{i,j}}/\lambda_{i,j}]e^{-\lambda_{i,j}t}+\sqrt{\kappa\varepsilon_{i,j}/\lambda_{i,j}}/\lambda_{i,j}$ for Modes III and IV.

Therefore, according to various example embodiments, the safety control set $\mathcal{U}_s$ may be determined as follows: 1) define the protected/selected parts of the human using multiple spheres $\mathcal{S}_i$ and the protected/selected parts of the robot using multiple capsules $\mathcal{C}_j$; 2) formulate the minimal distance $d_{i,j}$ between a sphere $\mathcal{S}_i$ and a capsule $\mathcal{C}_j$ based on the human state.x and the robot state $\beta$; 3) formulate an SMCBF (e.g., corresponding to the safety distance function as described hereinbefore according to various embodiments) as the difference between the minimum distance $d_{i,j}$ and the safe distance $d_s$; 4) define a sliding manifold using the SMCBF and its time derivative such that the SMCBF is kept positive on the sliding manifold; and 5) determine the safety control set comprising a set of control inputs that leads to the sliding manifold.

Hierarchical Task Consistency based on Hard and Soft Constraints

A technique for defining a Cartesian task frame and classifying its six DOFs, based on which the hard and soft constraints ensuring primary and full task consistency are formulated, will now be described according to various example embodiments of the present invention. The task of picking a cup with water using an end effector in the form of a two-finger gripper as shown in FIGS. 11A to 11C is used as an example and without limitation.

A task for a robot manipulator may include a sequence of actions which may be referred to as skills (or sub-tasks). For example, as shown in FIGS. 11A to 11C, the example task of picking a cup with water can be decomposed into three skills (or sub-tasks), such as Skill I (Approaching) as shown in FIG. 11A, Skill II (Gripping) as shown in FIG. 11B and Skill III (Leaving) as shown in FIG. 11C. In particular, for Skill I, the end effector approaches the cup at point A following the desired trajectory OA; for Skill II, the end effector stays at point A while the two fingers of the gripper close to grip the cup; for Skill III, the end effector leaves point A with the gripped cup (having water therein) following the desired trajectory AB.

In various example embodiments, each of the skills is defined by the desired trajectory of the end effector represented by a frame $\mathcal{F}_d(t) \in \mathcal{C}^{r_e}$. The position and orientation of $\mathcal{F}_d(t)$ are denoted as $p_d(t)$ and $R_d(t)$, respectively. For example, when the human is far from the robot, full task consistency can be achieved, which means $\mathcal{F}_d(t)$ can be well tracked and the task can be completed with success. However, in the case of close HRI, the end effector may have to deviate from its desired trajectory to avoid collision with the human.

Figure 11A:
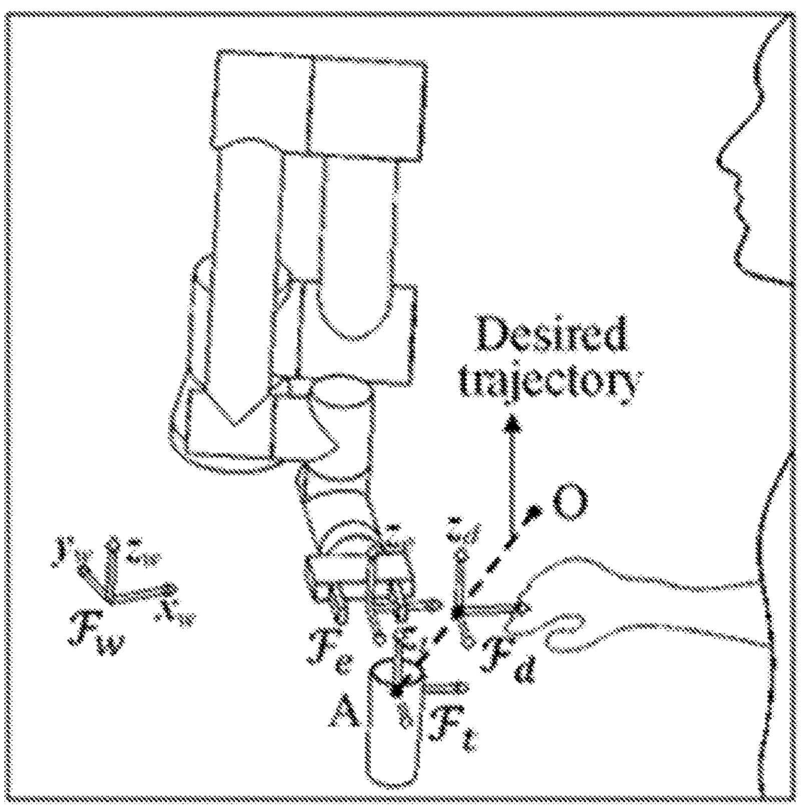
FIGS. 11A to 11C depict three example skills (or sub-tasks) of an example task, according to various example embodiments of the present invention.
Figure 11B:
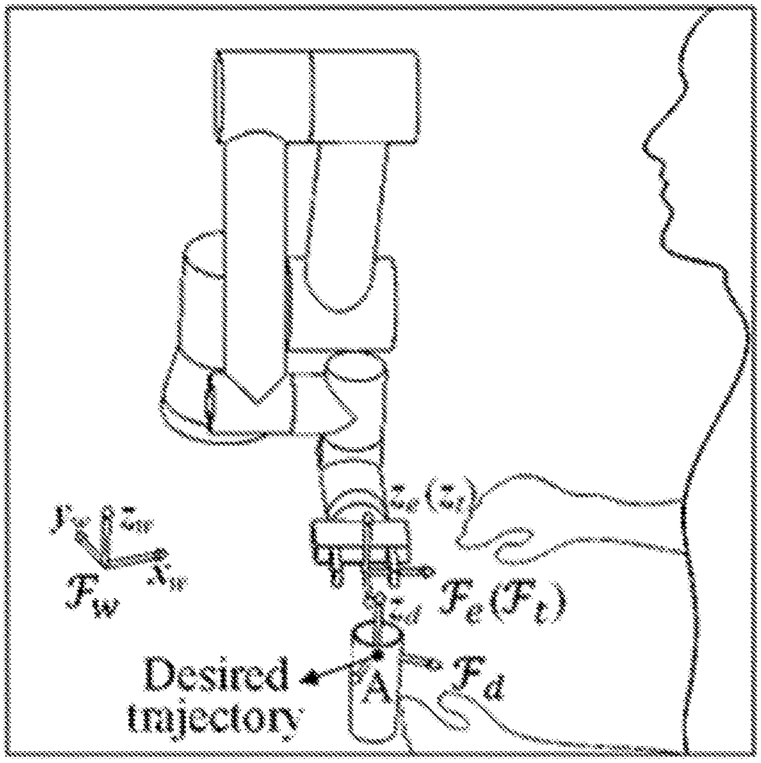
Figure 11C:
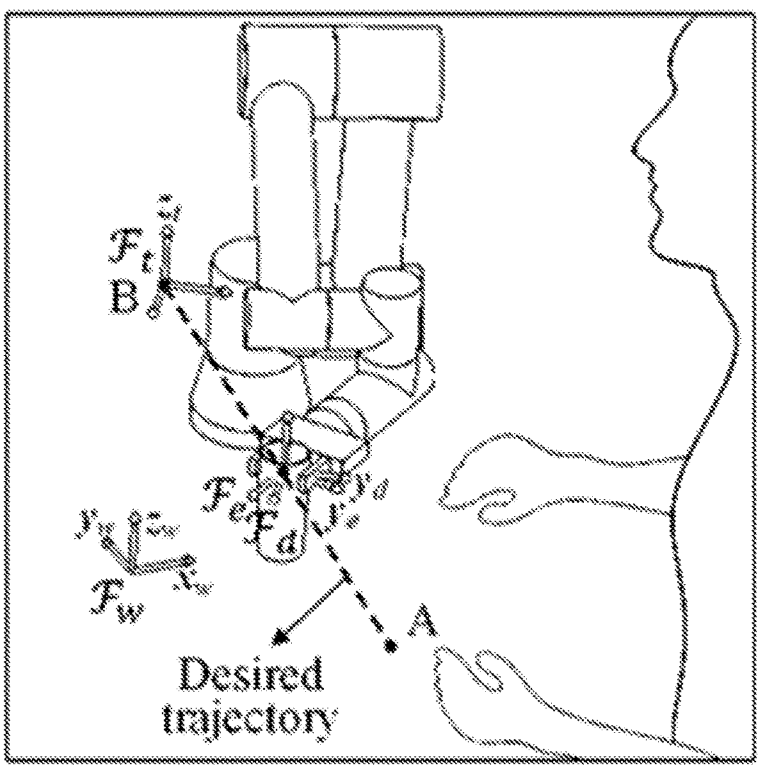

By way of an illustrative example and without limitation, for the example task shown in FIGS. 11A to 11C, to achieve primary task consistency that keeps the task resumable, a number of constraints must be satisfied: 1) In Skill I (FIG. 11A), for example, the gripper should keep horizontal (i.e., $x_e \perp z_w$ and $y_e \perp z_w$) and the opening of the gripper should point at the cup (i.e., $x_e^T(p_A-p_e)=\|p_A-p_e\|$ where $p_A$ is the position of point A). Otherwise, the fingers of the gripper may collide with the cup resulting in task failure; 2) In Skill II (FIG. 11B), for example, the end effector's motion along the y-axis of $\mathcal{F}_e$ should be prevented to avoid collision between the gripper's fingers and the cup; 3) In Skill III (FIG. 11C), for example, the gripper should keep horizontal to prevent water spillage. To define these constraints in a systematic way, a Cartesian task frame $\mathcal{F}_t(t) \in \mathcal{C}^{r_e}$ is introduced according to various example embodiments of the present invention. Accordingly, in various example embodiments, the task frame $\mathcal{F}_t(t)$ is used to facilitate the definitions of the constraints and may be defined or selected by a user based on the nature of each skill (or sub-task) and can be time-varying. For example, in Skill III, the task frame $\mathcal{F}_t$ may be fixed with respect to the world frame $\mathcal{F}_w$; while in Skill II, $\mathcal{F}_t(t)$ is fixed to $\mathcal{F}_e(t)$ which is time-varying.

In various example embodiments, the task frame $\mathcal{F}_t$ has a plurality of DOFs corresponding to the plurality of DOFs of the end effector to perform the task, such as six DOFs: three of them are translational DOFs along x-, y-, and z-axes (namely, px, py, and pz) and the other three are rotational DOFs around the three axes (namely, rx, ry, and rz). According to various example embodiments, the trajectory tracking of end effector is decomposed into the six DOFs of $\mathcal{F}_t$. Further, the six DOFs are classified into the following three types.

Hard DOF(s): The trajectory tracking of end effector in hard DOF(s) (which may also be referred to as hard constraint DOF(s)) guarantees primary task consistency. Therefore, the trajectory deviation in hard DOF(s) breaks the resumability of the task and thus the primary task consistency. Considering Skill III (FIG. 11C) as an example, for example, rx and ry may be defined as hard DOFs because even a temporary trajectory deviation in these DOFs may lead to water spillage and consequently task failure.

Soft DOF(s): The trajectory deviation in soft DOF(s) (which may also be referred to as soft constraint DOF(s)) breaks full task consistency and suspends the task, but primary task consistency is unaffected. Considering Skill III as an example, for example, the trajectory deviation in px py, and pz suspends the task, but the task can be resumed after the end effector returns to its desired trajectory. Therefore, these DOFs may be defined as soft DOFs.

Free DOF(s): The trajectory tracking in free DOF(s) has no effect on the task. This means full task consistency is unaffected by trajectory deviation in free DOF(s). Considering Skill III as an example, for example, because the cup is axisymmetric, the rotation of the end effector about the z-axis does not matter. Therefore, rz can be defined as a free DOF. Although the desired trajectory in the free DOF(s) may be provided, it may simply ignored in the control framework. The free DOF(s) provides additional flexibility to achieve human safety without affecting the robot's task.

According to various example embodiments, a vector $\sigma_t=[\sigma_{px}, \sigma_{py}, \sigma_{pz}, \sigma_{rx}, \sigma_{ry}, \sigma_{rz}]^T$ may be used to denote or define the classification of the six DOFs of $\mathcal{F}_t$. For example, for $\forall i \in \{px, py, pz, rx, ry, rz\}$, $\sigma_i$=hard when i is a hard DOF, $\sigma_i$=soft when i is a soft DOF, and $\sigma_i$=free when i is a free DOF.

Formulation of Hard and Soft Constraints

Hard and soft constraints are formulated or configured according to various example embodiments of the present invention. The trajectory tracking in hard DOF(s) is regarded as hard constraint and the trajectory tracking in soft DOF(s) is regarded as soft constraint. Therefore, in various example embodiments, primary task consistency is ensured by enforcing the hard constraint, while full task consistency is ensured by enforcing both hard and soft constraints. To represent the hard and soft constraints, in various example embodiments, a vector ${}^te(t)=[{}^te_p(t), {}^te_o(t)] \in \mathbb{R}^6$ may be used to denote the trajectory-tracking errors in the six DOFs of $\mathcal{F}_t$, where ${}^te_p \in \mathbb{R}^3$ and ${}^te_o \in \mathbb{R}^3$ are the position and orientation errors, respectively. The position error can be obtained as ${}^te_p(t)=R_t^T(t)e_p(t)$ where $e_p=p_e-p_d \in \mathbb{R}^3$. A unit quaternion $\{\eta_{ed}, \epsilon_{ed}\}$ is extracted from the rotation matrix $R_{ed}=R_eR_d^T$. After that, the orientation error may be defined as: ${}^te_o(t)=R_t^T(t)\epsilon_{ed}(t)$. $e_p(t)=p_e-p_d$ is the position error of $\mathcal{F}_e$ with respect to $\mathcal{F}_d$ represented in the world frame, and similarly $\epsilon_{ed}(t)$ is the orientation error. $R_t(t)$ is the orientation of the task frame $\mathcal{F}_t$, and $R_t^T(t)$ is its transpose. Accordingly, left multiplying $e_p(t)$ by $R_t^T(t)$ converts the position error into the task frame. Therefore, ${}^te_p(t)$ is the position error in the task frame, and similarly ${}^te_o(t)$ is the orientation error in the task frame.

With ${}^te$, the hard and soft constraints can be formulated as ${}^te_{hard}=0$ with the hard-constraint error ${}^te_{hard}=N_{hard}{}^te$ and ${}^te_{soft}=0$ with the soft-constraint error ${}^te_{soft}=N_{soft}{}^te$, respectively. $N_{hard} \in \mathbb{R}^{n_{hard}\times 6}$ selects errors in hard DOF(s), $N_{soft} \in \mathbb{R}^{n_{soft}\times 6}$ selects errors in soft DOF(s), and $n_{hard}$ and $n_{soft}$ are the numbers of hard and soft DOFs, respectively. By way of an example only and without limitation, when $\sigma_t$=[soft, soft, soft, hard, hard, free]$^T$, $N_{hard}$=[0, 0, 0, 1, 0, 0; 0, 0, 0, 0, 1, 0] and $N_{soft}$=[1, 0, 0, 0, 0, 0; 0, 1, 0, 0, 0, 0; 0, 0, 1, 0, 0, 0].

An Example of Constraint Formulation

For better understanding, an example of constraint formulation will now be described according to various example embodiments of the present invention. The constraints of a task depend on the task frame $\mathcal{F}_t$ and its DOF classification $\sigma_t$. The design or configuration of $\mathcal{F}_t$ and $\sigma_t$ is specified with reference to the example task of FIGS. 11A to 11C as an example. The task is to pick a cup with water from point A on the desk to point B above the desk. Point O is the initial position of the end effector. Implementation details of each skill will now be described below according to various example embodiments of the present invention.

In Skill I, the position $p_t$ of the task frame $\mathcal{F}_t$ may be fixed at point A, while the orientation $R_t$ depends on the position of end effector: the z-axis of $\mathcal{F}_t$ is aligned with that of $\mathcal{C}_w$, i.e., $z_t=z_w$; the y-axis is perpendicular to the connecting line between the EE and point A, i.e., $y_t=y_c/\|y_c\|$ where $y_c=z_t\times(p_A-p_e)$; then, the x-axis is determined as $x_t=y_t\times z_t$. By setting $\sigma_t$=[soft, soft, hard, hard, hard, hard]$^T$ and letting $R_d=R_t$, the end effector of the robot is allowed to escape in a horizontal plane while keeping the gripper's opening pointing at the cup.

In Skill II, $\mathcal{F}_d$ may be fixed at point A with the z-axis $z_d=z_w$, and a time-varying task frame $\mathcal{F}_t(t)$ coinciding with the end effector frame $\mathcal{F}_e$ is selected. The DOF classification is $\sigma_t$=[soft, hard, hard, hard, hard, free]$^T$, which constrains the end effector's motion to be along the x-axis of $\mathcal{F}_e$. Because $\sigma_{rz}$ is free, the end effector can escape in a horizontal plane. The gripper closes gradually only when the end effector stands still at point A; otherwise, the gripper opens. The skill finishes once a signal indicating successful gripping is received from the gripper.

In Skill III, the task frame $\mathcal{F}_t$ may be fixed at point B with $z_t=z_w$. The DOF classification is $\sigma_t$=[soft, soft, soft, hard, hard, free]$^T$, allowing the EE to escape in the 3D space while keeping the gripper horizontal.

Hard and Soft Constraint Control Sets

The generation of the hard constraint control set ($\mathcal{U}_{hard}$) comprising a set of candidate control inputs with respect to hard constraint(s) in trajectory tracking in hard DOF(s), and the generation of the soft constraint control set ($\mathcal{U}_{soft}$) comprising a set of candidate control inputs with respect to soft constraint(s) in trajectory tracking in soft DOF(s) will now be described according to various example embodiments of the present invention.

Similar to the SMCBF ($h_{i,j}$) described above, various example embodiments note that the hard constraint error ${}^te_{hard}$ (i.e., hard trajectory tracking error function) and the soft constraint error (i.e., soft trajectory tracking error function) ${}^te_{soft}$ have different relative degrees in different robot control modes. To address this, various example embodiments utilize the SMC to tackle different types of control modes, such as the above-mentioned Modes II, III, and IV. First, a vector of sliding manifolds (${}^ts_{hard}$) is defined for the hard constraint(s) and a vector of sliding manifolds (${}^ts_{soft}$) is defined for the soft constraint(s), each sliding manifold being defined for a corresponding hard or soft constraint. For example, according to various example embodiments, ${}^ts_\bullet$ (where •=hard or soft for hard or soft constraint, respectively) may be defined as follows:

$$ {}^ts_\bullet = (d/dt + K_{e,\bullet})^{r-1}\,{}^te_\bullet = \sum_{k=0}^{r-1} C_k^{r-1} K_{e,\bullet}^{r-1-k}\,{}^te_\bullet^{(t)}, $$

where $K_{e,\bullet}=\mathrm{diag}([k_{e,1}, \ldots, k_{e,n\bullet}]^T)$ is a positive-definite diagonal matrix, and r is the relative degree of ${}^te$ with respect to u. Therefore, ${}^te_{hard}$ is a vector that collects the trajectory tracking error in each hard DOF and ${}^ts_{hard}$ is a vector with the same length as ${}^te_{hard}$, and each element of ${}^ts_{hard}$ corresponds to a sliding manifold for a corresponding hard DOF. Similarly, ${}^te_{soft}$ is a vector that collects the trajectory tracking error in each soft DOF and ${}^ts_{soft}$ is a vector with the same length as ${}^te_{soft}$, and each element of ${}^ts_{soft}$ corresponds to a sliding manifold for a corresponding soft DOF. Accordingly, a trajectory tracking error function ${}^te$ is defined for each hard/soft constraint and a sliding manifold is defined based on the corresponding ${}^te$ for each hard/soft constraint. That is, for each hard constraint degree of freedom, a hard trajectory tracking error function ${}^te_{hard}$ is defined for the hard DOF to represent a trajectory tracking error in the hard DOF. Similarly, for each soft constraint degree of freedom, a soft trajectory tracking error function ${}^te_{soft}$ is defined for the soft DOF to represent a trajectory tracking error in the soft DOF.

For example, in Mode II, r=1, so ${}^ts_\bullet={}^te_\bullet$. In Modes III and IV, r=2, so ${}^ts_\bullet={}^ts_\bullet={}^t\dot{e}_\bullet+K_\bullet{}^te_\bullet$. According to the theorem of SMC, the hard/soft constraint ${}^te_\bullet=0$, can be achieved when the state is on the hard/soft sliding manifold ${}^ts_\bullet=0$. Therefore, according to various example embodiments, to achieve the hard/soft sliding manifold ${}^ts_\bullet=0$, the hard/soft control set is designed as follows: $\mathcal{U}_\bullet=\{u\in\mathcal{U} \mid B_\bullet u+b_\bullet+\overline{b}_\bullet\geq 0\}$ (e.g., corresponding to the hard/soft constraint function as described hereinbefore according to various embodiments, whereby $B_\bullet$, $b_\bullet$ and $\overline{b}_\bullet$ correspond to the first parameter, the second parameter and the third parameter, respectively), where $B_\bullet$ and $\overline{b}_\bullet$ depend on the relative degree r, $\overline{b}_\bullet=\phi_\bullet \tanh(\phi_\bullet K_{s,\bullet}^{-1}\,{}^ts_\bullet)$ is a robust control term, $\phi_\bullet=\|B_\bullet\|\overline{u}$ with $\overline{u}=\overline{u}_v$, $\overline{u}_a$, and $\overline{u}_\tau$ in Modes II, III, and IV, respectively, and $K_{s,\bullet}=\mathrm{diagj}([k_{s,1}, \ldots, k_{s,n\bullet}]^T)$ is a positive-definite diagonal matrix. In Mode II, r=1, so $B_\bullet=\mathcal{L}_g{}^te_\bullet$, $b_\bullet=\hat{\mathcal{L}}_f{}^te_\bullet+K_{e,\bullet}{}^te_\bullet$, and ${}^ts_\bullet={}^te_\bullet$. In Modes III and IV, r=2, $$ B_\bullet = \mathcal{L}_g\mathcal{L}_f\,{}^te_\bullet,\ b_\bullet = \hat{\mathcal{L}}_f^2\,{}^te_\bullet + 2K_{e,\bullet}\,{}^t\dot{e} + K_{e,\bullet}^2\,{}^te, \text{ and } {}^ts_\bullet = {}^t\dot{e}_\bullet + K_{e,\bullet}\,{}^te_\bullet $$

Here, $$ \hat{\mathcal{L}}_f^i\,{}^te_\bullet = [\partial/\partial t + \mathcal{L}_f]^i\,{}^te_\bullet \text{ for } i = 1 \text{ or } 2. $$

Control input optimization may then be performed based on the safety control set ($\mathcal{U}_s$), the hard constraint control set ($\mathcal{U}_{hard}$) and the soft constraint control set ($\mathcal{U}_{soft}$) to determine the control input for controlling the robot manipulator.

Optimization in Task Space

First, task-space optimization may be performed according to various example embodiments. The task-space optimization comprises selecting a candidate control input (corresponding to the "first candidate control input" as described hereinbefore according to various embodiments) from an intersection of the safety control set and the hard constraint control set that has a minimum distance to the soft constraint control set. For example, the task-space optimization may be implemented as follows: $u_1=\mathrm{argmin}_u\ \mathrm{dist}(u, \mathcal{U}_{soft})$ subjects to $u\in\mathcal{U}_s$, and $u\in\mathcal{U}_{hard}$, where $\mathrm{dist}(u, \mathcal{U}_{soft})=\|B_{soft}u+b_{soft}\|^2$ represents the distance between the control u and control set $\mathcal{U}_{soft}$. For example, when the distance is zero, $u_1$ is in the soft constraint control set, so the soft constraint is ensured. Otherwise, the distance is minimized based on the above cost function, so the trajectory tracking error of the soft constraint (trajectory tracking error in the soft constraint DOF) is also minimized. Accordingly, a first condition ($u\in\mathcal{U}_s$) guarantees human safety. Meanwhile, a second condition ($u\in\mathcal{U}_{hard}$) ensures trajectory tracking in hard DOFs, i.e., primary task consistency. Furthermore, the above cost function ensures $u\in\mathcal{U}_{soft}$ as long as it is achievable. When it is achieved, trajectory tracking in the soft DOFs is ensured, and thus achieves full task consistency. Otherwise, when $u\in\mathcal{U}_{soft}$ is not achievable, the deviation from the sliding manifold is minimized, advantageously resulting in minimized trajectory-tracking error in soft DOFs.

Optimization in Joint Space

In addition, a joint-space optimization may be performed according to various example embodiments based on determining that the end effector performing the task has at least one redundant (or free) DOF. For example, the robot manipulator may have redundant DOFs (i.e., $n>n_{hard}+n_{soft}$) due to its inherent redundancy or according to the setting of free DOFs for a task. On the one hand, the redundant DOFs provide flexibility for the task-space optimization to achieve guaranteed human safety and hierarchical task consistency. On the other hand, various example embodiments note that it introduces a null space orthogonal to the task space. To address this, various example embodiments stabilize the robot manipulator's motion in the null space to avoid undesired behavior. In this regard, according to various example embodiments, this is achieved by minimizing the deviation of the joint position q(t) from its initial value q(0), i.e., $e_q=q(t)-q(0)$.

In particular, according to various example embodiments, the joint-space optimization comprises selecting a candidate control input (corresponding to the "second candidate control input" as described hereinbefore according to various embodiments) from an intersection of the safety control set and the hard constraint control set such that the second candidate control input has a same distance to the soft constraint control set as the first candidate control input and minimizes joint position deviation of the robot manipulator from an initial joint position thereof.

For example, the joint-space optimization may be implemented as follows: $u_2=\text{argmin}_u\ \text{dist}(u, \mathcal{U}_0)$ subjects to $u\in\mathcal{U}_s$, $u\in\mathcal{U}_{hard}$, and $B_{soft}u=B_{soft}u_1$. Here, $\mathcal{U}_0=\{u\in\mathcal{U}\mid Du+d\geq 0\}$ consists of the control input that makes the joint position q(t) stay at its initial position q(0). In Mode II, $D=I_n$ and $d=K_qe_q$, where $K_q$ is a positive definite diagonal matrix. In Mode III, $D=I_n$ and $d=2K_q\dot{e}_q+K_q^2e_q$. In Mode IV, $D=M^{-1}$ and $d=-M^{-1}(C\dot{q}+G)+2K_q\dot{e}_q+K_q^2e_q$. Accordingly, the above cost function minimizes the distance between $u_2$ and the control set $\mathcal{U}_0$. As a result, the robot manipulator's joint position is kept close to its initial position and the robot's motion in the null space is stabilized. The condition $B_{soft}u=B_{soft}u_1$ maintains the distance to the soft control set ($\mathcal{U}_{soft}$), i.e., $\text{dist}(u_2, \mathcal{U}_{soft})=\text{dist}(u_1, \mathcal{U}_{soft})$. The above two conditions ($u\in\mathcal{U}_s$, $u\in\mathcal{U}_{hard}$) inherit from the task-space optimization and the third condition ($B_{soft}u=B_{soft}u_1$) ensures the optimal motion in soft DOFs solved by the joint-space optimization unaffected. Furthermore, the cost function renders the manipulator's motion repetitive, which means stabilized motion in the null space. Accordingly, when $n>n_{hard}+n_{soft}$, there are multiple candidates of $u_1$ fulfilling the task-space optimization. In this case, the joint-space optimization selects the one that is closest to $\mathcal{U}_0$, i.e., $u_2$. Because $\mathcal{U}_0$ consists of a single control input, $u_2$ is always unique. The third condition $B_{soft}u=B_{soft}u_1$ maintains the distance to the soft control set, i.e., $\text{dist}(u_2, \mathcal{U}_{soft})=\text{dist}(u_1, \mathcal{U}_{soft})$. When $n=n_{hard}+n_{soft}$, the solution to the task-space optimization is unique. In this case, $u_1$ is the only candidate fulfilling the constraints of the joint-space optimization, so $u_2=u_1$. Therefore, the final control law is $u=u_1$ when $n=n_{hard}+n_{soft}$, and $u=u_2$ when $n>n_{hard}+n_{soft}$.

Universal Control Framework

Figure 12A:
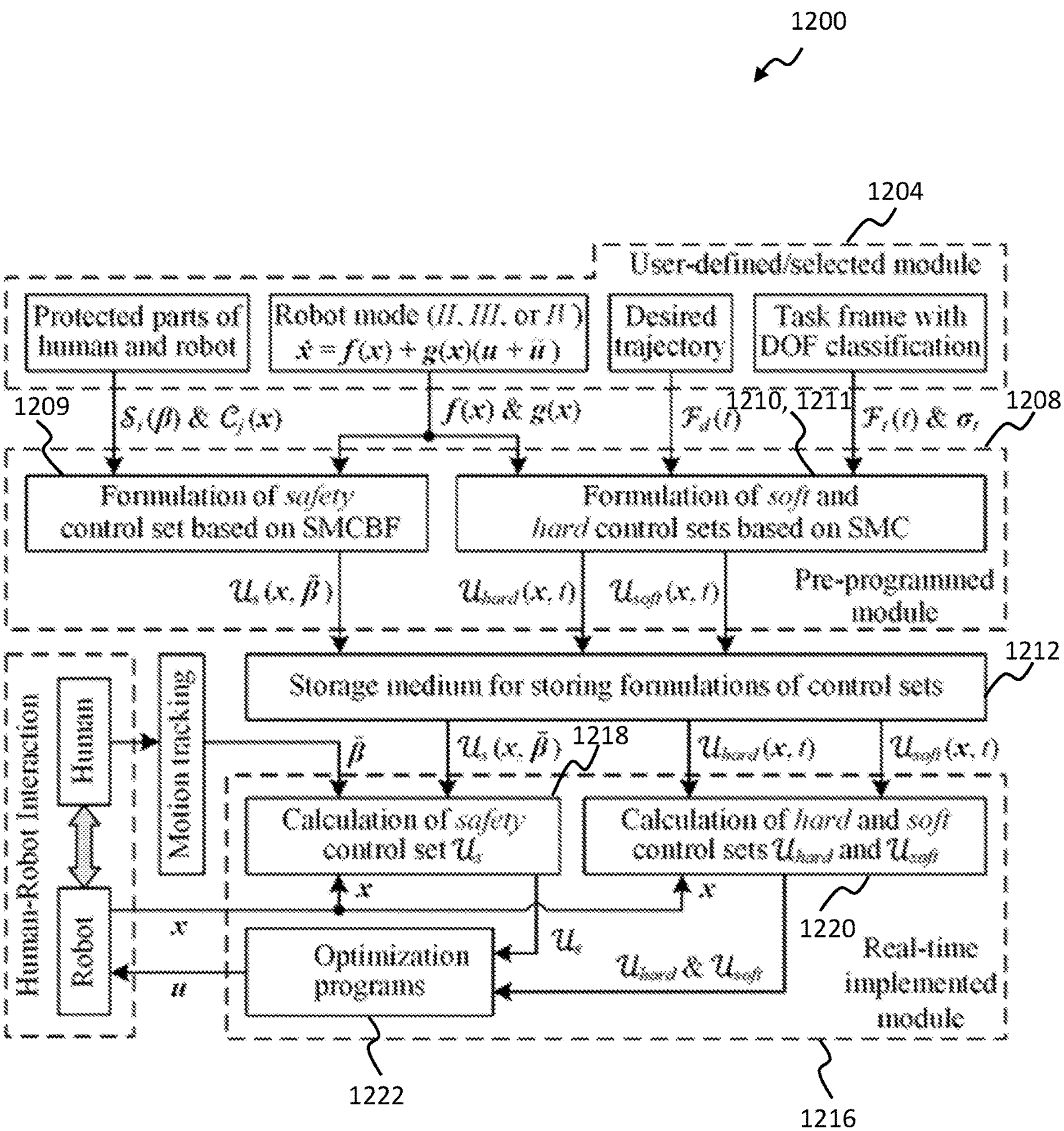
FIGS. 12A and 12B depict schematic block diagrams of the universal control method or framework, according to various example embodiments of the present invention.

FIG. 12A depicts a schematic block diagram of the universal control method or framework 1200 according to various example embodiments of the present invention (e.g., corresponding to the method 200 of controlling a robot manipulator as described hereinbefore according to various embodiments). The framework 1200 is based on a user-defined/selected module 1204, a pre-programmed module 1208, a storage medium 1212 and a real-time implemented module 1216.

For example, the user-defined/selected module 1204 allows a user to 1) define the protected/selected parts of the human and the robot; 2) select the control mode of the robot from a list of robot control modes; 3) define the desired trajectory $\mathcal{F}_d(t)$ of the end effector of the robot manipulator; and 4) define the task frame $\mathcal{F}_t(t)$ and its DOF classification $\sigma_t$.

In various example embodiments, the pre-programmed module 1208 may be configured to generate or formulate a safety control set module 1209 ($\mathcal{U}_s(x, \bar{\beta})$) (e.g., corresponding to the safety control function as described hereinbefore according to various embodiments), a hard constraint control set module 1210 $\mathcal{U}_{hard}(x, t)$ (e.g., corresponding to the hard constraint function) and a soft constraint control set module 1211 $\mathcal{U}_{soft}(x, t)$ (e.g., corresponding to the soft constraint function as described hereinbefore according to various embodiments). For example, the pre-programmed module 1208 may be executed before the robot manipulator begins operating to perform a task.

According to various example embodiments, the safety control set module 1209 may be configured to determine or produce the safety control set $\mathcal{U}_s$ as a function of the robot state x and the human state $\bar{\beta}$ using the defined protected human parts $\mathcal{S}_i(\beta)$ and robot parts $\mathcal{C}_j(x)$, and the control-affined model of the robot manipulator in the selected control mode, i.e., $\dot{x}=f(x)+g(x)(u+\tilde{u})$. For example, the human state is $\bar{\beta}=[\beta^T, \dot{\beta}^T]^T$ in Mode II and $\bar{B}=[\beta^T, \dot{\beta}^T, \ddot{\beta}^T]^T$ in Modes III and IV.

Figure 13A:
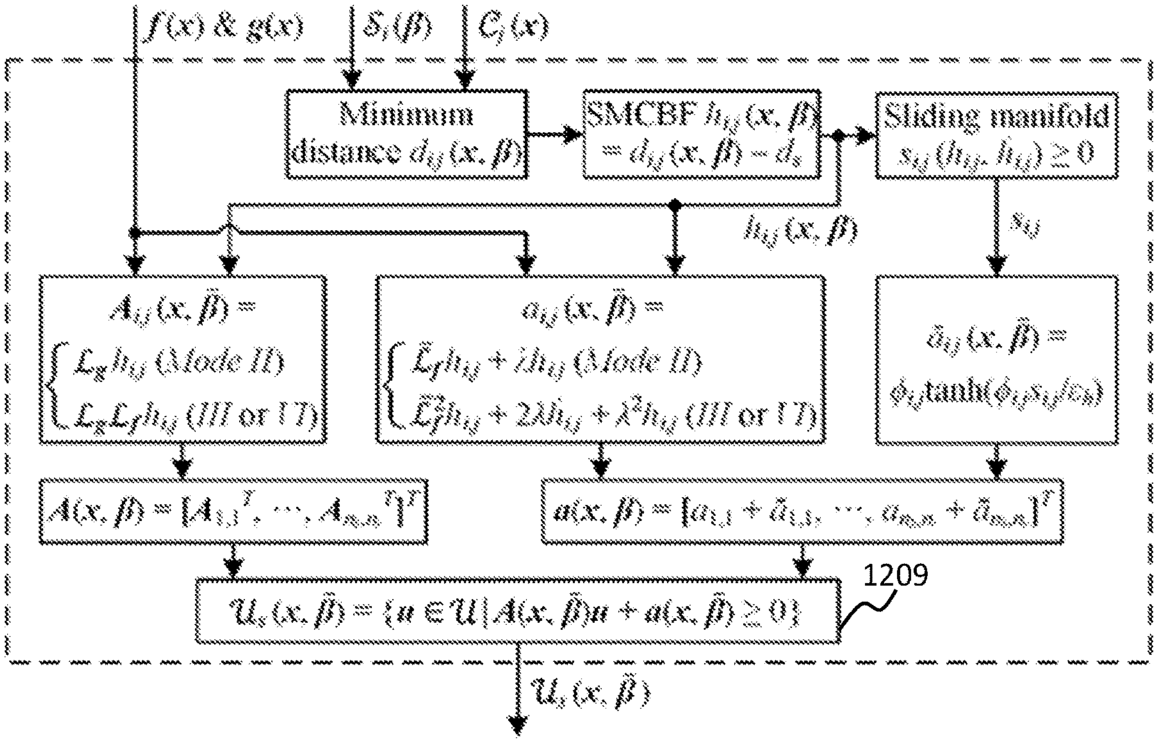
FIG. 13A depicts a schematic block diagram showing an example detailed formulation of a safety control set module for determining the safety control set, according to various example embodiments of the present invention.

FIG. 13A depicts a schematic block diagram showing an example detailed formulation of the safety control set module $\mathcal{U}_s(x, \bar{\beta})$ 1209 for determining the safety control set $\mathcal{U}_s$ according to various example embodiments of the present invention. First, the minimum distance $d_{i,j}(x, \beta)$ between a protected/selected human part $\mathcal{S}_i(\beta)$ and a protected/selected robot part $\mathcal{C}_j(x)$ is formulated as a function of the human position β and the robot state x. Second, an SMCBF $h_{i,j}(x, \beta)=d_{i,j}(x, \beta)-d_s$ (e.g., corresponding to the safety control function as described hereinbefore according to various embodiments) is formulated such that the collision between the protected human part $\mathcal{S}_i$ and the protected robot part $\mathcal{C}_j$ is avoided when the SMCBF $h_{i,j}$ is positive. Third, a sliding manifold $s_{i,j}$ is defined using the SMCBF $h_{i,j}$ and its time derivative $\dot{h}_{i,j}$, such that the SMCBF $h_{i,j}$ is kept positive on the sliding manifold $s_{i,j}\geq 0$. Finally, the safety control set module $\mathcal{U}_s(x, \bar{\beta})$ 1209 configured to determine a set of control inputs that leads to the sliding manifold $s_{i,j}\geq 0$ is formulated.

As shown in FIG. 13A, the formulation of the safety control set module $\mathcal{U}_s(x, \bar{\beta})$ 1209 comprises $A_{i,j}(x, \bar{\beta})$, $a_{i,j}(x, \bar{\beta})$, and $\bar{a}_{i,j}(x, \bar{\beta})$ (e.g., respectively corresponding to the first parameter, second parameter and third parameter of the safety control function as described hereinbefore according to various embodiments). According to various example embodiments, the Lie derivatives used to formulate $A_{i,j}(x, \bar{\beta})$ and $a_{i,j}(x, \bar{\beta})$ are given as follows. For example, the function $f_d$ that gives the minimum distance between a point and a line-segment may be written as $f_d(p_{h,i}, p_{r,j-1}, p_{r,j})=\|p_a-P_s(\delta)p_b\|$, where $$p_a=(p_{r,j-1}+p_{r,j})/2-p_{h,i},\ p_b=(p_{r,j-1}-p_{r,j})/2,\ \delta=p_a^Tp_b\,/\,l_b^T$$

with $l_b=\|p_b\|$ being a constant, and $P_s\colon \mathbb{R}\to[-1, 1]$ is a unit $\mathcal{C}^2$ saturation function. Then, the Lie derivatives in $A_{i,j}$ and $a_{i,j}$ are as follows. In Mode II, $\mathcal{L}_gh_{i,j}=\bar{p}^T(H_aJ_a+H_bJ_b)$, and $\mathcal{L}_fh_{i,j}=-\bar{p}^TH_a\dot{p}_{h,i}$. In Mode III, $\mathcal{L}_g\mathcal{L}_fh_{i,j}=\bar{p}^T(H_aJ_a+H_bJ_b)$, and $$\bar{\mathcal{L}}_f^2h_{i,j}=\bar{p}^T\left(H_a\dot{J}_a+H_b\dot{J}_b+\dot{H}_aJ_a+\dot{H}_bJ_b\right)\dot{q}-\bar{p}^T\left(H_a\ddot{p}_{h,i}+\dot{H}_a\dot{p}_{h,i}\right)+\left(\dot{p}^T\dot{p}-\left(\bar{p}^T\dot{p}\right)^2\right)/\|p\|.$$

In Mode IV, $\mathcal{L}_g\mathcal{L}_fh_{i,j}=\bar{p}^T(H_aJ_a+H_bJ_b)M^{-1}$, and $$\bar{\mathcal{L}}_f^2h_{i,j}=-\bar{p}^T(H_aJ_a+H_bJ_b)M^{-1}(C\dot{q}+G)+\bar{p}^T\left(H_a\dot{J}_a+H_b\dot{J}_b+\dot{H}_aJ_a+\dot{H}_bJ_b\right)\dot{q}-\bar{p}^T\left(H_a\ddot{p}_{h,i}+\dot{H}_a\dot{p}_{h,i}\right)+\left(\dot{p}^T\dot{p}-\left(\bar{p}^T\dot{p}\right)^2\right)/\|p\|.$$

Here, $$\overline{p} = p / \|p\|,\ p = p_a - P_s(\delta) p_b,\ J_a = \partial p_a / \partial q,$$

$$J_b = \partial p_b / \partial q,\ H_a = I_3 - P_s'(\delta) p_b p_b^T / l_b^2,$$

$$H_b = -P_s(\delta) I_3 - P_s'(\delta) p_b p_a^T / l_b^2, \text{ and } P_s'(\delta) = dP_s(\delta)/d\delta.$$

According to various example embodiments, the hard constraint control set module $\mathcal{U}_{hard}(x, t)$ 1210 and the soft constraint control set module $\mathcal{U}_{soft}(x, t)$ 1211 may be configured to determine or produce the hard constraint control set $\mathcal{U}_{hard}$ and the soft constraint control set $\mathcal{U}_{soft}$ as functions of the robot state.x using the desired trajectory $\mathcal{F}_d(t)$, the task frame $\mathcal{F}_t(t)$ with DOF classification $\sigma_t$, and the control-affined model of the robot in the selected control mode, i.e., $\dot{x}=f(x)+g(x)(u+\tilde{u})$. A frame ($\mathcal{F}(t)$) may include a position (3D) and an orientation (3D). In this regard, various example embodiments use a frame to represent an object in a 3D space, such as the end effector of the robot manipulator. Then, the trajectory tracking of the object becomes to make the object's frame (e.g., end effector's frame $\mathcal{F}_e(t)$) coincides with a desired frame ($\mathcal{F}_d(t)$) for all time. Therefore, the desired frame (e.g., $\mathcal{F}_d(t)$) may be used to represent the desired trajectory.

Figure 13B:
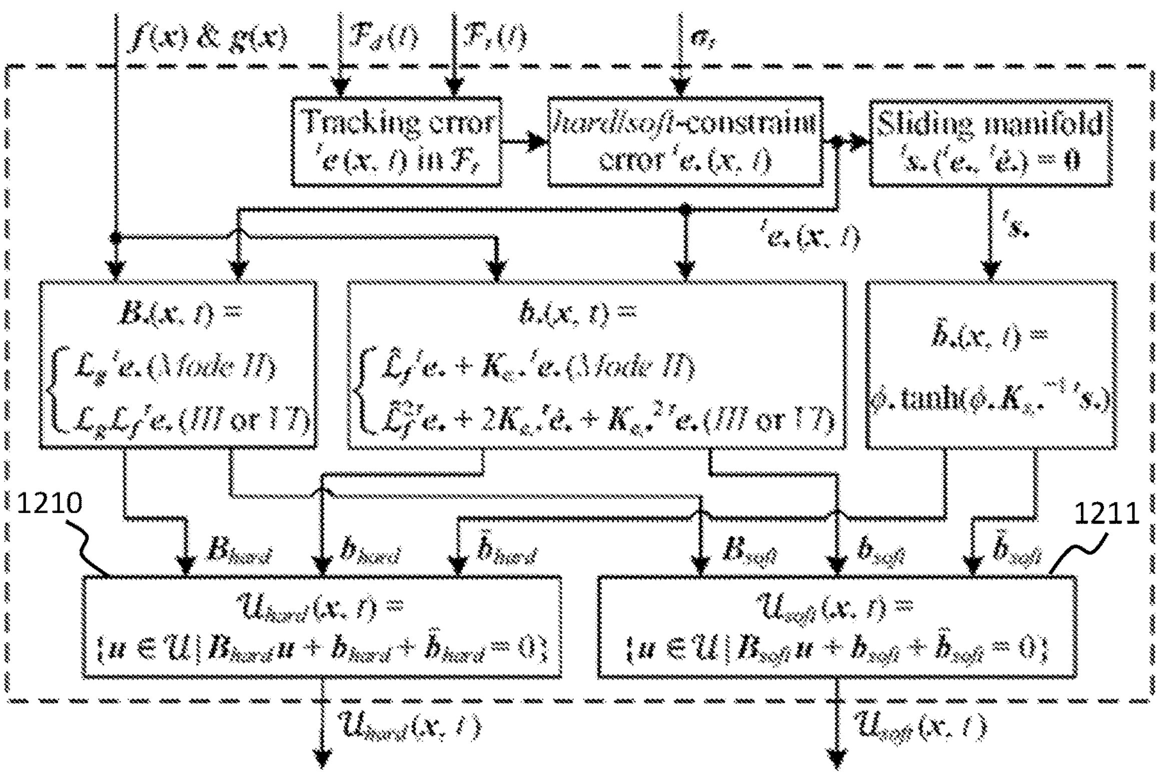
FIG. 13B depicts a schematic block diagram showing an example detailed formulation of a hard constraint control set module and a soft constraint control set module for determining the hard constraint control set and the soft constraint control set, respectively, according to various example embodiments of the present invention.

FIG. 13B depicts a schematic block diagram showing an example detailed formulation of the hard constraint control set module 1210 and the soft constraint control set module 1211 for determining the hard constraint control set $\mathcal{U}_{hard}$ and the soft constraint control set $\mathcal{U}_{soft}$, respectively, according to various example embodiments of the present invention. First, the task-frame tracking error ${}^te(x, t)$ is formulated using the robot state x, the desired trajectory $\mathcal{F}_d(t)$, and the task frame $\mathcal{F}_t(t)$. Second, the hard-constraint error ${}^te_{hard}(x, t)=N_{hard}{}^te$ (e.g., corresponding to the hard trajectory tracking error function for each hard constraint DOF as described hereinbefore according to various embodiments) and the soft-constraint error ${}^te_{soft}(x, t)=N_{soft}{}^te$ (e.g., corresponding to the soft trajectory tracking error function for each soft constraint DOF as described hereinbefore according to various embodiments) are formulated using the task-frame tracking error ${}^te(x, t)$ and the DOF classification $\sigma_t$. Third, two sliding vectors of sliding manifolds ${}^ts_{hard}$ and ${}^ts_{soft}$ are formulated based on the hard- and soft-constraint errors ${}^te_{hard}$ and ${}^te_{soft}$ and their time derivatives ${}^t\dot{e}_{hard}$ and ${}^t\dot{e}_{soft}$, such that the hard- and soft-constraint errors are kept zero on the sliding manifolds ${}^ts_{hard}=0$ and ${}^ts_{soft}=0$, respectively. Finally, the hard constraint control set module $\mathcal{U}_{hard}(x, t)$ 1210 that leads to the sliding manifold ${}^ts_{hard}=0$ and the soft constraint control set module $\mathcal{U}_{soft}(x, t)$ 1211 that leads to the sliding manifold ${}^ts_{soft}=0$ are formulated.

As shown in FIG. 13B, the formulation of $\mathcal{U}_\bullet(x, t)$ is based on $B_\bullet(x, \beta)$, $b_\bullet(x, \beta)$, and $\overline{b}_\bullet(x, \beta)$ (e.g., respectively corresponding to the first parameter, second parameter and third parameter of the hard/soft constraint function as described hereinbefore according to various embodiments), where •=hard or soft. According to various example embodiments, the Lie derivatives used to formulate $B_\bullet(x, \beta)$ and $b_\bullet(x,\beta)$ are given as follows. In Mode II, $$\mathcal{L}_g{}^te_\bullet = N_\bullet\left[(\mathcal{L}_g{}^te_p)^T, (\mathcal{L}_g{}^te_o)^T\right]^T \text{ with } \mathcal{L}_g{}^te_p = R_t^T J_v \text{ and } \mathcal{L}_g{}^te_o = R_t^T E J_\omega,$$

$$\text{and } \hat{\mathcal{L}}_f{}^te_\bullet = N_\bullet\left[\left(\hat{\mathcal{L}}_f{}^te_p\right)^T, \left(\hat{\mathcal{L}}_f{}^te_o\right)^T\right]^T \text{ with } \hat{\mathcal{L}}_f{}^te_p = -R_t^T \dot{p}_d + \dot{R}_t^T e_p \text{ and } \hat{\mathcal{L}}_f{}^te_o = -R_t^T E\omega_d + \dot{R}_t^T e_o.$$

In Mode III, $\mathcal{L}_g\mathcal{L}_L{}^te_\bullet=N_\bullet[(\mathcal{L}_g, \mathcal{L}_f{}^te_p)^T, (\mathcal{L}_g\mathcal{L}_f{}^te_o)^T]^T$ with $$\mathcal{L}_g\mathcal{L}_f{}^te_p = R_t^T J_v \text{ and } \mathcal{L}_g\mathcal{L}_f{}^te_o = R_t^T E J_\omega,$$

$$\text{and } \hat{\mathcal{L}}_f^2{}^te_\bullet = N_\bullet\left[\left(\hat{\mathcal{L}}_f^2{}^te_p\right)^T, \left(\hat{\mathcal{L}}_f^2{}^te_o\right)^T\right]^T \text{ with } \hat{\mathcal{L}}_f^2{}^te_p = R_t^T\left(\dot{J}_v\dot{q} - \ddot{p}_d\right) + 2\dot{R}_t^T\dot{e}_p + \ddot{R}_t^T e_p \text{ and } \hat{\mathcal{L}}_f^2{}^te_o = R_t^T\left(\left(E\dot{J}_\omega + \dot{E}J_\omega\right)\dot{q} - \left(E\dot{\omega}_d + \dot{E}\omega_d\right)\right) + 2\dot{R}_t^T\dot{e}_o + \ddot{R}_t^T e_o.$$

In Mode IV, $\mathcal{L}_g\mathcal{L}_f{}^te_\bullet=N_\bullet[(\mathcal{L}_g\mathcal{L}_f{}^te_p)^T, (\mathcal{L}_g\mathcal{L}_L{}^te_o)^T]^T$ with $$\mathcal{L}_g\mathcal{L}_f{}^te_p = R_t^T J_v M^{-1} \text{ and } \mathcal{L}_g\mathcal{L}_f{}^te_o = R_t^T E J_\omega M^{-1},$$

$$\text{and } \hat{\mathcal{L}}_f^2{}^te_\bullet = N_\bullet\left[\left(\hat{\mathcal{L}}_f^2{}^te_p\right)^T, \left(\hat{\mathcal{L}}_f^2{}^te_o\right)^T\right]^T \text{ with } \hat{\mathcal{L}}_f^2{}^te_p = R_t^T\left(-J_v M^{-1}(C\dot{q} + G) + \dot{J}_v\dot{q} - \ddot{p}_d\right) + 2\dot{R}_t^T\dot{e}_p + \ddot{R}_t^T e_p \text{ and } \hat{\mathcal{L}}_f^2{}^te_o = R_t^T\left(-J_\omega M^{-1}(C\dot{q} + G) + \left(E\dot{J}_\omega + \dot{E}J_\omega\right)\dot{q} - \left(E\dot{\omega}_d + \dot{E}\omega_d\right)\right) + 2\dot{R}_t^T\dot{e}_o + \ddot{R}_t^T e_o.$$

Here, $E=(\eta_{ed}I_3-[\epsilon_{ed}]\times)/2$ is a matrix based on the unit quaternion $\{\eta_{ed}, \epsilon_{ed}\}$, where $[\epsilon_{ed}]\times$ is the skew-symmetric matrix extracted from $\epsilon_{ed}$ such that $\epsilon_{ed}\times\bullet=[\epsilon_{ed}]\times\bullet$ for $\forall\bullet\in\mathbb{R}^3$.

In various example embodiments, the safety control set module 1209, the hard constraint control set module 1210 and the soft constraint control set module 1211 formulated are stored in a computer readable storage medium 1212. The real-time implemented module 1216 may then be executed repeatedly or continuously in real-time to control the robot manipulator to operate in the shared workspace with the human.

The real-time implemented module 1216 may comprise a safety control set determining module 1218 configured to determine the safety control set $\mathcal{U}_s$, a constraint control set determining module 1220 configured to determine the hard constraint control set $\mathcal{U}_{hard}$ and the soft constraint control set $\mathcal{U}_{soft}$, and a control input optimization module 1222 configured to perform control input optimization based on the safety control set $\mathcal{U}_s$, the hard constraint control set $\mathcal{U}_{hard}$ and the soft constraint control set $\mathcal{U}_{soft}$. The safety control set determining module 1218 may be configured to determine the current safety control set $\mathcal{U}_s$ using the safety control set formulation (safety control set module) ($\mathcal{U}_s(x, \beta)$) 1209 based on the current robot state x and the current human state $\beta$. The constraint control set determining module 1220 may be configured to determine the current hard control set $\mathcal{U}_{hard}$ and the current soft control set $\mathcal{U}_{soft}$ using the hard constraint control set formulation (hard constraint control set module) ($\mathcal{U}_{hard}(x, t)$) 1210 and the soft constraint control set formulation (soft constraint control set module) ($\mathcal{U}_{soft}(x, t)$ 1211, respectively, based on the current robot state x. The control input optimization module 1222 performs control input optimization based on the current control sets $\mathcal{U}_s$, $\mathcal{U}_{hard}$, and $\mathcal{U}_{soft}$ determined.

Figure 13C:
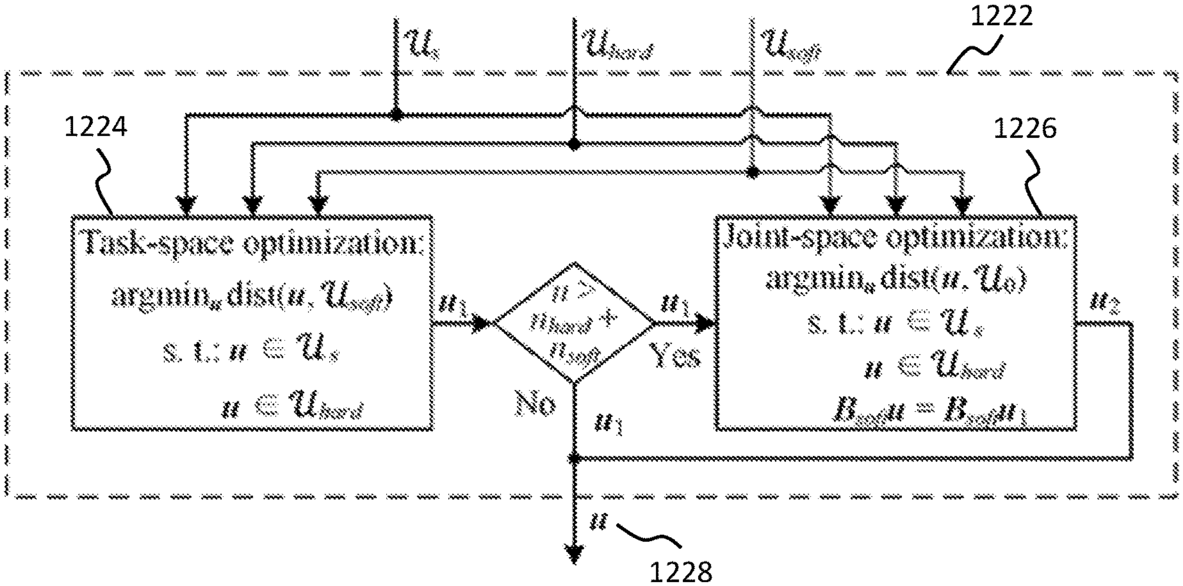
FIG. 13C depicts a schematic block diagram showing an example detailed implementation of a control input optimization module, according to various example embodiments of the present invention.

FIG. 13C depicts a schematic block diagram showing an example detailed implementation of the control input optimization module 1222 according to various example embodiments of the present invention. In various example embodiments, the control input optimization module 1222 comprises a task-space optimization module 1224 and a joint-space optimization module 1226. The task-space optimization module 1224 is configured to determine a first candidate control input $u_1$ for the robot manipulator based on the current control sets $\mathcal{U}_s$, $\mathcal{U}_{hard}$, and $\mathcal{U}_{soft}$. In particular, as described hereinbefore, the task-space optimization module 1224 is configured to select the first candidate control input $u_1$ from an intersection of the safety control set and the hard constraint control set that has a minimum distance to the soft constraint control set.

Figure 14A:
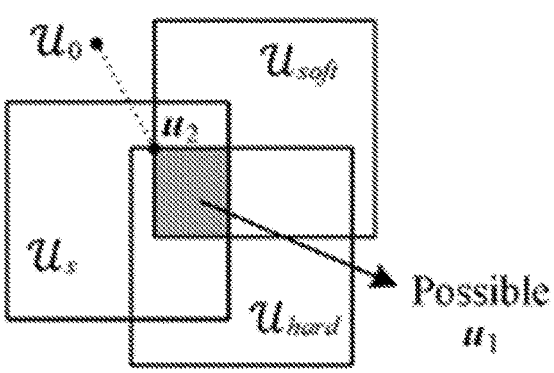
FIG. 14A depicts a schematic drawing illustrating the selection of a candidate control input when the soft constraint can be achieved, according to various example embodiments of the present invention.
Figure 14B:
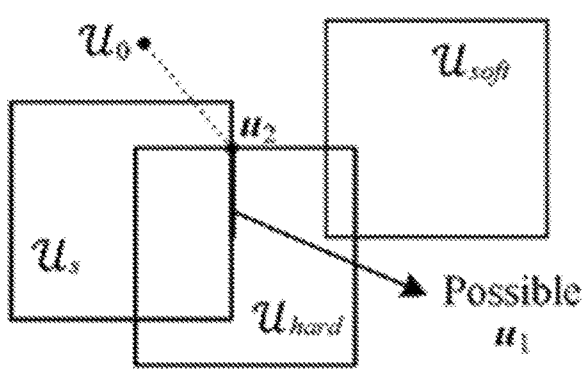
FIG. 14B depicts a schematic drawing illustrating the selection of a candidate control input when the soft constraint cannot be achieved, according to various example embodiments of the present invention.

In various example embodiments, if the robot manipulator has at least one redundant DOF (e.g., free DOF), i.e., $n>n_{hard}+n_{soft}$, the joint-space optimization module 1226 is configured to determine a second candidate control input $u_2$ based on the current control sets $\mathcal{U}_s$, $\mathcal{U}_{hard}$, and $\mathcal{U}_{soft}$. In particular, as described hereinbefore, the joint-space optimization module 1226 is configured to select the second candidate control input from an intersection of the safety control set and the hard constraint control set such that the second candidate control input has the same distance to the soft constraint control set as the first candidate control input and minimizes joint position deviation of the robot manipulator from an initial joint position thereof. When $n>n_{hard}+n_{soft}$, there are multiple candidate control inputs of $u_1$ fulfilling the task-space optimization. Accordingly, the joint-space optimization is configured to seek to select the candidate control input $u_2$ that is closest to $\mathcal{U}_0$. Accordingly, the control input u for controlling the robot manipulator is set as the first candidate control input ($u=u_1$) based on determining that the component has no redundant DOF (e.g., no free DOF), or the control input u for controlling the robot manipulator is set as the second candidate control input ($u=u_2$) based on determining that the component has at least one redundant DOF (e.g., at least one free DOF). For illustration purposes and without limitation, FIGS. 14A and 14B depict schematic drawings illustrating the selection of the first and second candidate control inputs by the task-space optimization module 1224 and the joint-space optimization module 1226. As illustrated in FIG. 14A, when the intersection of the control sets $\mathcal{U}_s$, $\mathcal{U}_{hard}$, and $\mathcal{U}_{soft}$ is non-empty (i.e., the soft constraint can be achieved), all candidate control inputs in the intersection are possible $u_1$, and $u_2$ is the closest candidate control input $\mathcal{U}_0$ among all possible $u_1$. As illustrated in FIG. 14B, when the intersection of the control sets $\mathcal{U}_s$, $\mathcal{U}_{hard}$, and $\mathcal{U}_{soft}$ is empty (i.e., the soft constraint cannot be achieved), the candidate control inputs in the intersection of $\mathcal{U}_s$ and $\mathcal{U}_{hard}$ with minimum distance to $\mathcal{U}_{soft}$ are possible $u_1$, and $u_2$ is the closest candidate control input to $\mathcal{U}_0$ among all possible $u_1$.

According to various example embodiments, the final control input u 1228 generated by the control input optimization module 1222 may then be applied or inputted to the robot manipulator to control it. In various example embodiments, for robot manipulator operating in Mode II, III or IV, the final control input u 1228 may be directly applied to the robot manipulator. However, for a robot manipulator operating in Mode I, various example embodiments further process the final control input u 1228 prior to applying or inputting it to the robot manipulator. In particular, various example embodiments convert the final control input u 1228 (e.g., being a joint-velocity control input, a joint-acceleration control input or a joint-torque control input) to a joint-position control input.

Figure 12B:
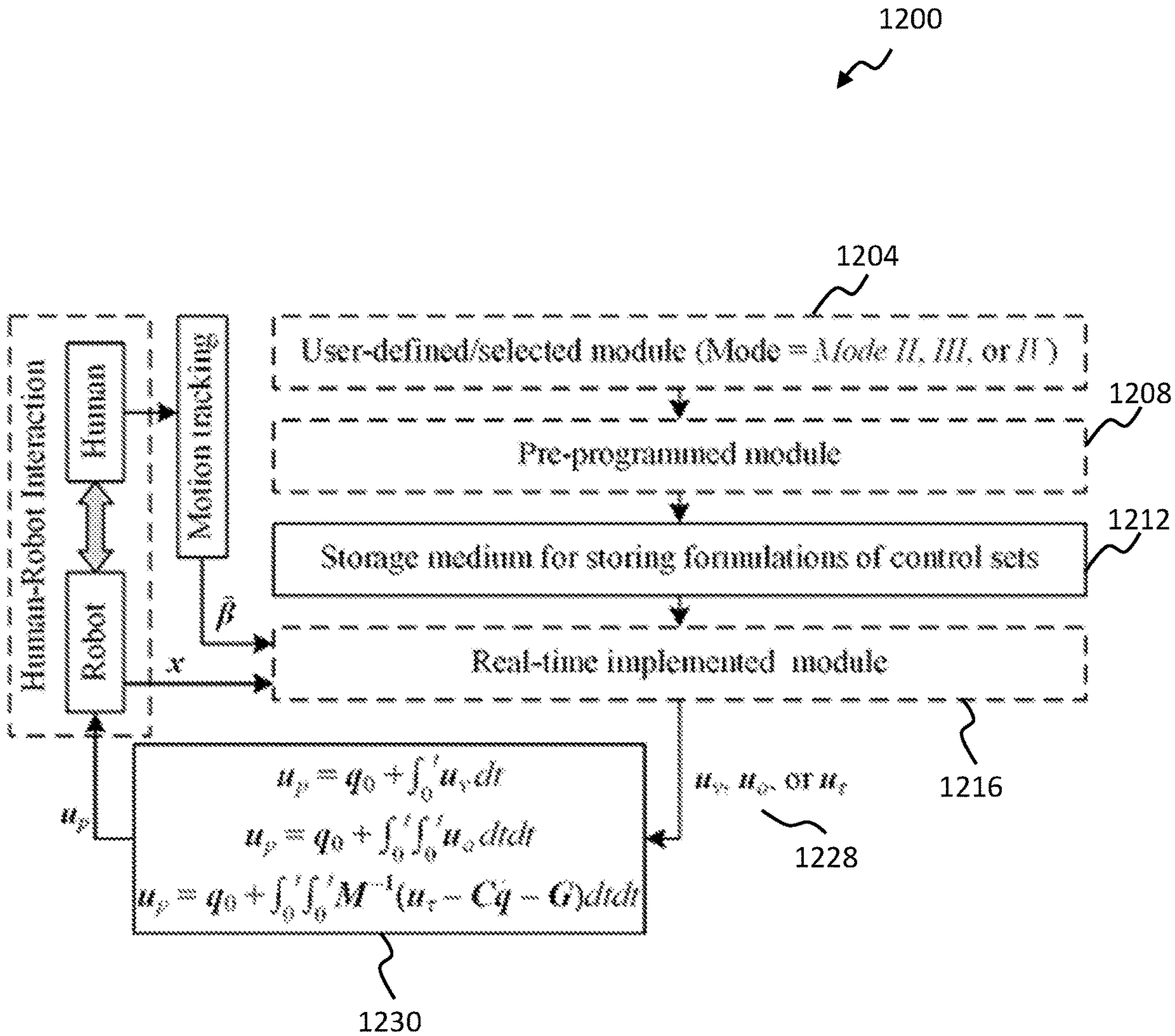

FIG. 12B depicts a schematic block diagram of the universal control method 1200 as described hereinbefore with reference to FIG. 12A but with additional implementation details of the above-mentioned processing of the final control input u 1228 shown, such as in the form of an integrator 1230, according to various example embodiments of the present invention in the case of the robot manipulator operating in a joint-position control mode (i.e., Mode I). For example, the real-time implemented module 1216 may generate a final control input u 1228 in the form of a velocity control input $u_v$, an acceleration control input $u_a$ or a torque control input $u_\tau$ according to the robot state x and the human state $\beta$ in real time. Thereafter, based on determining the robot manipulator is operating in a joint-position control mode (i.e., Mode I), $u_v$, $u_a$, or $u_\tau$ may then be integrated as follows to convert the final control input 1228 into a joint-position control input, which may be implemented as follows according to various example embodiments of the present invention:

$$u_p\colon u_p = q_0 + \int_0^t u_v dt,\ u_p = q_0 + \int_0^t \int_0^t u_a dt dt,$$

$$\text{or } u_p = q_0 + \int_0^t \int_0^t M^{-1}(u_\tau - C\dot{q} - G)dt dt,$$

where $q_0=q(0)$ is the initial configuration of the robot. In this regard, the universal control framework 1200 together with the integrator 1230 works as a real-time motion planner that ensures human safety and task consistency.

According to various example embodiments, the control gains in the universal control framework 1200 can be tuned as follows regardless of the robot model.

First, $\varepsilon_h$ and $K_s$ in the robust control terms described hereinbefore may be tuned. For example, $\varepsilon_h$ determines the steady-state error of the SMCBF while $K_s$ determines the steady-state errors of the task constraints. The same HRI scenario was simulated using large and small gains with an order of magnitude difference. It was seen that the steady-state errors decrease as $\varepsilon_h$ and $K_s$ increases. Therefore, according to various example embodiments, $\varepsilon_h$ and $K_s$ are configured or selected to be large enough to limit the steady-state errors to tolerances.

Next, $\lambda$ and $K_e$ may be tuned. For example, a small $\lambda$ makes the robot reacts to the approaching human in advance, while a large $\lambda$ prevents the robot's reaction until the human is very close to the robot. Furthermore, a large $K_e$ can make the robot return to the desired trajectory quickly when the human retracts from the robot. Therefore, according to various example embodiments, $\lambda$ and $K_e$ are configured or selected to ensure smooth transitions between collision avoidance and task implementation.

Furthermore, according to various example embodiments, $K_q$ is set to tune the robot's motion in the free DOFs. For example, a large $K_q$ leads to an aggressive recovery motion in the free DOF while a large $K_q$ dampens the motion in the free DOF.

Figure 10:
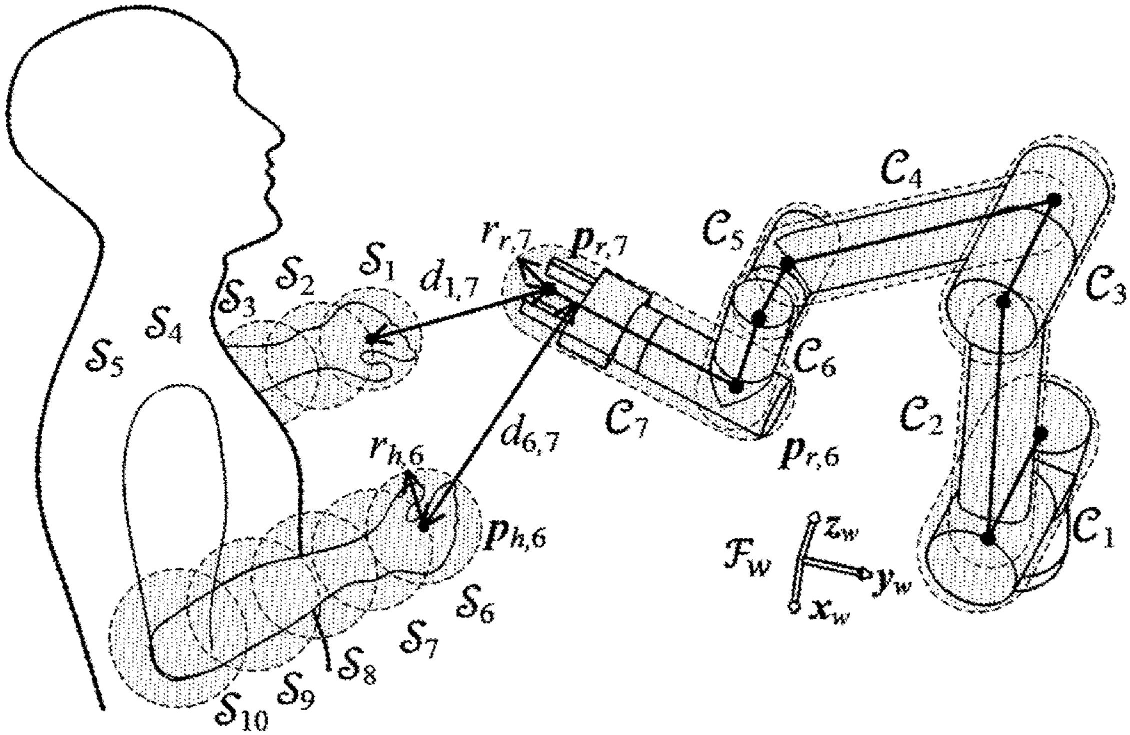
FIG. 10 depicts an example HRI scenario, according to various example embodiments of the present invention.

As described hereinbefore, FIG. 5 depicts a schematic drawing of a robot manipulator system 500 according to various embodiments of the present invention. In various example embodiments, for example, the robot manipulator 502 may have 6-DOFs and is equipped with a two-finger gripper. The sensor system 508 may include one or more distance sensors (e.g., LiDAR sensor(s)) configured to generate sensor data relating to the current state of the one or more humans 506 and based on which the human state information may be obtained. For example, the LiDAR sensor(s) may be configured to detect or track the human's hands in real time and provide their motion information in the 3D space to controller system 300 for processing to generate a control input to the robot manipulator 502 as described hereinbefore according to various example embodiments. For example, as shown in FIG. 5, two SMCBFs may be defined or constructed based on the minimum (or shortest) distance between a link (e.g., 7th link as shown in FIG. 10) of the robot manipulator 502 and the pair of human hands, respectively (i.e., the minimum distance $d_l$ between the link and the left hand and the minimum distance $d_r$ between the link and the right hand). With the motions of the human hands detected by the sensor system 508, the controller system 300 performs the universal control method 1200 as described hereinbefore according to various example embodiments to control the robot manipulator 502 for safe HRI. As an example and without limitation, the universal control method 1200 may be configured to generate the control input to the robot manipulator 502 at a frequency of about 100 Hz. It will be appreciated by a person skilled in the art that the sensor system 508 is not limited to any particular type of motion capture technique as long as the motions of the human hands can be detected or tracked. For example, various types of motion capture techniques exist in the art, such as but not limited to, the commercially available VICON motion capture system.

Experiments and Simulations

An experimental setup corresponding to that shown in FIG. 5 and described above was used to test the universal control method 1200 (which may herein be referred to simply as the present control method) according to various example embodiments of the present invention. The experimental setup includes a robot manipulator (UR5e, Universal Robots) having 6-DOFs and equipped with a two-finger gripper (2F-85, ROBOTIQ), two LiDAR cameras (L515, Intel RealSense), and a computer with a CPU (W-2123 @3.60 GHz, Intel Xeon). There is an ArUco marker attached to each hand of the human corresponding to the selected or protected part of the human. The LiDAR cameras track the ArUco markers in real time and provide their 3D motions to the control framework 1200 to represent the human hands. In the experiments, two SMCBFs were constructed based on the minimal distance between the 6th link of the robot manipulator and the human hands, i.e., $d_l$ and $d_r$ shown in FIG. 5. With the motions of human hands detected by the LiDAR cameras, the computer implements the present control method 1200 at a frequency of 100 Hz and sends the control input to the robot manipulator. By way of examples only and without limitations, the default values of constant parameters used in the experiments are listed in Table I below.

TABLE I

VALUES OF PARAMETERS IN EXPERIMENTS AND SIMULATIONS

| | |
|---|---|
| SMCBFs | $\lambda = 6$, $\varepsilon_h = 0.1$, $d_s = 0.16$ m. |
| Constraints | $K_e = \mathrm{diag}([3]I_3, 5I]_3]^T)$, $K_s = 0.1I_6$, $K_q = 10I_6$. |
| Mode I | $u_{p,\ min} = -\pi 1_6$, $u_{p,\ max} = \pi 1_6$, $\bar{u}_p = 0.15$. (unit: rad) |
| Mode II | $u_{v,\ min} = -31_6$, $u_{v,\ max} = 31_6$, $\bar{u}_v = 0.5$. (unit: rad/s) |
| Mode III | $u_{a,\ min} = -101_6$, $u_{a,\ max} = 101_6$, $\bar{u}_a = 1.7$. (unit: rad/s$^2$) |
| Mode IV | $u_{\tau,\ min} = -[281_3]^T], 1501_3]^T]]^T]$, $u_{\tau,\ max} = [281_3{}^T], 1501_3{}^T]]{}^T]]]]$, $\bar{u}_\tau =$ 1.5. (unit: N · m) |

Validation of Guaranteed Human Safety with Comparison to APF-Based Method

Figure 15A:
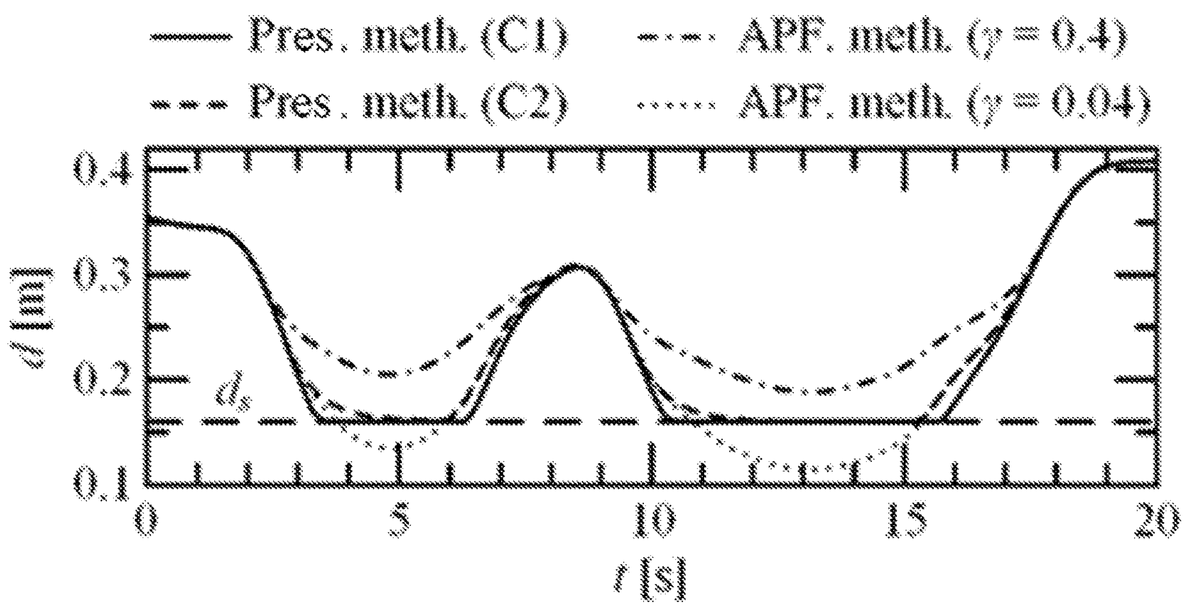
FIG. 15A depicts plots showing the distance d between the human's hand and the end effector of the robot manipulator in comparison experiments conducted between the present control method and the conventional APF-based method.

To demonstrate the effectiveness of the present control method according to various example embodiments, the guaranteed human safety based on SMCBF according to various example embodiments is validated with a comparison to the conventional APF-based method, and the comparison results are shown in FIG. 15A. The robot manipulator holds a cup with water at a static desired pose $\mathcal{F}_d$. According to various example embodiments, the task frame $\mathcal{F}_t$ is set identically to $\mathcal{F}_d$, and $\sigma_t$=[soft, soft, soft, hard, hard, hard]$^T$. In the experiment conducted, because it is difficult for a human to repeat the exact same motion for comparison, a robot is used to mimic the human's left hand. The robot manipulator operates on the joint-velocity control mode (i.e., Mode II). For the present control method 1200, the following two sets of control gains were tested. C1: $\varepsilon_h$=0.1, $K_s$=0.1$I_6$, $\lambda$=10, $K_e$=10$I_6$, and $K_q$=10$I_6$; $C_2$: $\varepsilon_h$=1, $K_s$=$I_6$, $\lambda$=1, $K_e$=$I_6$, and $K_q$=$I_6$. For the conventional APF-based method, the control law is $$u_v = u_{att} + \gamma J_{rep}^T F_{rep},$$

where $u_{att}$ is the control term for trajectory tracking, $J_{rep}$ is the Jacobian matrix, $F_{rep}$ is the repulsive force depending on the APF, and $\gamma$ is a coefficient to be selected.

The distance d between the human's hand and the end effector of the robot manipulator in the comparison experiments are plotted FIG. 15A. When the present control method 1200 was applied, the distance d was kept above a critical value $d_s$ regardless of the control gains, which means human safety was guaranteed. On the contrary, when the APF-based method was applied, the minimum distance depends on the value of $\gamma$ as well as the motion of the human's hand. In this case, it is difficult to guarantee human safety. Additionally, the APF-based method does not consider task consistency so the desired orientation of end effector is not ensured. It will be appreciated by a person skilled in the art that human safety is not limited to the human's hands and the end effector of the robot manipulator, and may be any part of the human and any part or component of the robot manipulator as desired which may be set or defined by a user, such as by defining multiple spheres and capsules to represent selected part(s) of the human and selected part(s) of the robot as desired as shown in FIG. 10.

Figure 15B:
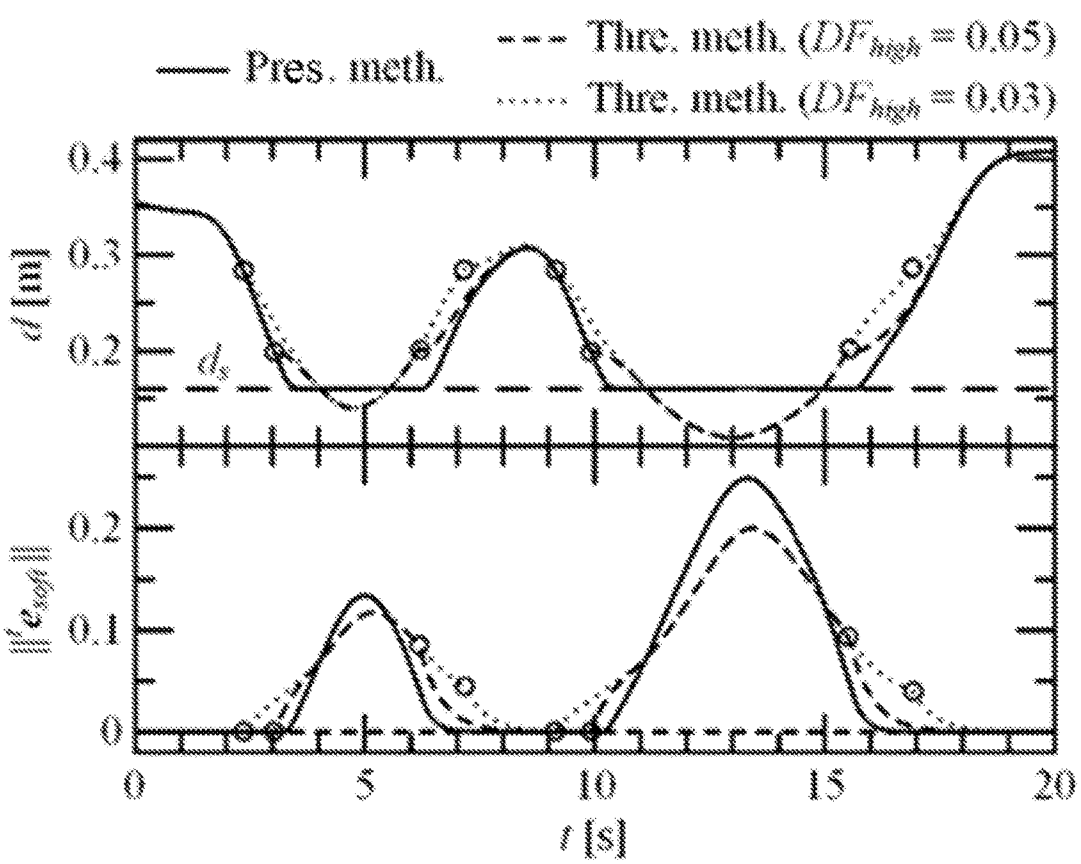
FIG. 15B depicts plots showing the distance d between the human's hand and the end effector of the robot manipulator and the state of the soft constraint in comparison experiments conducted between the present control method and the conventional threshold-based method.

Validation of Hierarchical Task Consistency with Comparison to Threshold-Based Method Next, the hierarchical task consistency based on the control input optimization according to various example embodiments is validated with a comparison to the conventional threshold-based method, and the comparison results are shown in FIG. 15B. In the present method 1200 according to various example embodiments, the state (enforced/relaxed) of the soft constraint is determined automatically by the control input optimization performed, so no threshold needs to be set. In the conventional threshold-based method, the danger field DF ($k_1$=0.01 and $k_2$=0.001) is compared with a threshold $DF_{high}$. The soft constraint is enforced when $DF \geq DF_{high}$ and relaxed otherwise. The results of the comparison experiments are plotted in FIG. 15B. When the threshold-based method is applied, increasing the threshold delays the relaxation of the soft constraint while bringing forward the constraint enforcement. Therefore, a large threshold may lead to a collision while a small threshold may sacrifice the full task consistency unnecessarily. Furthermore, jerky motion of the robot manipulator (see the circles in FIG. 15B) is observed when the state of the soft constraint changes and the control law switches consequently. In contrast, the present control method 1200 advantageously fulfills the full task consistency maximally by solving the control input optimization without setting a threshold. As a result, for example, the error of the soft constraint $\|^{t}e_{soft}\|$ deviates from 0 only when d is close to $d_s$. Meanwhile, the motion of the robot manipulator is smooth because the control input is continuously applied to the robot manipulator.

Validation of Universality

Figure 16A:
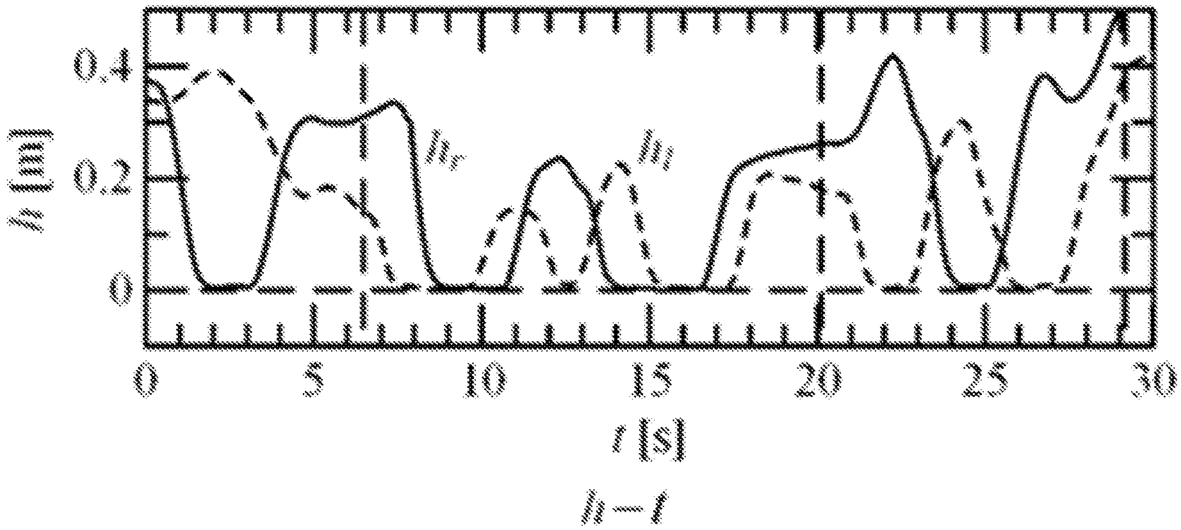
FIGS. 16A and 16B depict plots of time evolutions of two SMCBFs ($h_r$, and $h_l$ for the right hand and the left hand, respectively) and trajectory tracking errors produced according to various example embodiments of the present invention in an experiment conducted for the example task of picking a cup with water shown in FIGS. 11A to 11C.
Figure 16B:
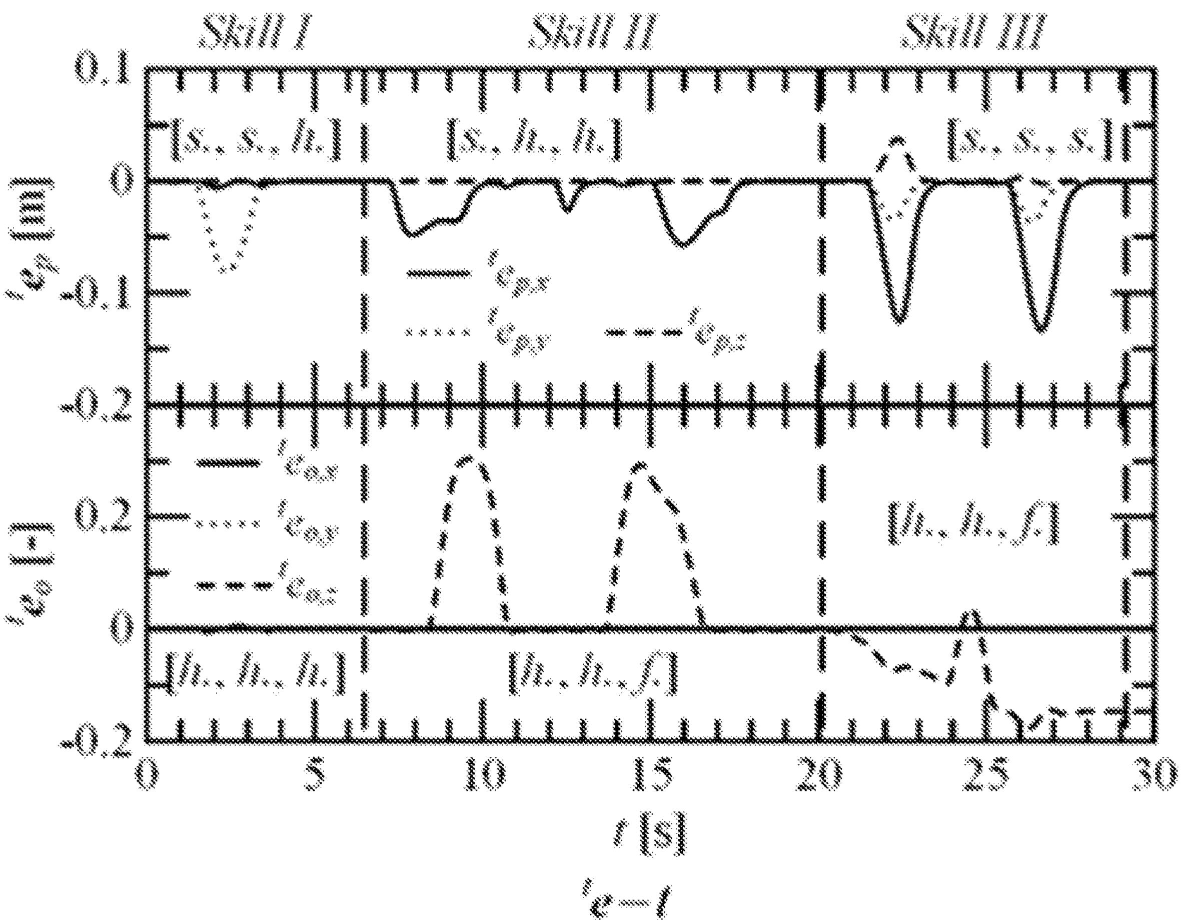

FIG. 16A depicts plots of two SMCBFs ($h_r$ and $h_l$ for the right hand and the left hand, respectively) produced according to various example embodiments in an experiment conducted for the example task of picking a cup with water as described hereinbefore with reference to FIGS. 11A to 11C. The robot manipulator operates in the joint-velocity control mode (i.e., Mode II). From FIG. 16A, it can be seen that the two SMCBFs are always kept positive, so the safety of the human's two hands is guaranteed. Furthermore, FIG. 16B depicts plots of the position and orientation errors relating to task consistency. As shown in FIG. 16B, it was found that the position and orientation errors in hard DOFs are always kept zero, which demonstrates that primary task consistency is always satisfied. It can also be seen in FIG. 16B that significant errors in soft DOFs only occur when at least one SMCBF is close to zero. This is because the soft constraint is enforced unless it conflicts with human safety, as designed according to various example embodiments of the present invention.

Figure 17A:
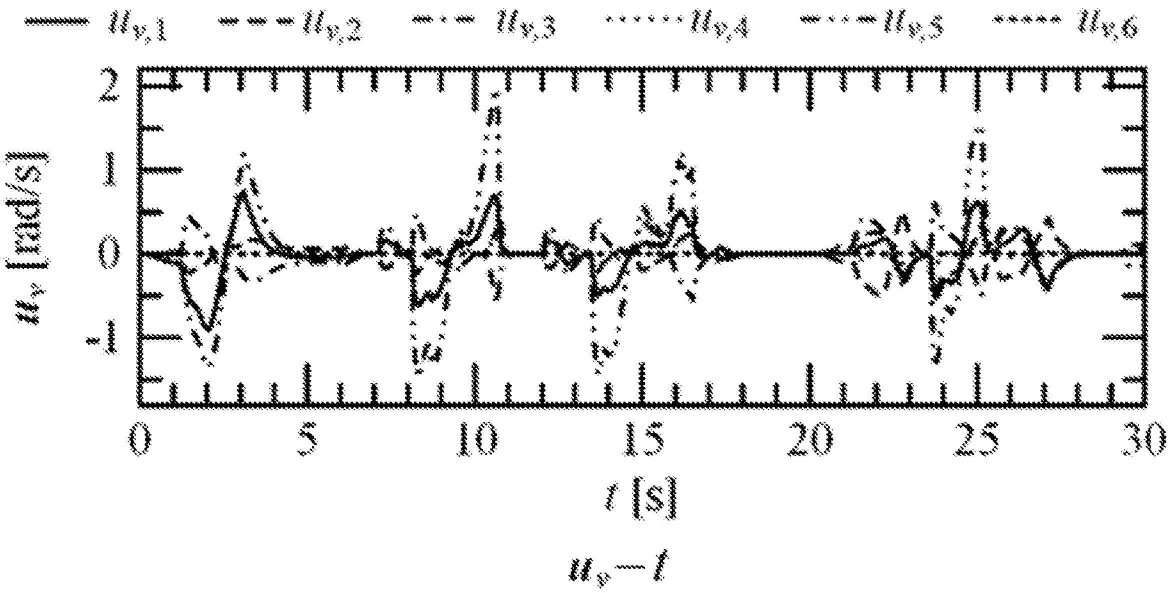
FIGS. 17A and 17B depict plots of the control input and input disturbance in the experiment conducted, according to various example embodiments of the present invention.
Figure 17B:
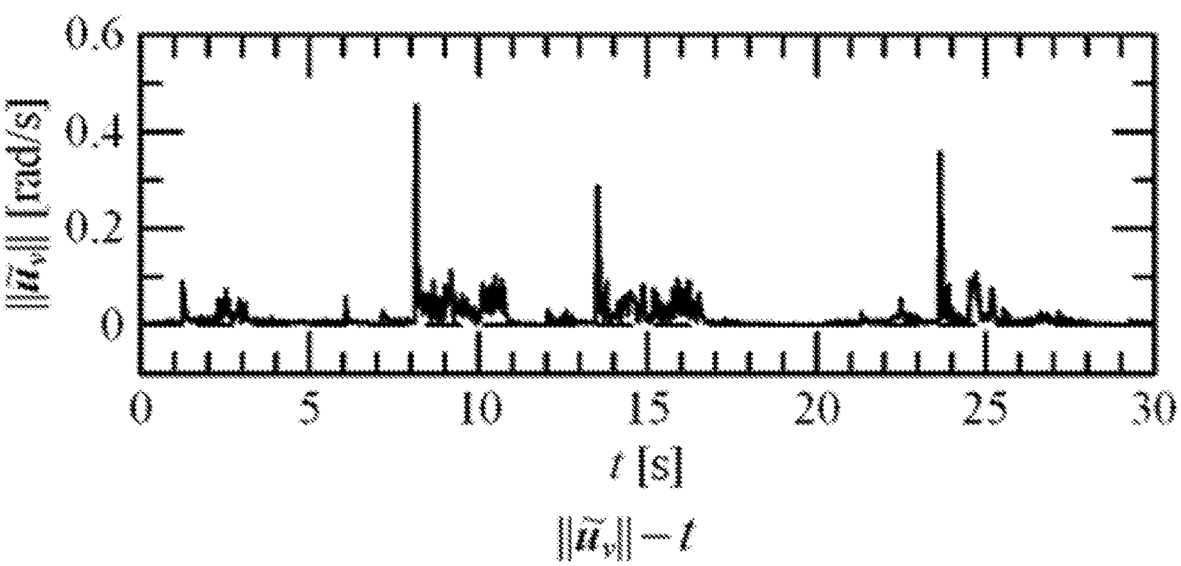
Figure 18A:
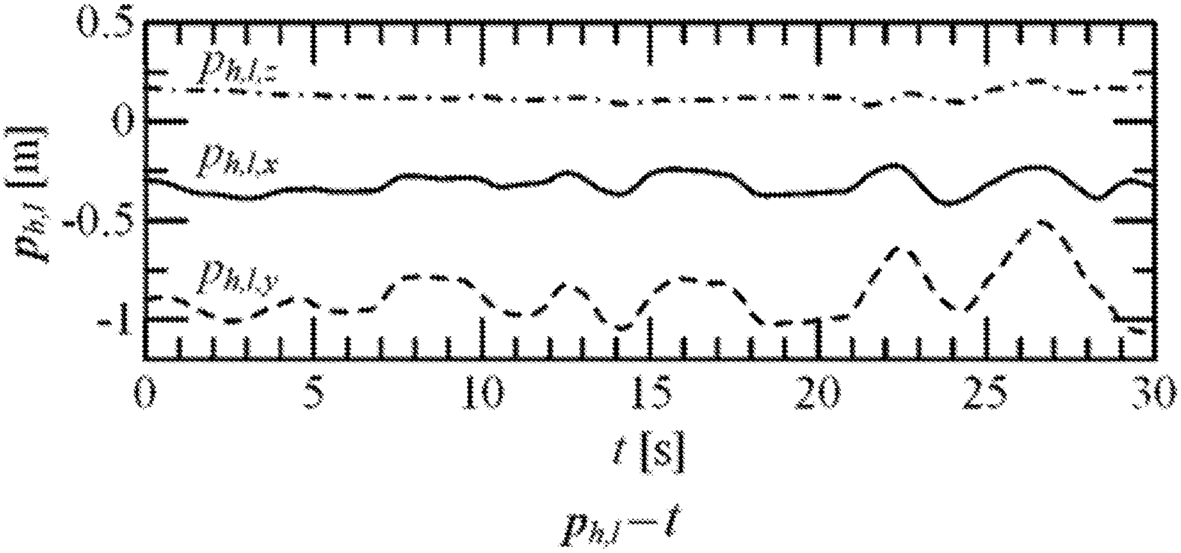
FIGS. 18A and 18B depict plots of the motions of the two hands of the human detected in the experiment conducted, according to various example embodiments of the present invention.
Figure 18B:
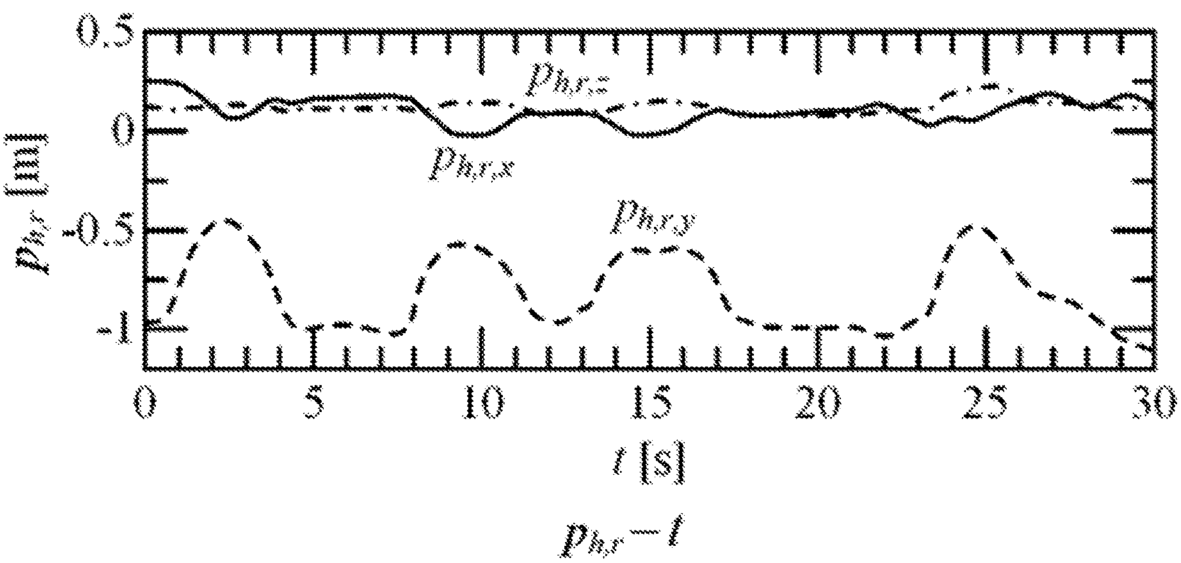

FIG. 17A depicts plots of the control input $u_v$ and FIG. 17B depicts plots of the norm of the input disturbance $\tilde{u}_v$. For example, the input disturbance $\tilde{u}_v$ can be obtained by subtracting $u_v$ from the actual joint velocity $\dot{q}$ read from the robot manipulator. From FIG. 17B, it can be seen that $\|\tilde{u}_v\|$ is bounded with $\overline{u}_v$=0.5 rad/s. FIGS. 18A and 18B depict plots of the motions of human hands detected.

Figure 19:
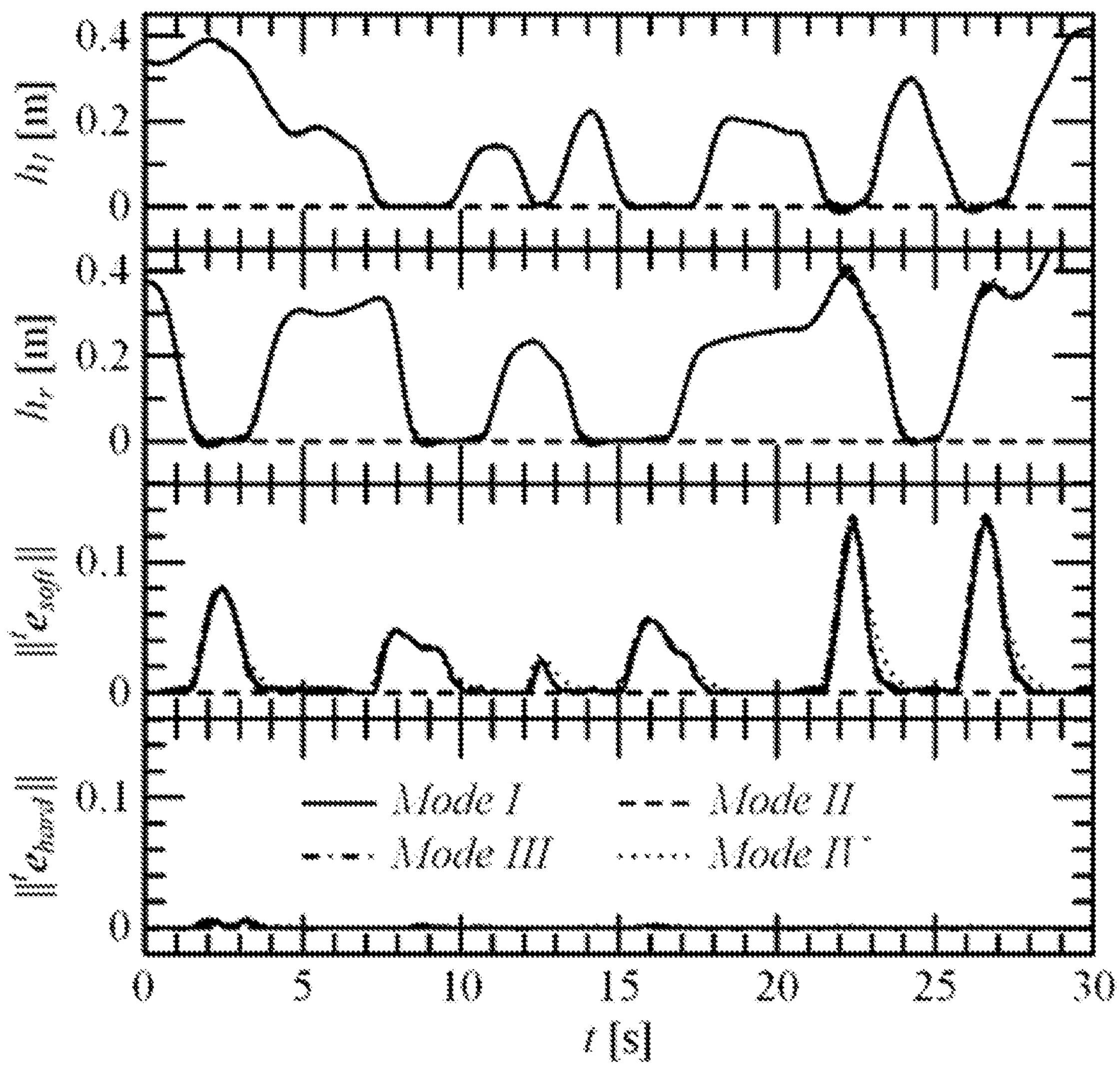
FIG. 19 depicts plots demonstrating performance consistency of the present control method in different robot control modes, according to various example embodiments of the present invention.

To validate the universality of the universal control method 1200 according to various example embodiments of the present invention, the same experiment was repeated for the robot manipulator operating in the joint-position control mode (i.e., Mode I) using the motions of human hands shown in FIGS. 18A and 18B. Furthermore, because the robot manipulator in the experimental setup cannot receive joint-acceleration or joint-torque commands, Modes III and IV were validated via simulations using the same motion of human hands. As shown in FIG. 19, in all four types of control modes, the human safety represented by the two SMCBFs and the primary task consistency represented by $\|^{t}e_{hard}\|$ are ensured at all times, while the full task consistency represented by $\|^{t}e_{soft}\|$ is ensured when the two SMCBFs are sufficiently large. It was also found that the time evolutions of the two SMCBFs and the errors of constraints were very similar in the simulations and experiments regardless of different robot control modes, thus validating the universality of the present control method or framework 1200 according to various example embodiments of the present invention.

Figure 20:
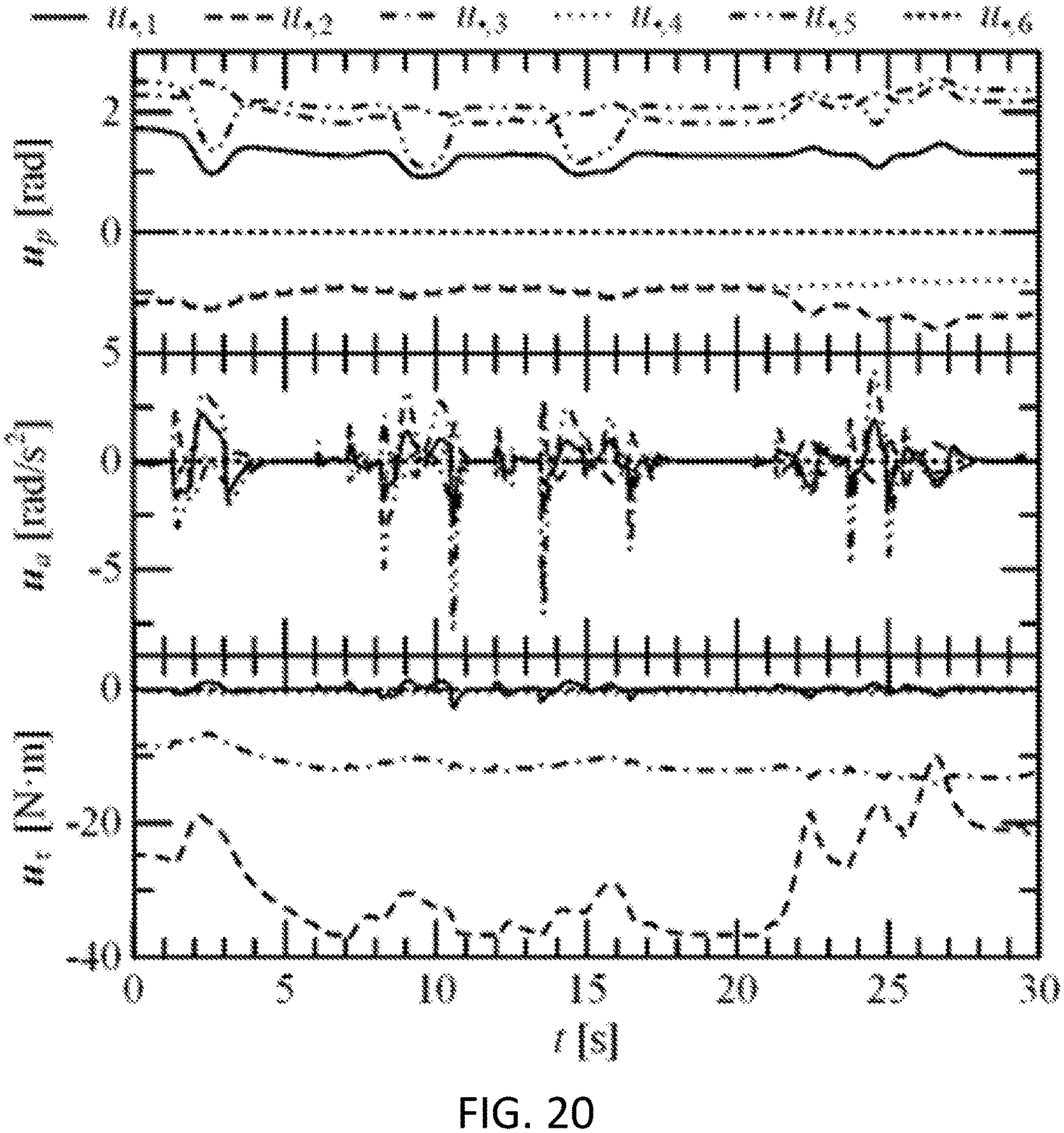
FIG. 20 depicts plots of the control inputs generated by the present control method for different types of control modes, according to various example embodiments of the present invention.
Figure 21:
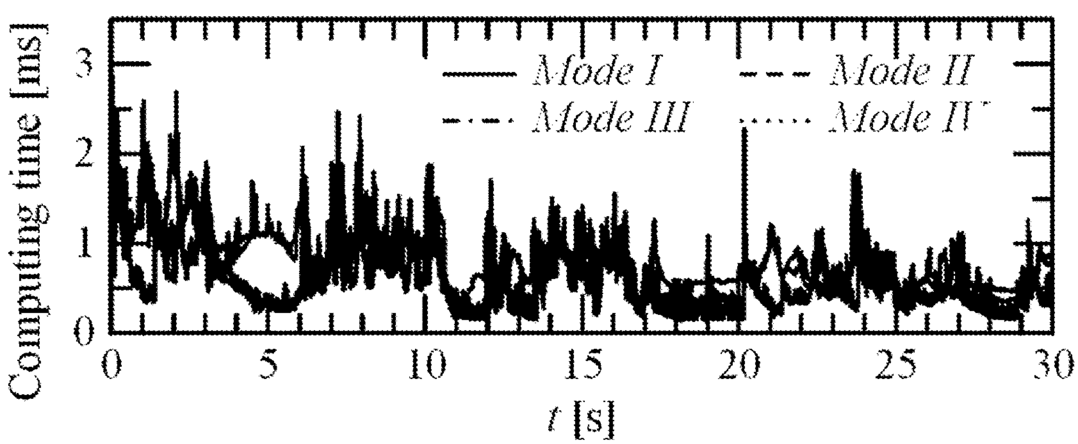
FIG. 21 depicts plots of the time consumed to compute the control inputs for different types of control modes, according to various example embodiments of the present invention.

FIG. 20 depicts plots of the control inputs generated by the present control method for different types of control modes. FIG. 21 depicts plots of the time consumed to compute the control inputs. It was found that the computing time was within 3 ms and largely independent of the type of control mode.

Accordingly, a universal control method or framework 1200 that can adapt to different types of control modes of robot manipulators is provided according to various example embodiments to achieve HRI with guaranteed human safety and hierarchical task consistency. With the universal control method 1200, for example, the robot manipulator can perform collaborative tasks with human(s) with guaranteed human safety. As described hereinbefore according to various example embodiments, first, the SMCBF that uses a sliding mode to deal with different relative degrees and reject disturbance is introduced, after which a set of SMCBFs is defined to guarantee human safety. Next, hard and soft constraints for primary and full task consistencies are defined by choosing a task frame and classifying its DOFs. Finally, a task-space optimization and a joint-space optimization are performed to generate a continuous control input for controlling the robot manipulator to operate in the shared workspace with human(s). Furthermore, from experiments and simulations conducted to validate the universal control method 1200 according to various example embodiments with comparisons to existing methods, it was found that the universal control method 1200 can keep human-robot distance above a critical value regardless of control gains. Furthermore, it can fulfill the full task consistency maximally without setting a threshold and the performance of the universal control method is consistent for different robot models.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of controlling a robot manipulator for operating in a shared workspace with one or more humans using at least one processor, the method comprising:

obtaining robot state information indicating a current state of the robot manipulator, human state information indicating a current state of the one or more humans, desired trajectory information for a task indicating a current desired trajectory of a component of the robot manipulator to perform the task and degree of freedom classification information for the task indicating a constraint type in trajectory tracking for each of a plurality of degrees of freedom of the component for the task;

determining a safety control set comprising a set of candidate control inputs with respect to a safety condition between one or more selected parts of the robot manipulator and one or more selected parts of the one or more humans using a safety control function based on the robot state information and the human state information;

determining a hard constraint control set comprising a set of candidate control inputs with respect to one or more hard constraints in trajectory tracking respectively in one or more degrees of freedom of the plurality of degrees of freedom of the component for the task using a hard constraint function based on the robot state information, the desired trajectory information of the component for the task and the degree of freedom classification information for the task;

determining a soft constraint control set comprising a set of candidate control inputs with respect to one or more soft constraints in trajectory tracking respectively in one or more degrees of freedom of the plurality of degrees of freedom of the component for the task using a soft constraint function based on the robot state information, the desired trajectory information of the component for the task and the degree of freedom classification information for the task; and performing control input optimization based on the safety control set, the hard constraint control set and the soft constraint control set to determine a control input for controlling the robot manipulator, wherein the safety control function is dependent on the current state of the robot manipulator and the current state of the one or more humans and is configured to determine the safety control set:

based on a control model for the robot manipulator that is dependent on the current state of the robot manipulator, the control input to the robot manipulator and a disturbance input to the robot manipulator, and is configured in a control affine form based on a control mode of the robot manipulator, and for each part pair of one or more part pairs of a selected part of the one or more selected parts of the robot manipulator and a selected part of the one or more selected parts of the one or more humans:

based on a safety distance function associated with the part pair that is dependent on the current state of the robot manipulator and the current state of the one or more humans and corresponds to a control barrier function, and based on a sliding manifold associated with the part pair configured based on the safety distance function associated with the part pair and a relative degree of the safety distance function with respect to the control input to the robot manipulator.

2. The method according to claim 1, wherein the control model for the robot manipulator is configured in the control affine form according to the control mode of the robot manipulator, and the control mode of the robot manipulator is any one of a joint-position control mode, a joint-velocity control mode, a joint-acceleration control mode and a joint-torque control mode.

3. The method according to claim 1, wherein the safety distance function associated with the part pair is configured based on a distance function configured to represent a distance between the selected part of the robot manipulator and the selected part of the one or more humans of the part pair and a predefined minimum safety distance relating to the safety condition between the selected part of the robot manipulator and the selected part of the one or more humans of the part pair.

4. The method according to claim 1, wherein the sliding manifold associated with the part pair is configured based on the relative degree of the safety distance function associated with the part pair with respect to the control input to the robot manipulator such that the sliding manifold has a relative degree of one with respect to the control input.

5. The method according to claim 1, wherein the safety control function is configured to determine the safety control set such that for said each part pair, the safety distance function associated with the part pair produces a value of greater than or equal to zero for all candidate control inputs in the safety control set regardless of the disturbance input in the control model.

6. The method according to claim 1, wherein the safety control function comprises a first parameter, a second parameter and a third parameter, the first and second parameters are each configured based on the control model for the robot manipulator, the safety distance function associated with said each part pair and the control mode of the robot manipulator, and the third parameter is configured based on the sliding manifold associated with said each part pair.

7. The method according to claim 6, wherein the safety control function is configured to determine the safety control set such that for each candidate control input in the safety control set, the first parameter multiplied by the candidate control input plus the second parameter and the third parameter is greater than or equal to zero.

8. The method according to claim 1, wherein the hard constraint function is dependent on the current state of the robot manipulator and is configured to determine the hard constraint control set:

based on the control model for the robot manipulator, and for each of the one or more degrees of freedom of the component classified as a hard constraint degree of freedom for the task based on the degree of freedom classification information for the task:

based on a hard trajectory tracking error function associated with the hard constraint degree of freedom that is dependent on the current state of the robot manipulator, and based on a sliding manifold associated with the hard constraint degree of freedom configured based on the hard trajectory tracking error function associated with the hard constraint degree of freedom and a relative degree of the hard trajectory tracking error function with respect to the control input to the robot manipulator, and the soft constraint function is dependent on the current state of the robot manipulator and is configured to determine the soft constraint control set:

based on the control model for the robot manipulator, and for each of the one or more degrees of freedom of the component classified as a soft constraint degree of freedom for the task based on the degree of freedom classification information for the task:

based on a soft trajectory tracking error function associated with the soft constraint degree of freedom that is dependent on the current state of the robot manipulator, and based on a sliding manifold associated with the soft constraint degree of freedom configured based on the soft trajectory tracking error function associated with the soft constraint degree of freedom and a relative degree of the soft trajectory tracking error function with respect to the control input to the robot manipulator.

9. The method according to claim 8, wherein the hard trajectory tracking error function associated with the hard constraint degree of freedom is configured to represent a trajectory tracking error of the component in the hard constraint degree of freedom based on the current state of the robot manipulator and the current desired trajectory of the component of the robot manipulator, and the soft trajectory tracking error function associated with the soft constraint degree of freedom is configured to represent a trajectory tracking error of the component in the soft constraint degree of freedom based on the current state of the robot manipulator and the current desired trajectory of the component of the robot manipulator.

10. The method according to claim 8, wherein the sliding manifold associated with the hard constraint degree of freedom is configured based on the relative degree of the hard trajectory tracking error function with respect to the control input to the robot manipulator such that the sliding manifold has a relative degree of one with respect to the control input, and the sliding manifold associated with the soft constraint degree of freedom is configured based on the relative degree of the soft trajectory tracking error function with respect to the control input to the robot manipulator such that the sliding manifold has a relative degree of one with respect to the control input.

11. The method according to claim 8, wherein the hard constraint function is configured to determine the hard constraint control set such that for said each hard constraint degree of freedom for the task, the hard trajectory tracking error function associated with the hard constraint degree of freedom produces a value of zero for all candidate control inputs in the hard constraint control set, and the soft constraint function is configured to determine the soft constraint control set such that for said each soft constraint degree of freedom for the task, the soft trajectory tracking error function associated with the soft constraint degree of freedom produces a value of zero for all candidate control inputs in the soft constraint control set.

12. The method according to claim 8, wherein the hard constraint function comprises a first parameter, a second parameter and a third parameter, the first and second parameters each being configured based on the control model for the robot manipulator, the hard trajectory tracking error function associated with said each hard constraint degree of freedom for the task and the control mode of the robot manipulator and the third parameter being configured based on the sliding manifold associated with said each hard constraint degree of freedom for the task, and the soft constraint function comprises a first parameter, a second parameter and a third parameter, the first and second parameters each being configured based on the control model for the robot manipulator, the soft trajectory tracking error function associated with said each soft constraint degree of freedom for the task and the control mode of the robot manipulator and the third parameter being configured based on the sliding manifold associated with said each soft constraint degree of freedom for the task.

13. The method according to claim 12, wherein the hard constraint function is configured to determine the hard constraint control set such that for each candidate control input in the hard constraint control set, the first parameter multiplied by the candidate control input plus the second parameter and the third parameter equals to zero, and the soft constraint function is configured to determine the soft constraint control set such that for each candidate control input in the soft constraint control set, the first parameter multiplied by the candidate control input plus the second parameter and the third parameter equals to zero.

14. The method according to claim 8, wherein the degree of freedom classification information for the task indicating the constraint type in trajectory tracking for each of the plurality of degrees of freedom of the component for the task is with respect to a plurality of degrees of freedom of a task frame defined for the task.

15. The method according to claim 8, wherein the plurality of degrees of freedom of the component comprises six degrees of freedom.

16. The method according to claim 1, wherein said performing control input optimization comprises selecting a first candidate control input from an intersection of the safety control set and the hard constraint control set that has a minimum distance to the soft constraint control set.

17. The method according to claim 16, wherein said performing control input optimization further comprises selecting a second candidate control input from an intersection of the safety control set and the hard constraint control set such that the second candidate control input has a same distance to the soft constraint control set as the first candidate control input and minimizes joint position deviation of the robot manipulator from an initial joint position thereof.

18. The method according to claim 17, wherein the control input for controlling the robot manipulator is set as the first candidate control input based on determining that the component has no redundant degree of freedom, and the control input for controlling the robot manipulator is set as the second candidate control input based on determining that the component has at least one redundant degree of freedom.

19. The method according to claim 16, further comprising converting the control input for controlling the robot manipulator to a joint-position control input based on determining that the robot manipulator has a joint-position control mode.

20. The method according to claim 1, wherein the component of robot manipulator is an end effector.

21. A controller system for controlling a robot manipulator for operating in a shared workspace with one or more humans, the controller system comprising:

at least one memory; and at least one processor communicatively coupled to the at least one memory and configured to perform the method of controlling a robot manipulator according to claim 1.

22. A computer program product, embodied in one or more non-transitory computer-readable storage mediums, comprising instructions executable by at least one processor to perform the method of controlling a robot manipulator for operating in a shared workspace with one or more humans according to claim 1.

23. A robot manipulator system comprising:

a robot manipulator configured to operate in a shared workspace with one or more humans; and the controller system according to claim 21 communicatively coupled or couplable to the robot manipulator and configured to control the robot manipulator to operate in the shared workspace.

* * * * *